United States Patent
Zhao et al.

(10) Patent No.: US 11,595,639 B2
(45) Date of Patent: Feb. 28, 2023

(54) METHOD AND APPARATUS FOR PROCESSING VIDEO SIGNALS USING AFFINE PREDICTION

(71) Applicant: LG ELECTRONICS INC., Seoul (KR)

(72) Inventors: Jane Zhao, Seoul (KR); Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/277,926

(22) PCT Filed: Sep. 23, 2019

(86) PCT No.: PCT/KR2019/012365
§ 371 (c)(1),
(2) Date: Mar. 19, 2021

(87) PCT Pub. No.: WO2020/060374
PCT Pub. Date: Mar. 26, 2020

(65) Prior Publication Data
US 2021/0360227 A1    Nov. 18, 2021

Related U.S. Application Data

(60) Provisional application No. 62/734,289, filed on Sep. 21, 2018.

(51) Int. Cl.
*H04N 19/105* (2014.01)
*H04N 19/46* (2014.01)
(Continued)

(52) U.S. Cl.
CPC ......... *H04N 19/105* (2014.11); *H04N 19/137* (2014.11); *H04N 19/176* (2014.11); *H04N 19/46* (2014.11)

(58) Field of Classification Search
CPC .. H04N 19/105; H04N 19/137; H04N 19/176; H04N 19/46
(Continued)

(56) References Cited

U.S. PATENT DOCUMENTS

2013/0279577 A1   10/2013   Schwarz et al.
2017/0332095 A1   11/2017   Zou et al.
(Continued)

FOREIGN PATENT DOCUMENTS

CN         109863752 A    *  6/2019    ........... H04N 19/119
WO   WO-2017130696 A1    *  8/2017    ........... H04N 19/105
(Continued)

OTHER PUBLICATIONS

Chen, English translation document of CN 109863752 A, Oct. 13, 2017 (Year: 2017).*
(Continued)

*Primary Examiner* — Albert Kir
(74) *Attorney, Agent, or Firm* — Dentons US LLP

(57) ABSTRACT

Disclosed are a method for processing video signals and an apparatus therefor. Specifically, the method for processing video signals on the basis of inter prediction comprises the steps of: inducing a motion vector predictor using motion data of a neighboring block of the current block; parsing layer data indicating the current layer to which a motion vector difference used in inter prediction of the current block belongs, in a previously defined layer structure in which the combination of one or more horizontal and vertical components of motion vector differences are divided into multiple layers; parsing index data indicating a particular combination within the current layer; inducing a motion vector difference of the current block using the layer data and index
(Continued)

data; and inducing the motion vector for the current block by adding the motion vector difference to the motion vector predictor.

6 Claims, 50 Drawing Sheets

(51) Int. Cl.
  *H04N 19/176* (2014.01)
  *H04N 19/137* (2014.01)
(58) Field of Classification Search
  USPC .................................................. 375/240.02
  See application file for complete search history.

(56) References Cited

U.S. PATENT DOCUMENTS

| | | | |
|---|---|---|---|
| 2018/0199057 A1 | 7/2018 | Chuang et al. | |
| 2020/0036997 A1* | 1/2020 | Li | H04N 19/436 |
| 2020/0186818 A1* | 6/2020 | Li | H04N 19/105 |
| 2020/0296383 A1* | 9/2020 | Li | H04N 19/105 |
| 2021/0092432 A1* | 3/2021 | Rusanovskyy | H04N 19/56 |
| 2021/0266586 A1* | 8/2021 | Leleannec | H04N 19/176 |
| 2021/0400262 A1* | 12/2021 | Li | H04N 19/52 |

FOREIGN PATENT DOCUMENTS

| | | |
|---|---|---|
| WO | 2018/067823 A1 | 4/2018 |
| WO | 2018/128380 A1 | 7/2018 |

OTHER PUBLICATIONS

Ikai, English translation document of WO 2017130696 A1, Jan. 11, 2017 (Year: 2017).*
International Search Report from PCT/KR2019/012365, dated Jan. 22, 2020.
Written Opinion of the ISA from PCT/KR2019/012365, dated Jan. 22, 2020.

* cited by examiner

[FIG. 1]
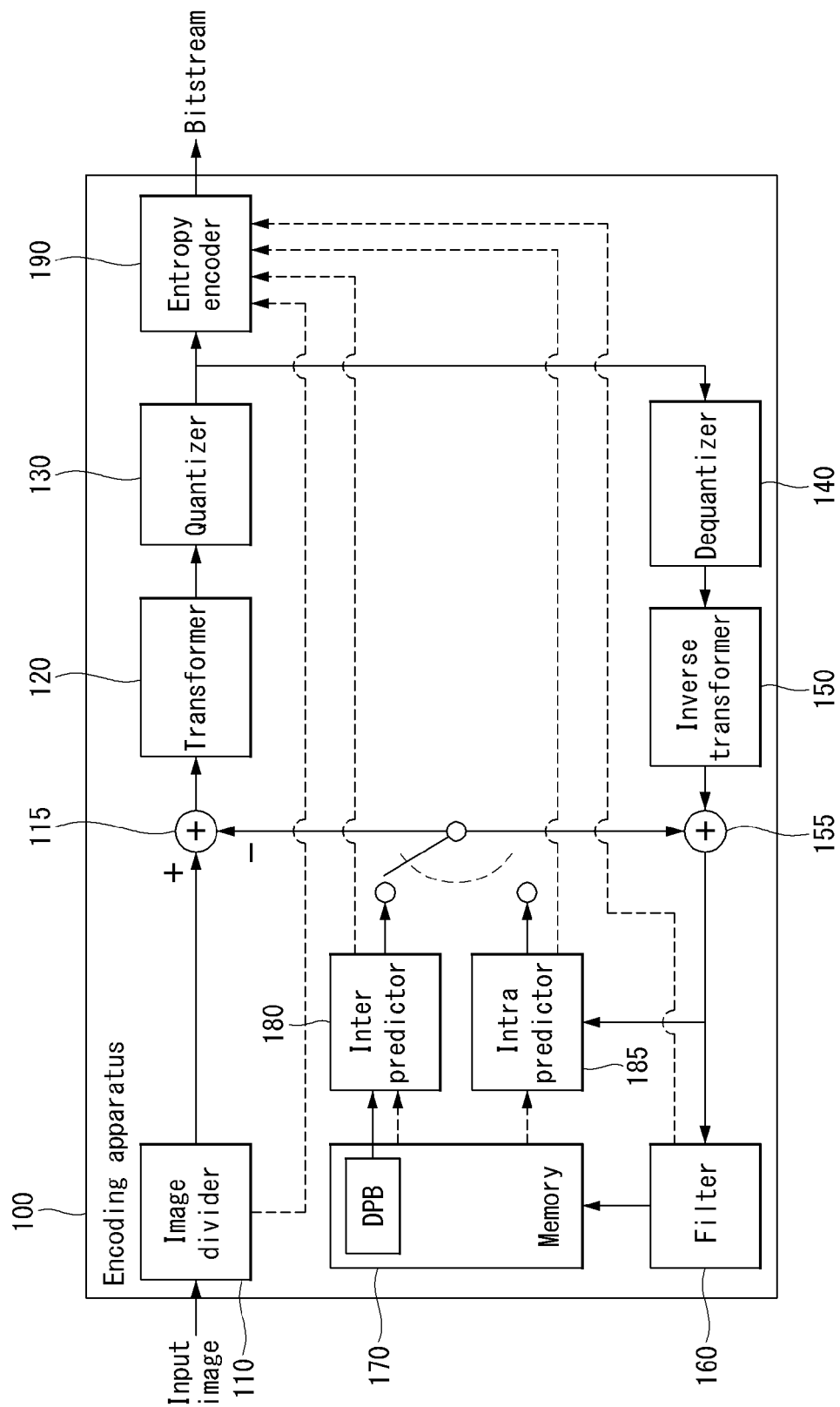

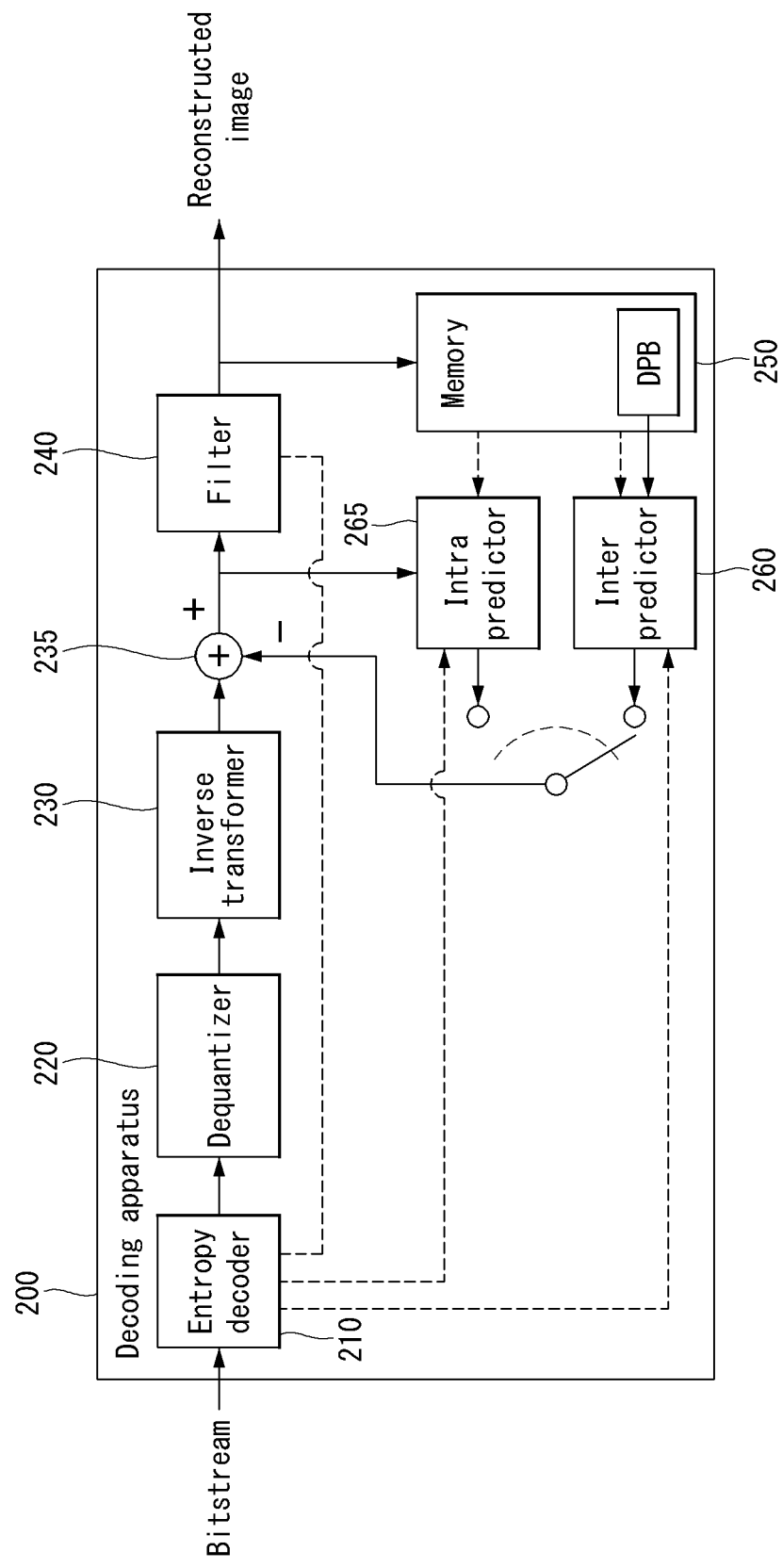
[FIG. 2]

[FIG. 3]
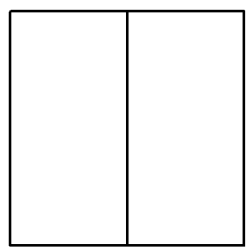 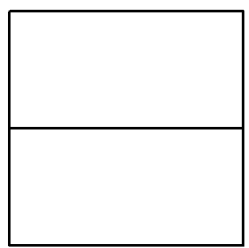 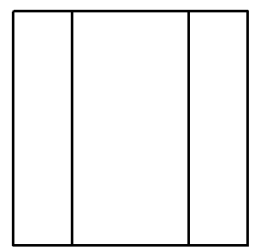 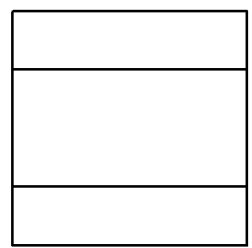
SPLIT_BT_VER　　　SPLIT_BT_HOR　　　SPLIT_TT_VER　　　SPLIT_TT_HOR

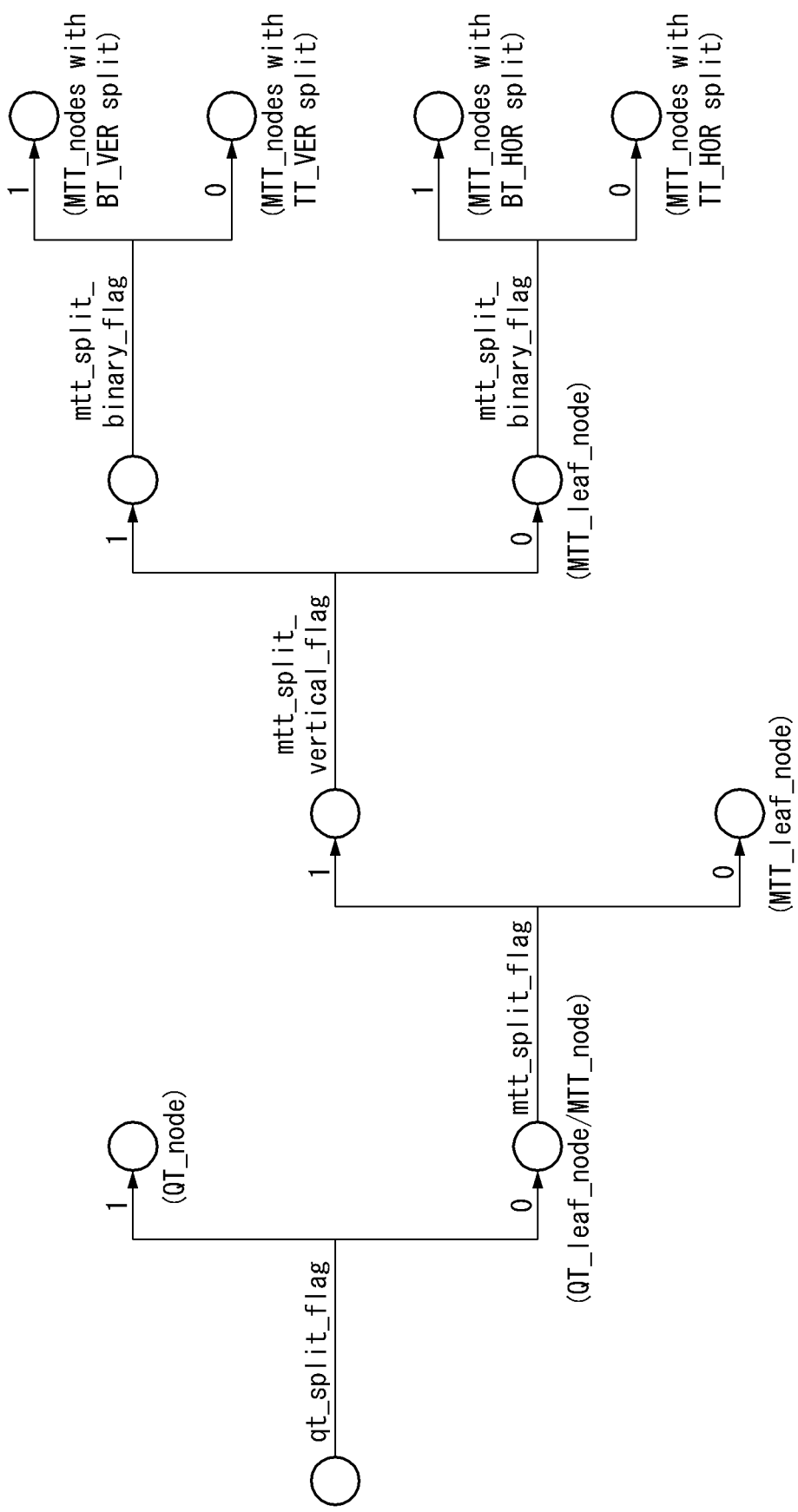
[FIG. 4]

[FIG. 5]
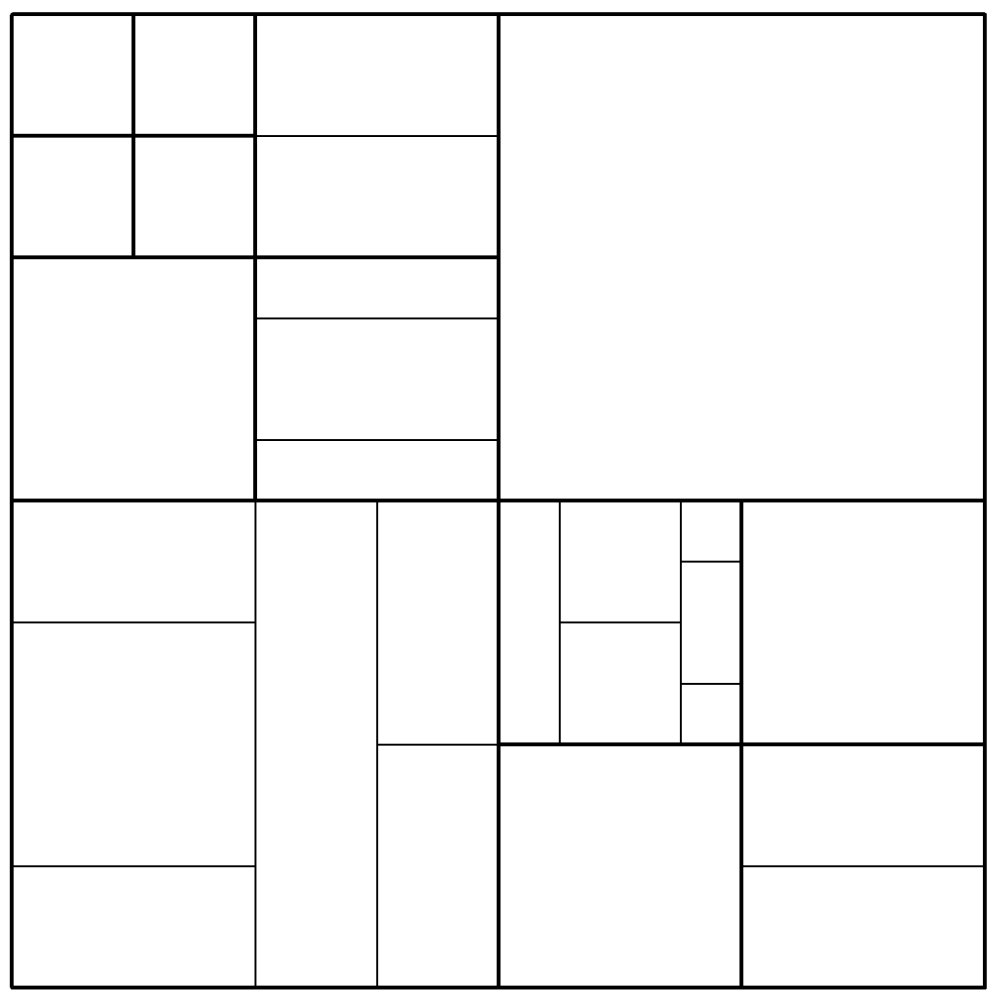

[FIG. 6]
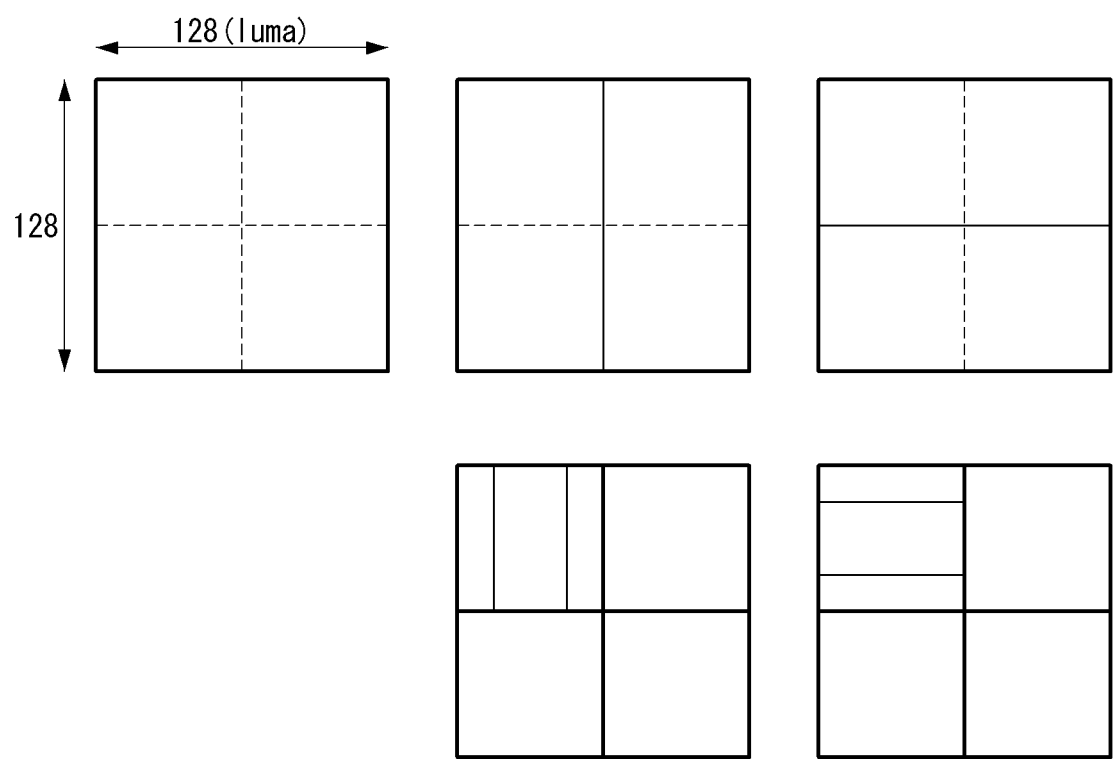

[FIG. 7]
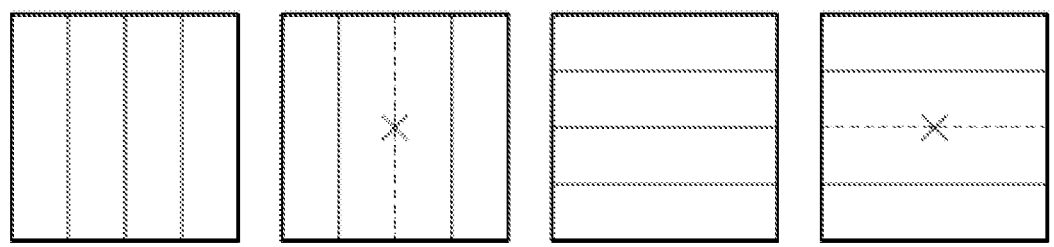

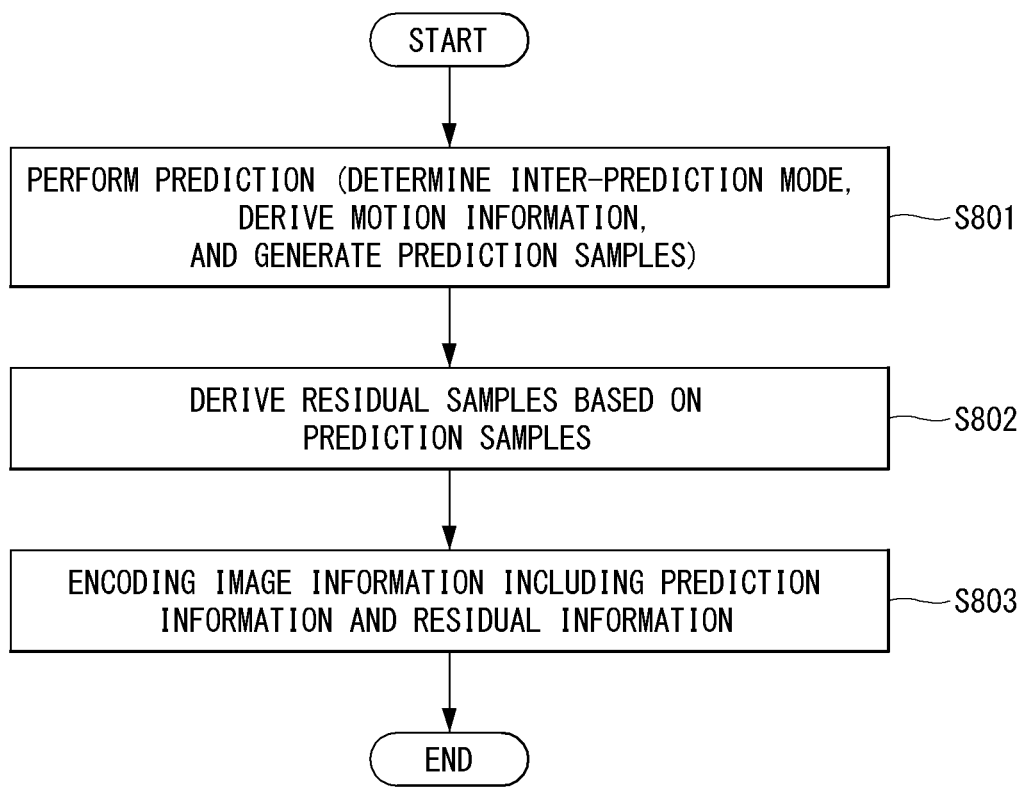

[FIG. 9]
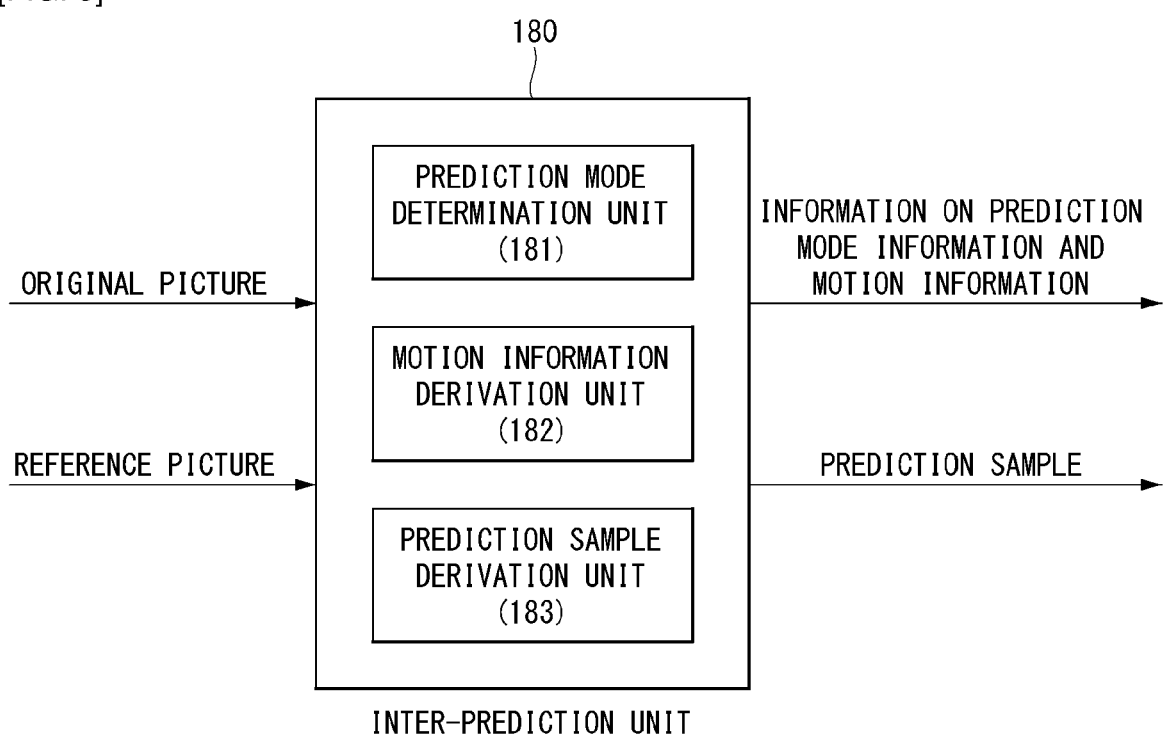

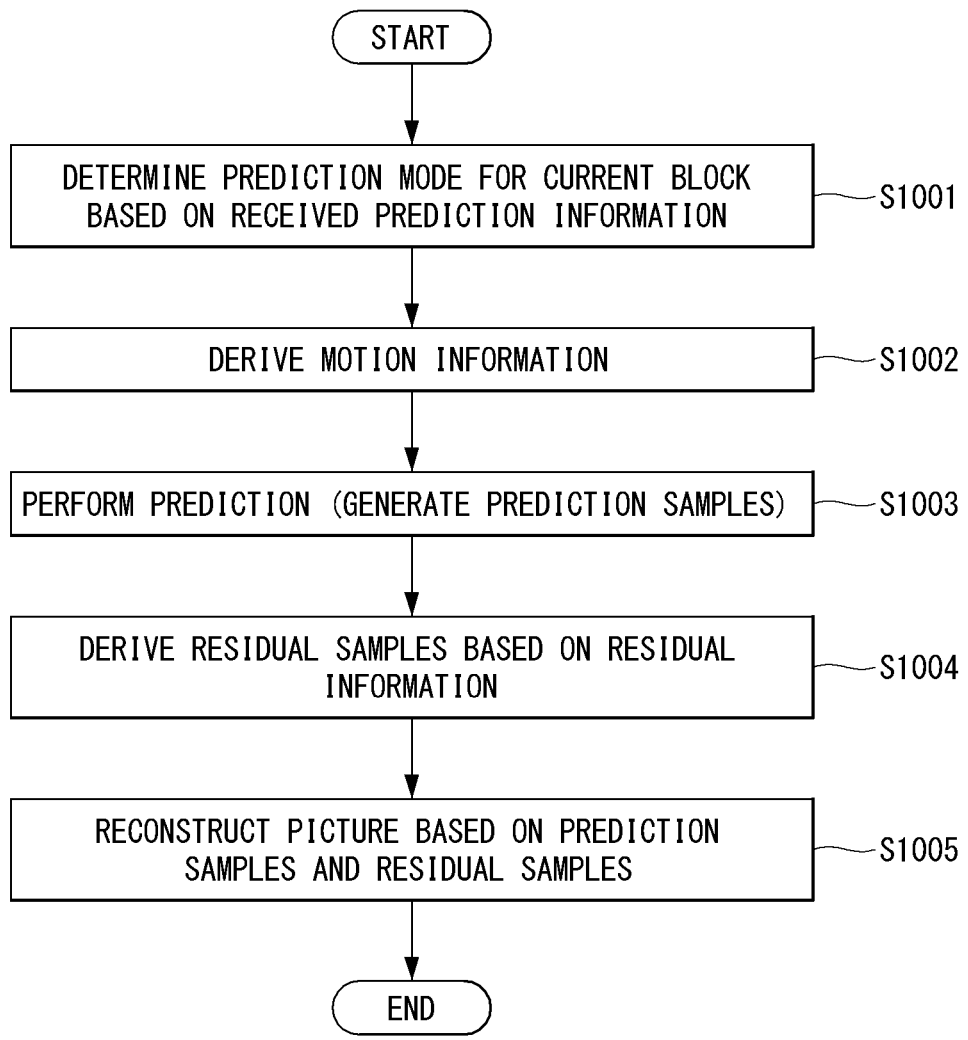

[FIG. 11]
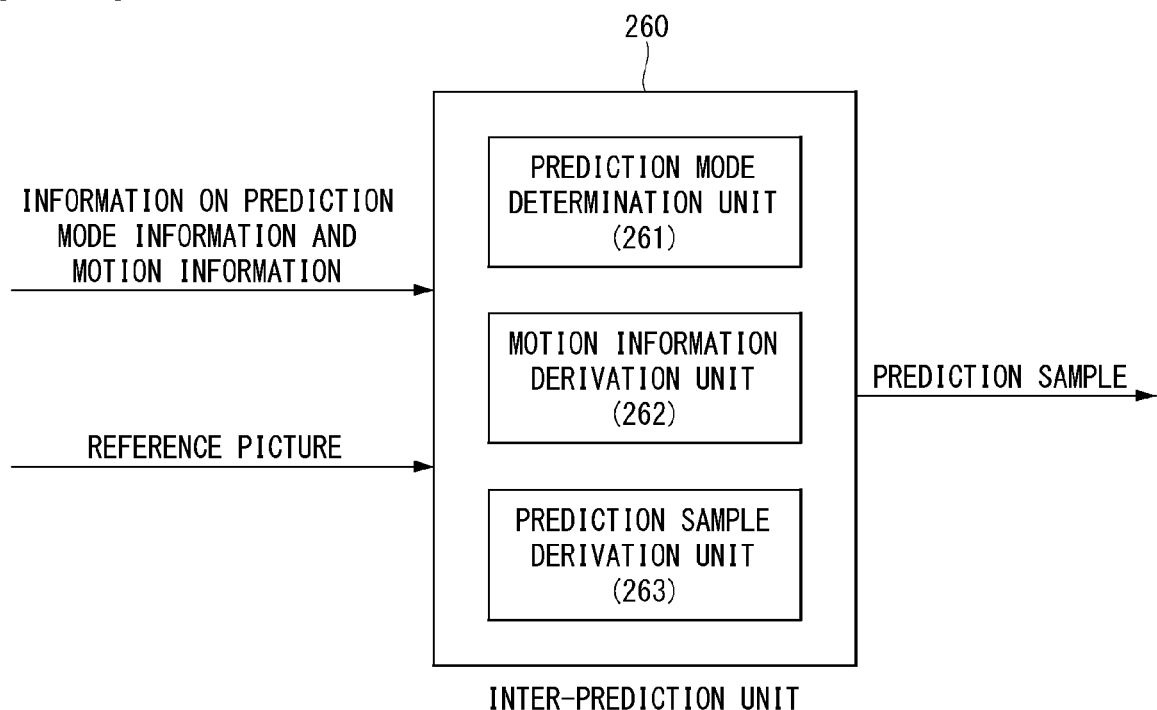

[FIG. 12]
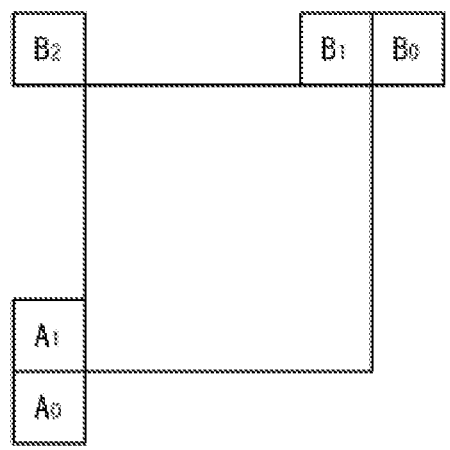

[FIG. 13]
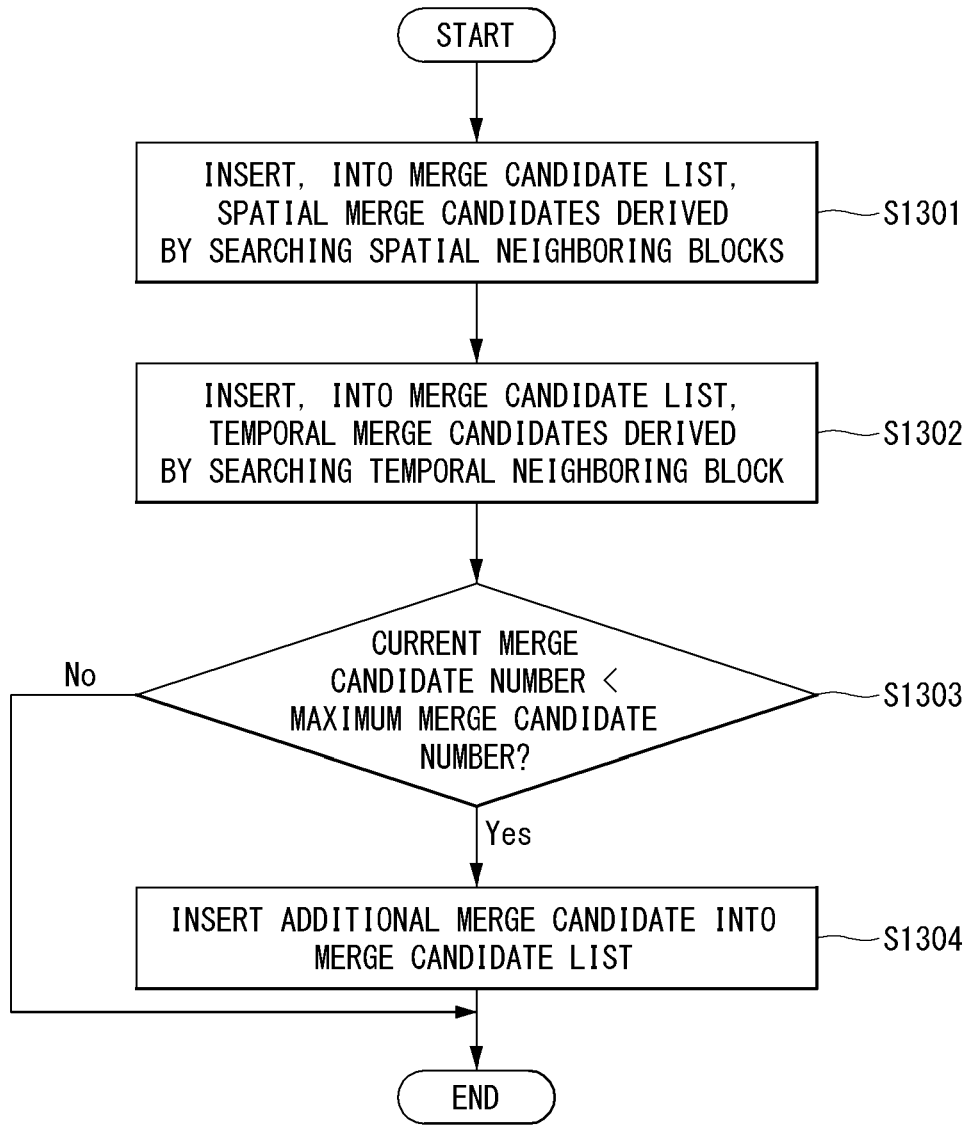

[FIG. 14]
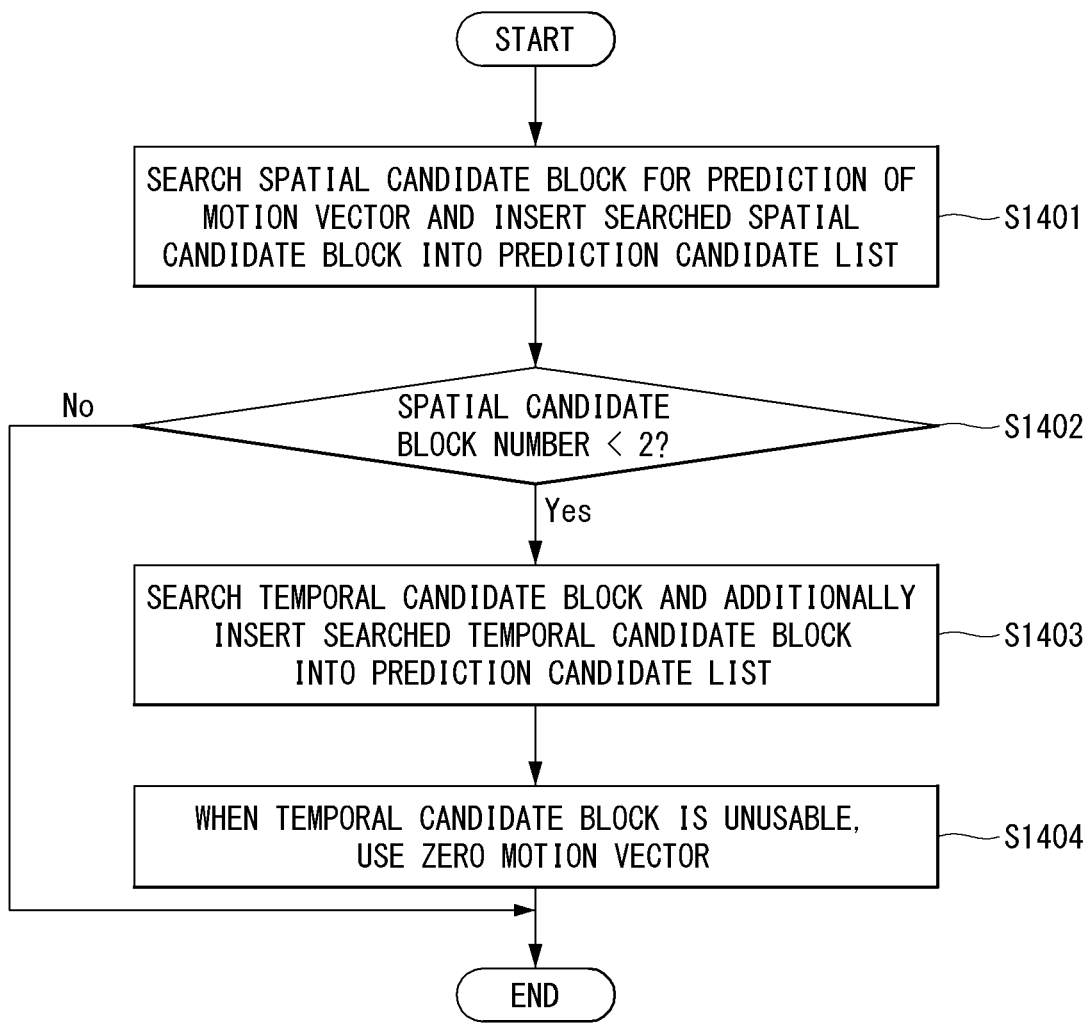

[FIG. 15]
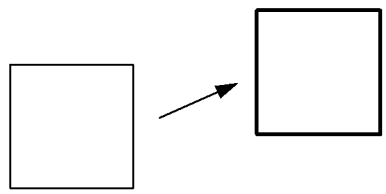
Translate
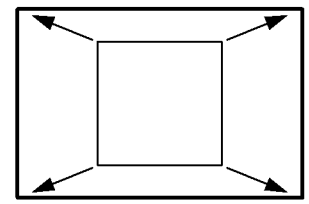
Scale
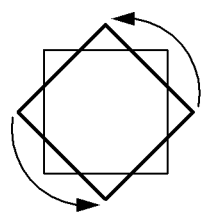
Rotate
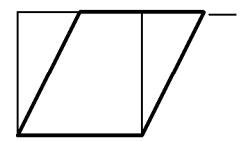
Shear
[FIG. 16]
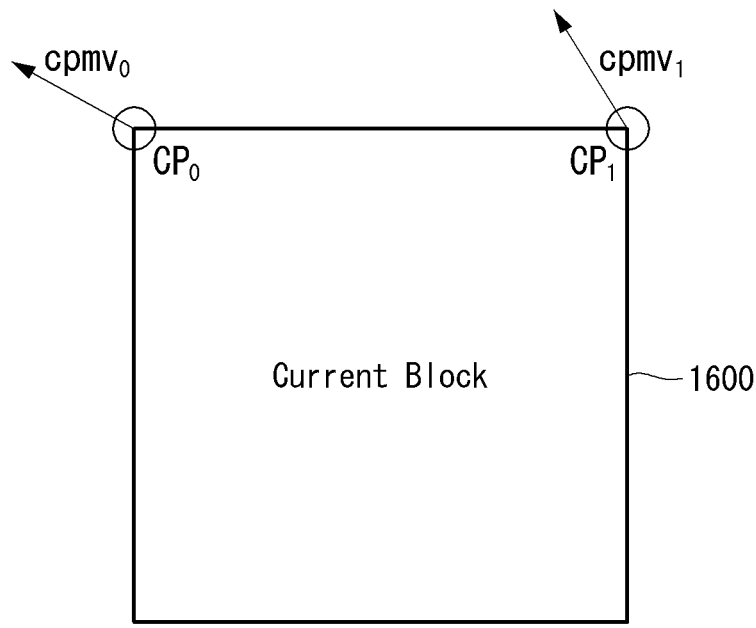

[FIG. 17]
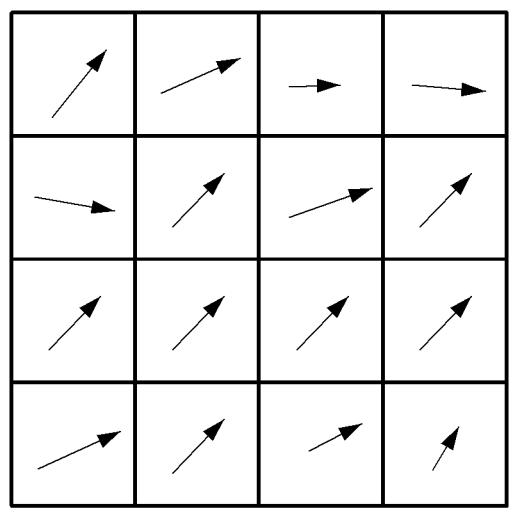
[FIG. 18]
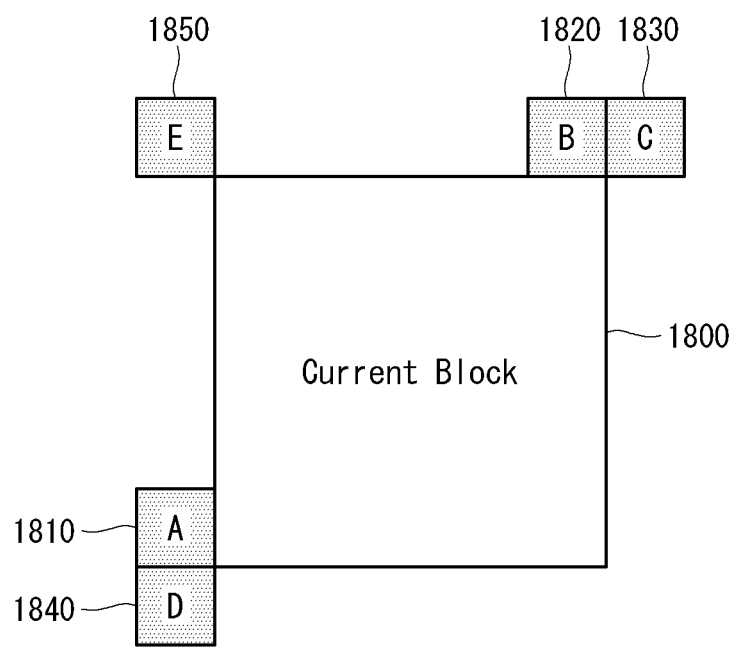

[FIG. 19]
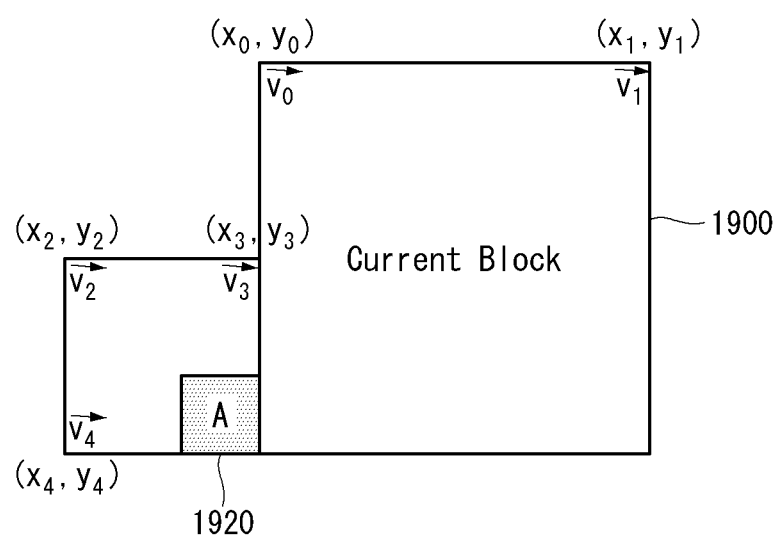

[FIG. 20]
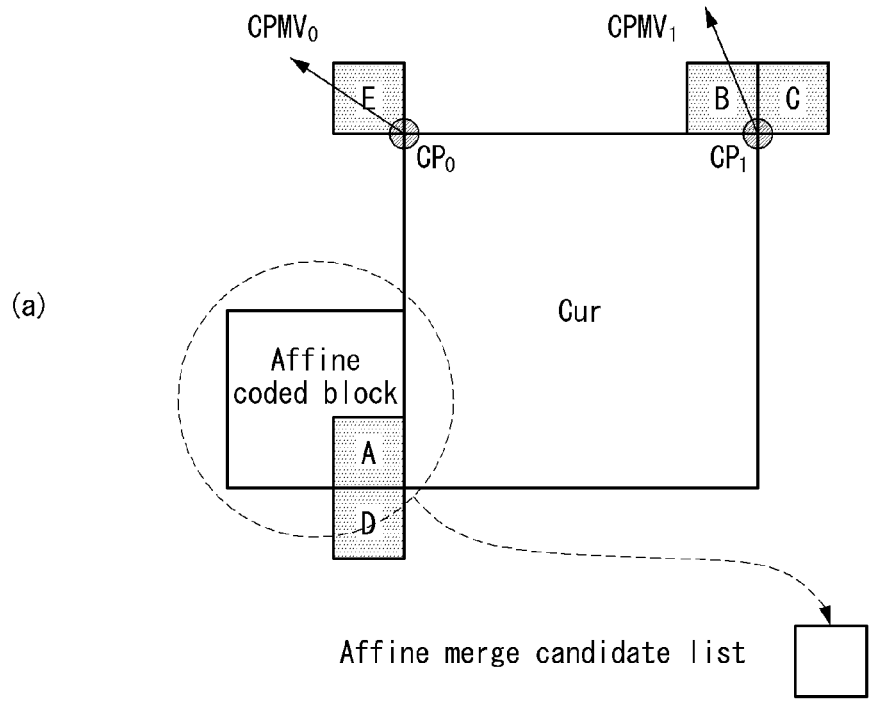
(a)
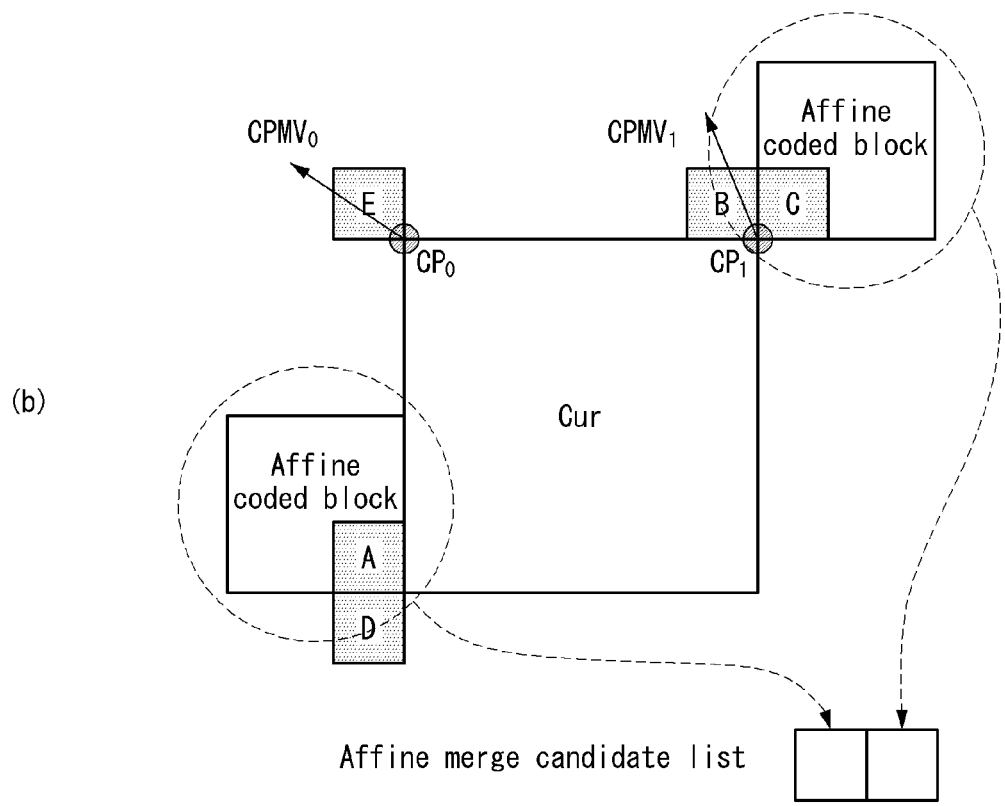
(b)

[FIG. 21]
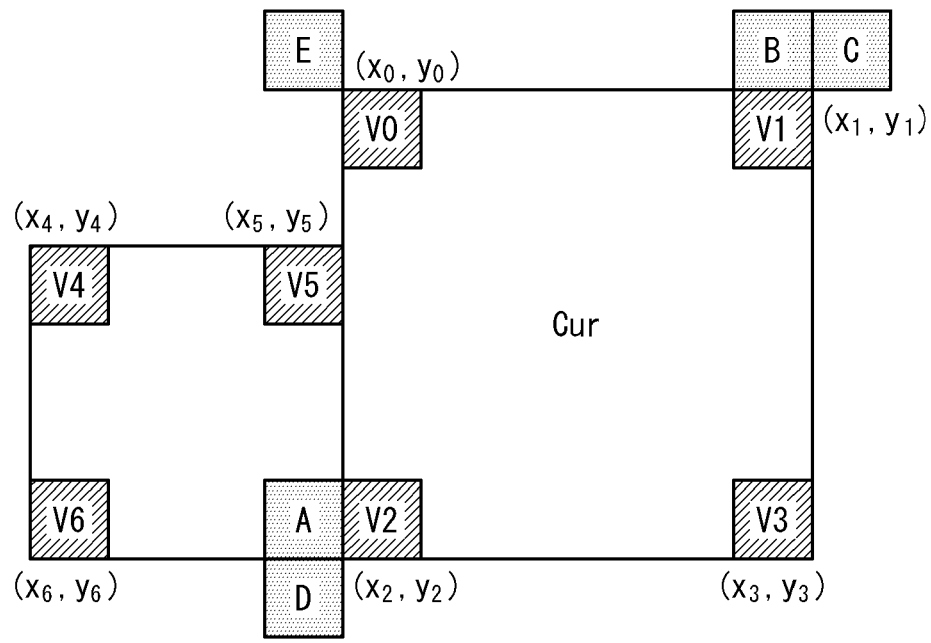
[FIG. 22]
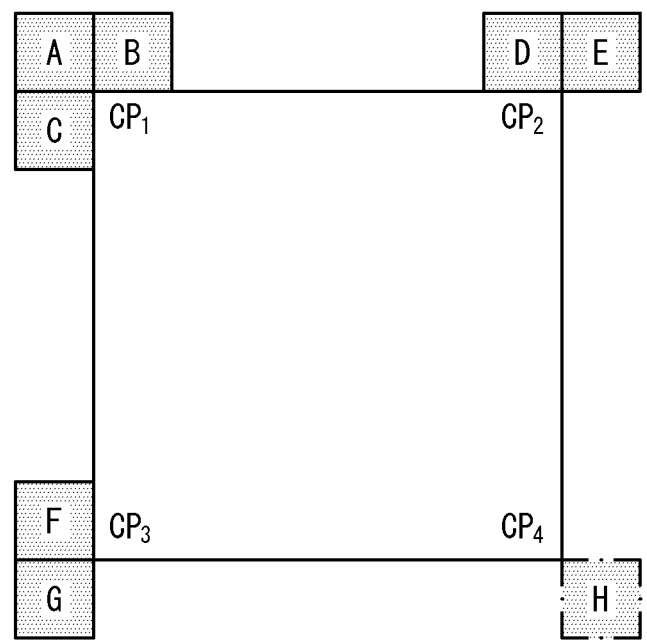

[FIG. 23]
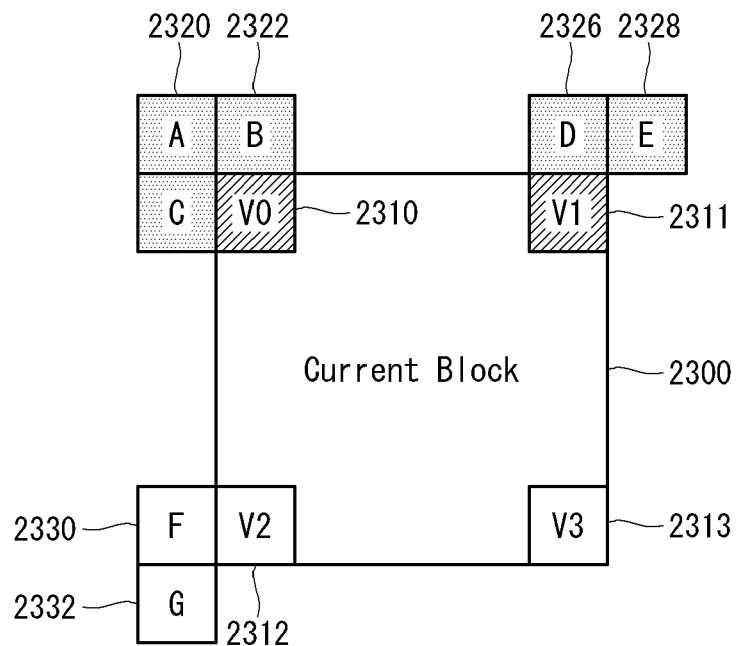
[FIG. 24]
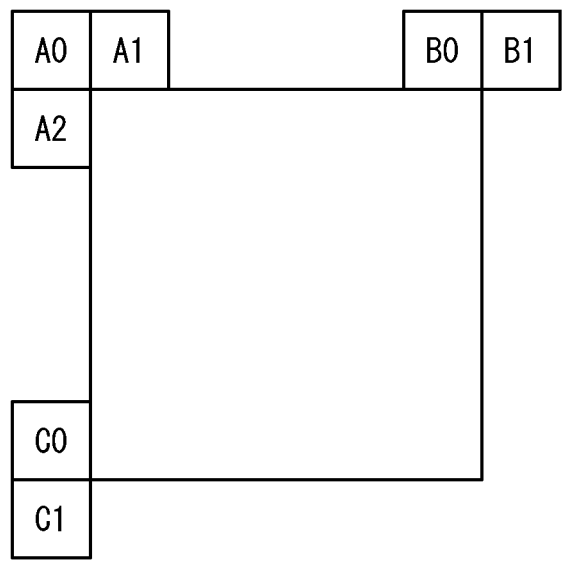

[FIG. 25]
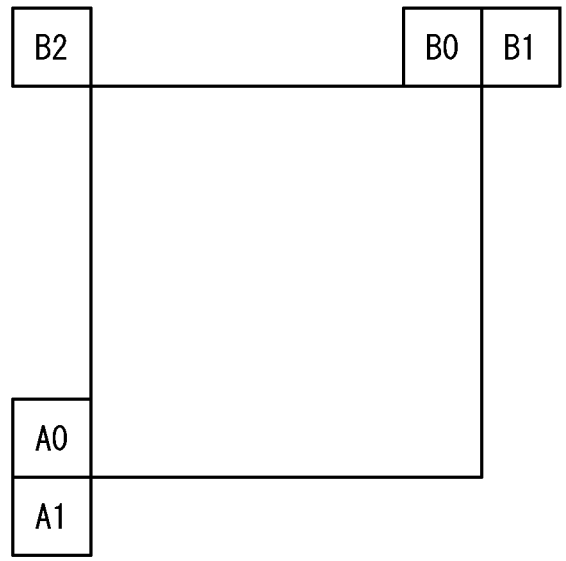
[FIG. 26]
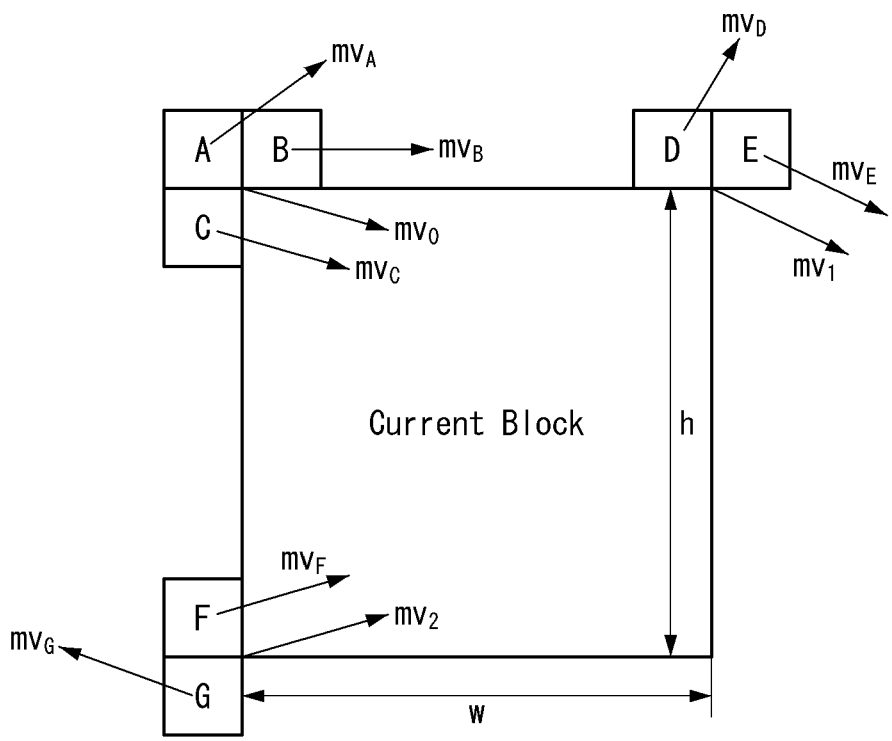

[FIG. 27]
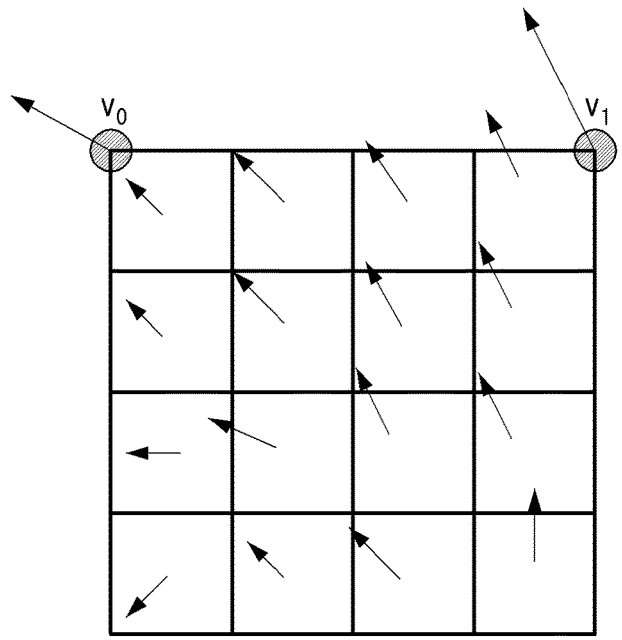
[FIG. 28]
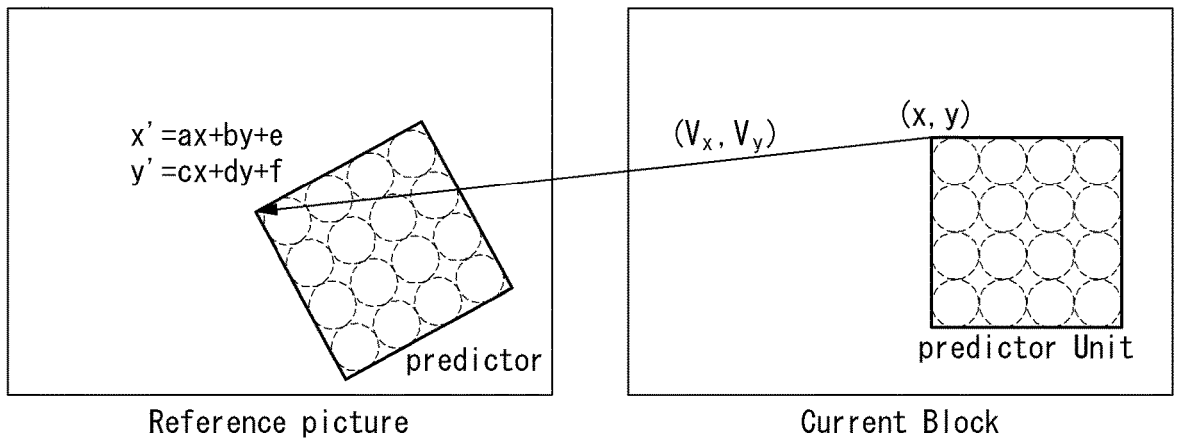

[FIG. 29]
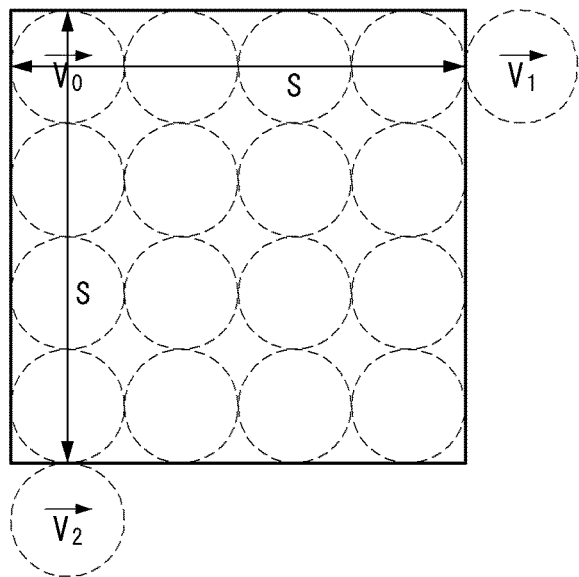
[FIG. 30]
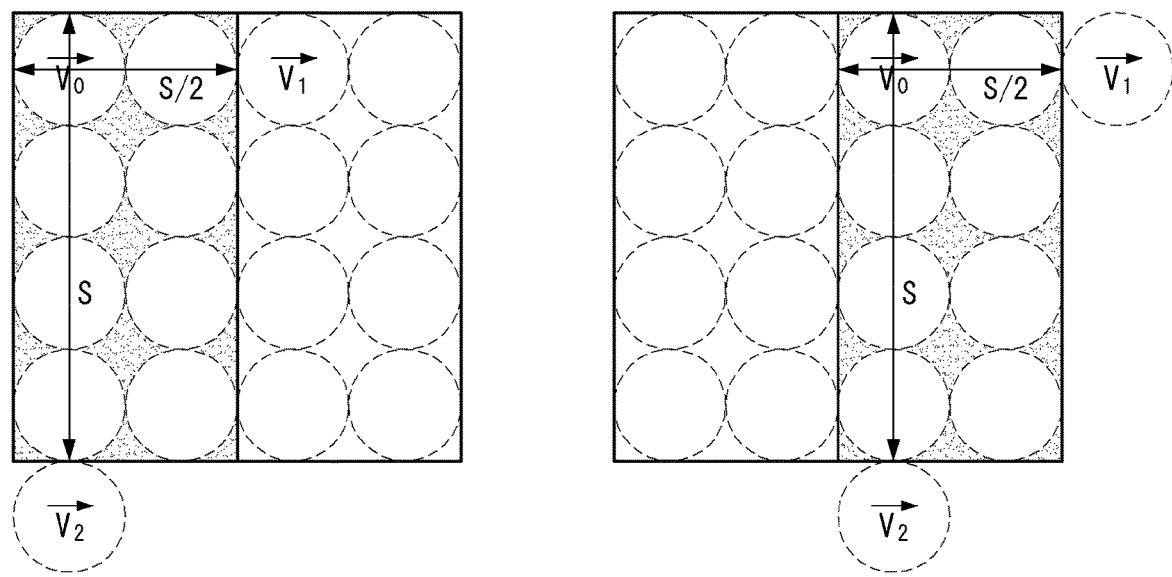

[FIG. 31]
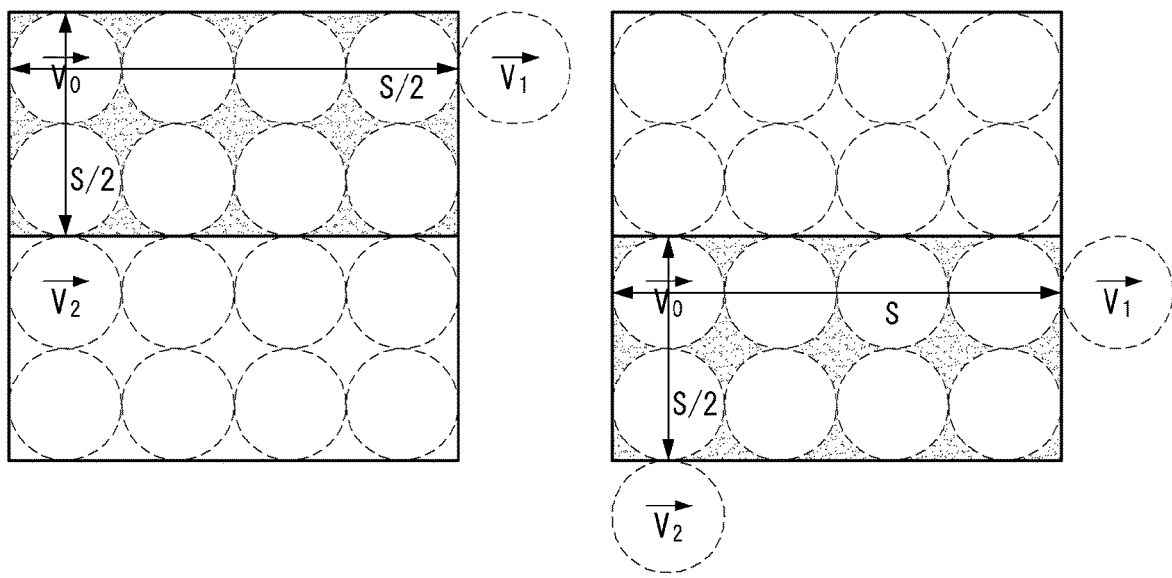

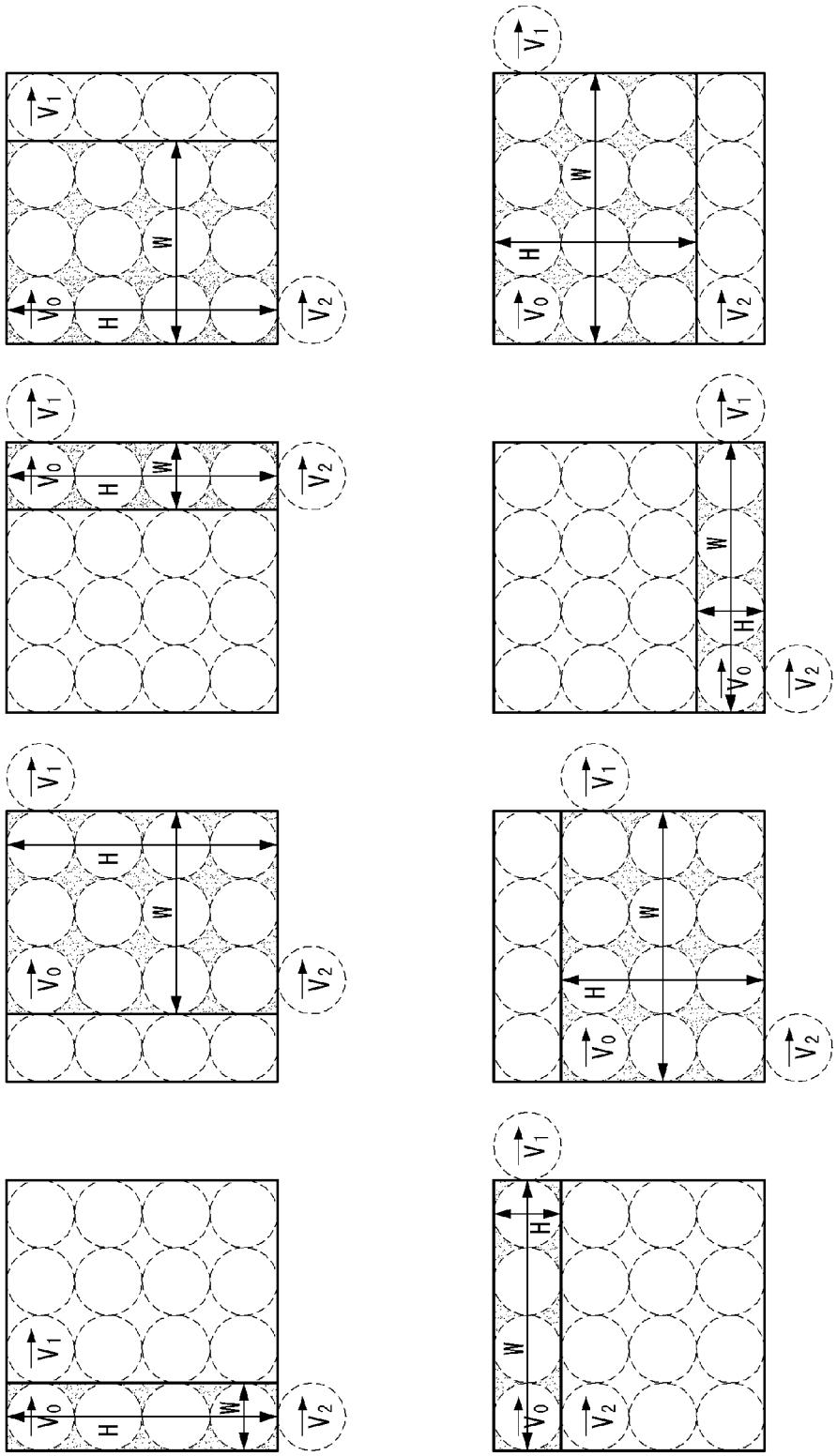
[FIG. 32]

[FIG. 33]
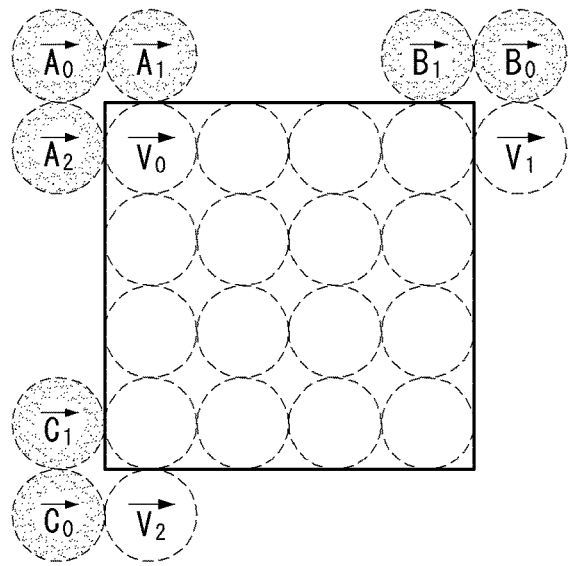
[FIG. 34]
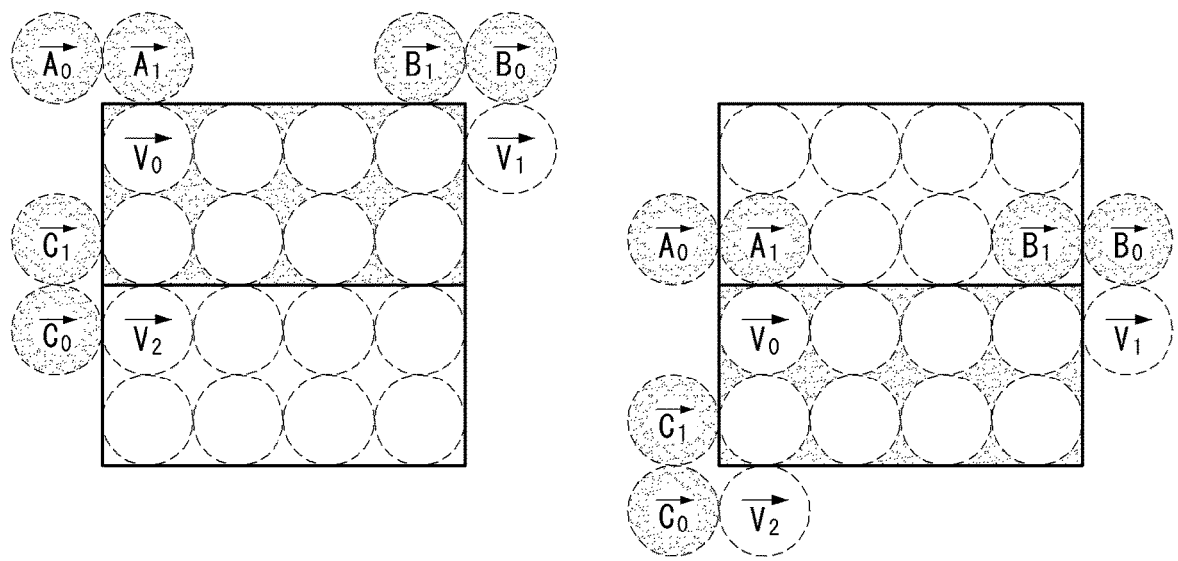

[FIG. 35]
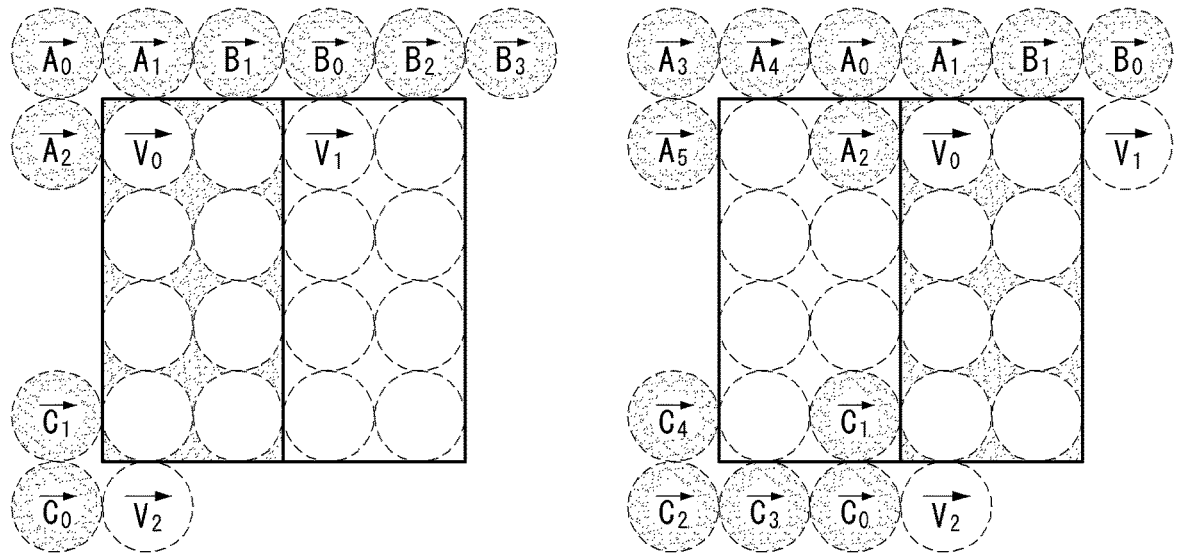
[FIG. 36]
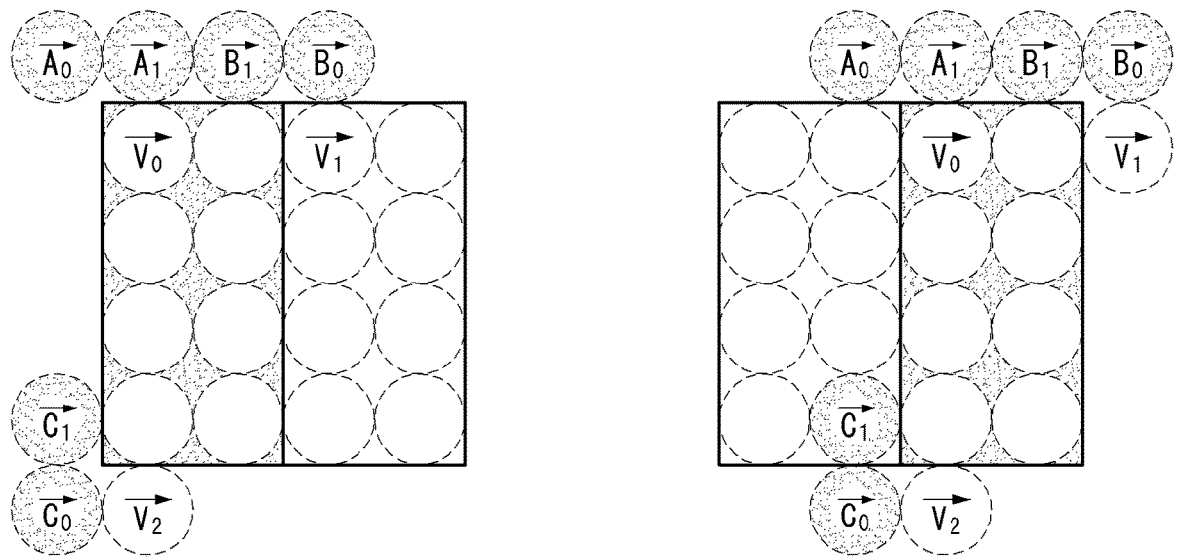

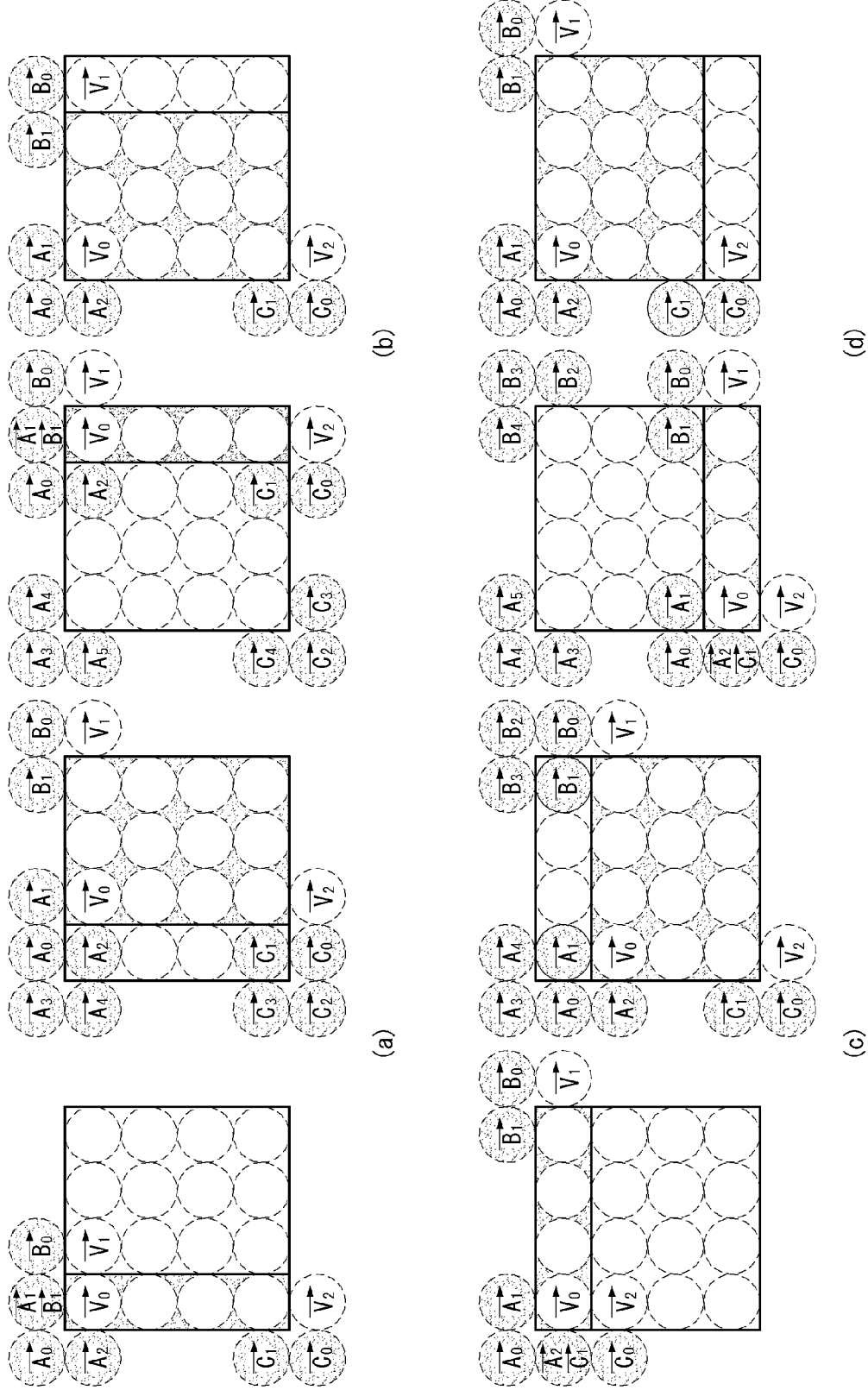
[FIG. 37]

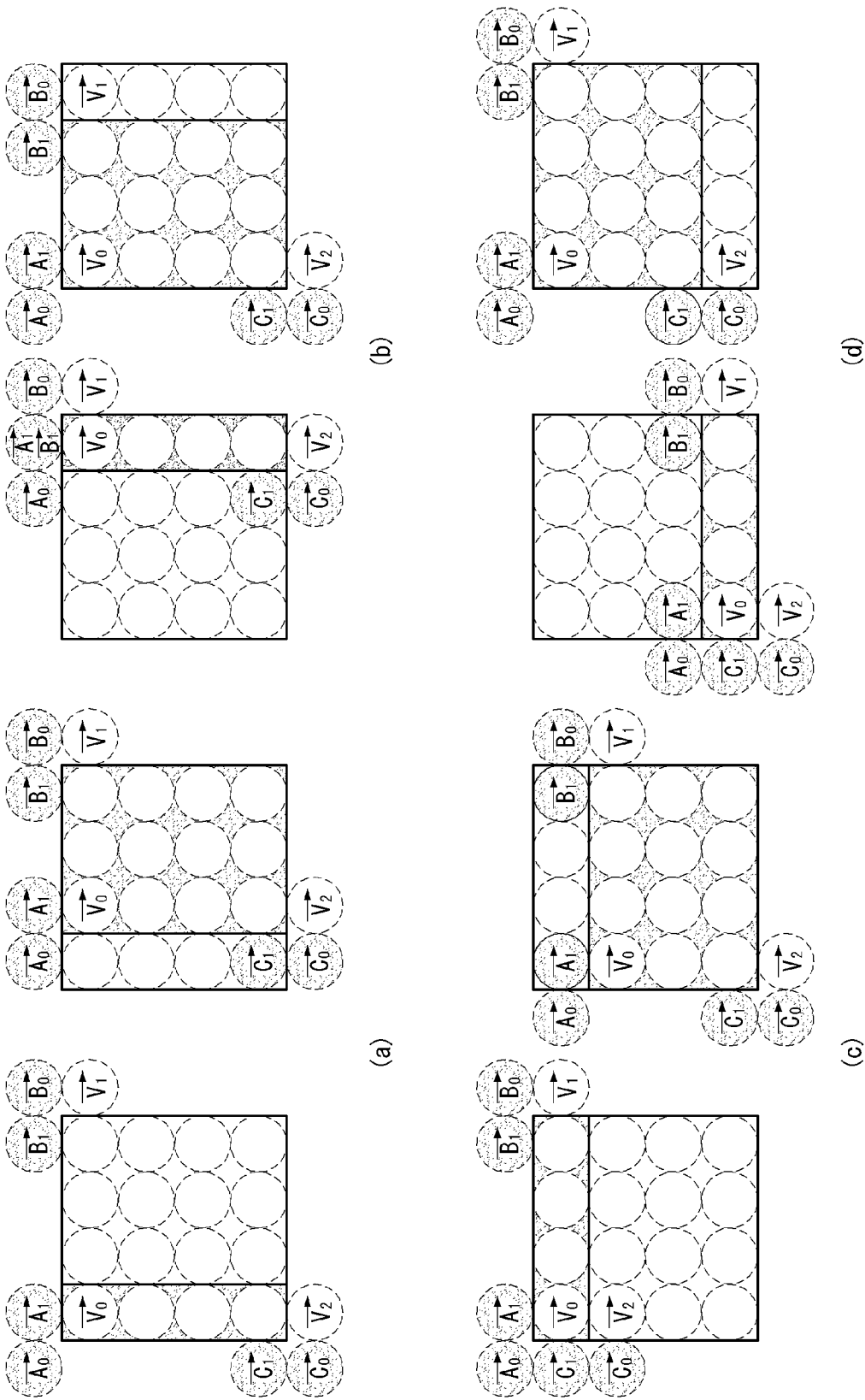
[FIG. 38]

[FIG. 39]
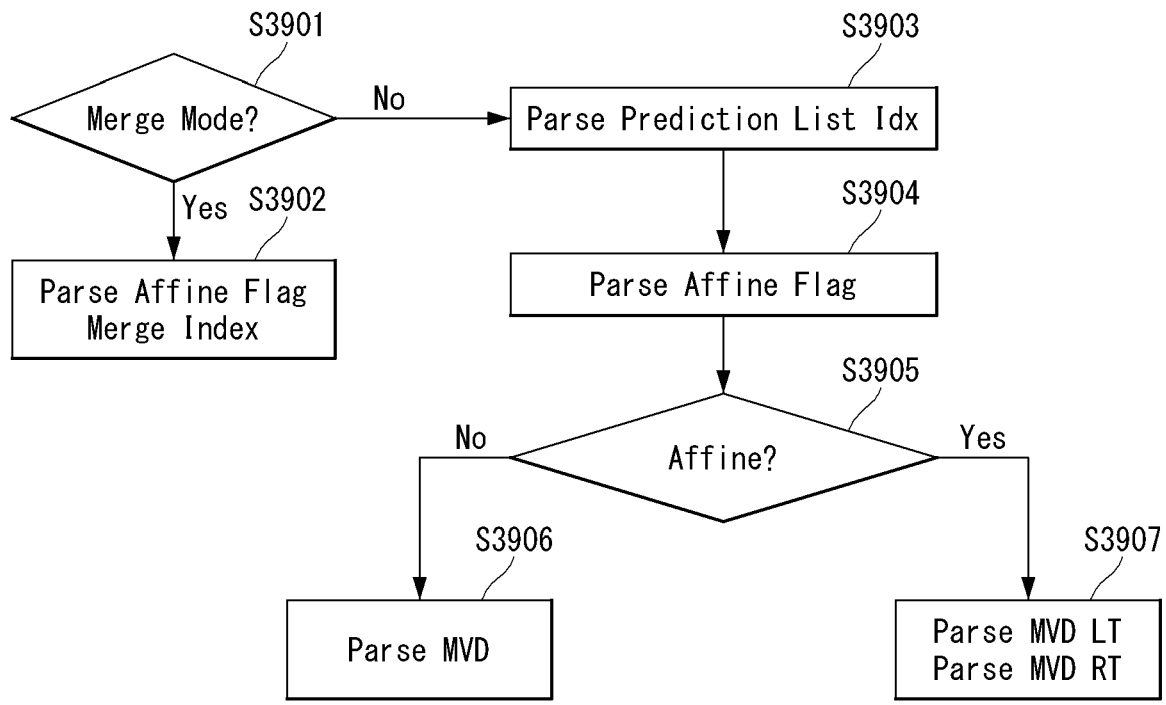

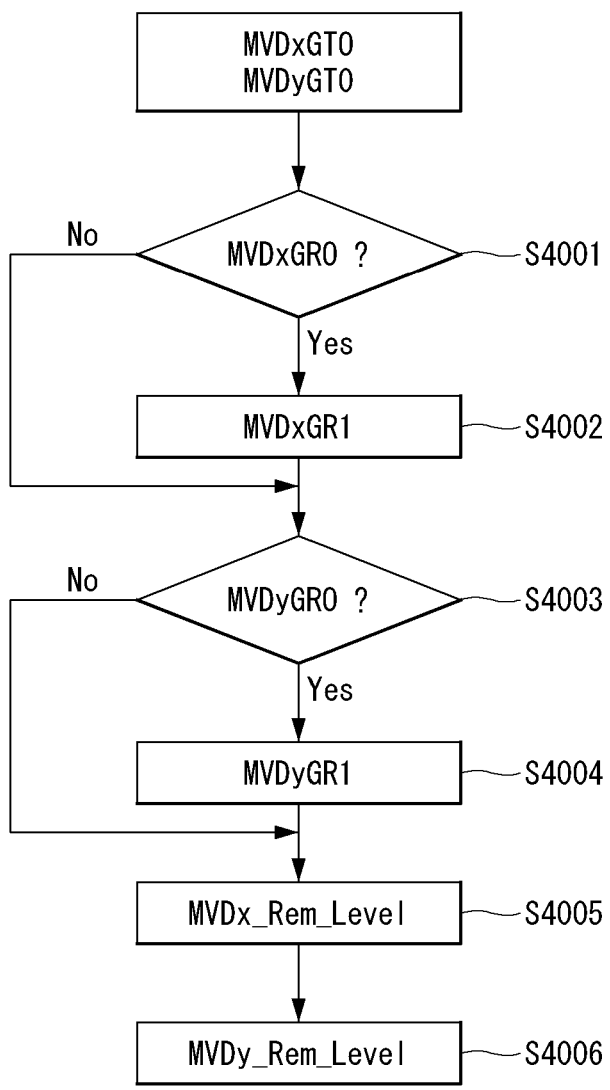
[FIG. 40]

[FIG. 41]
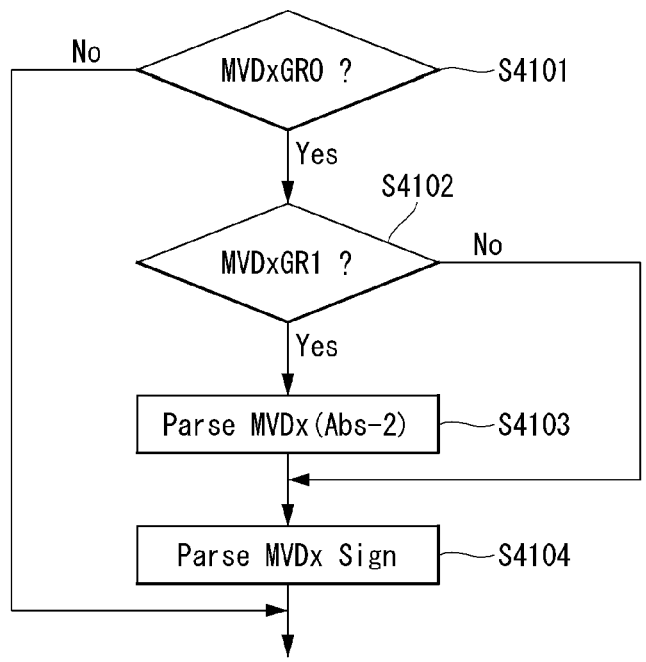
[FIG. 42]
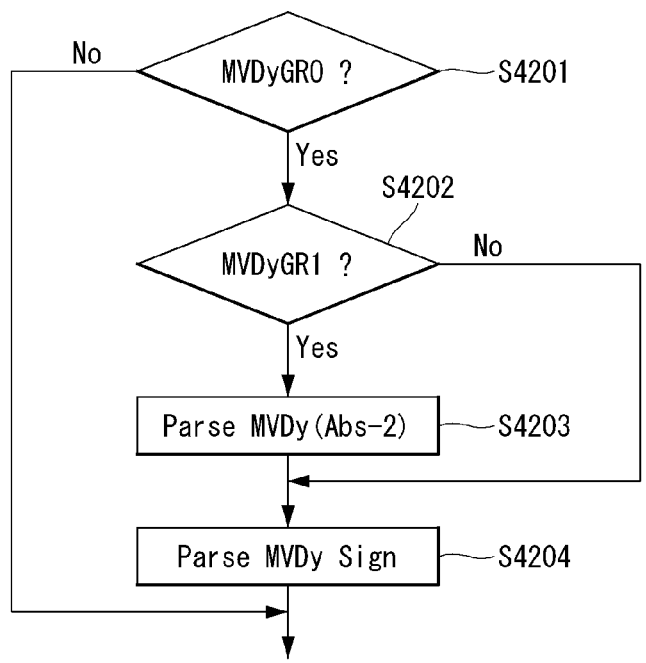

[FIG. 43]
(a)
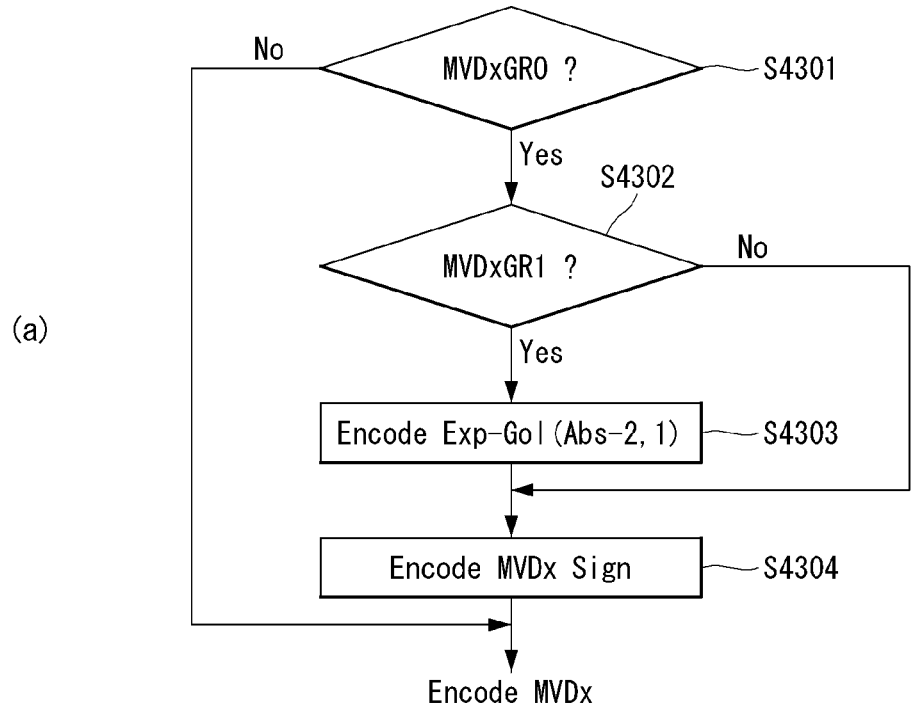
(b)
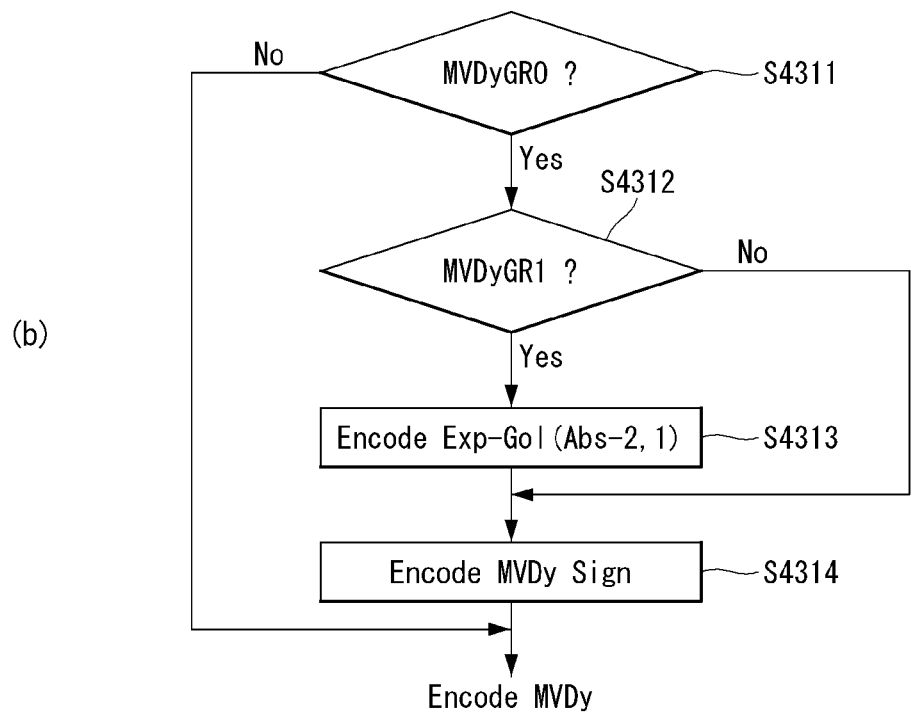

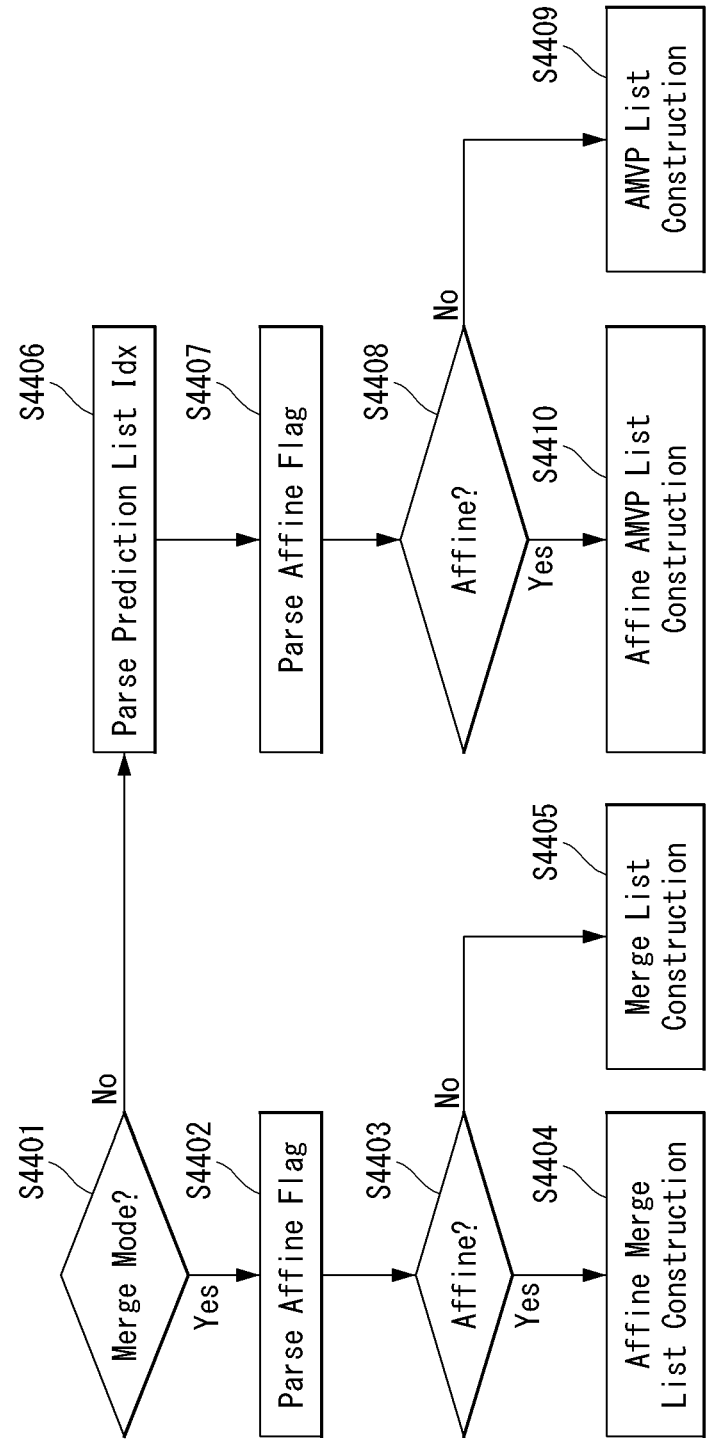
[FIG. 44]

[FIG. 45]
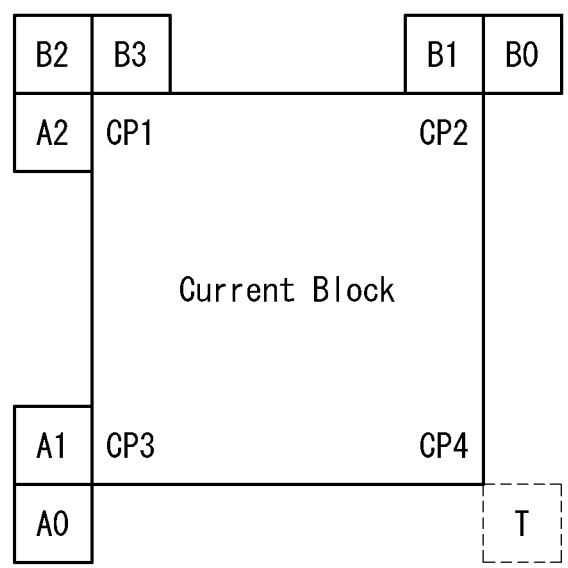

[FIG. 46]
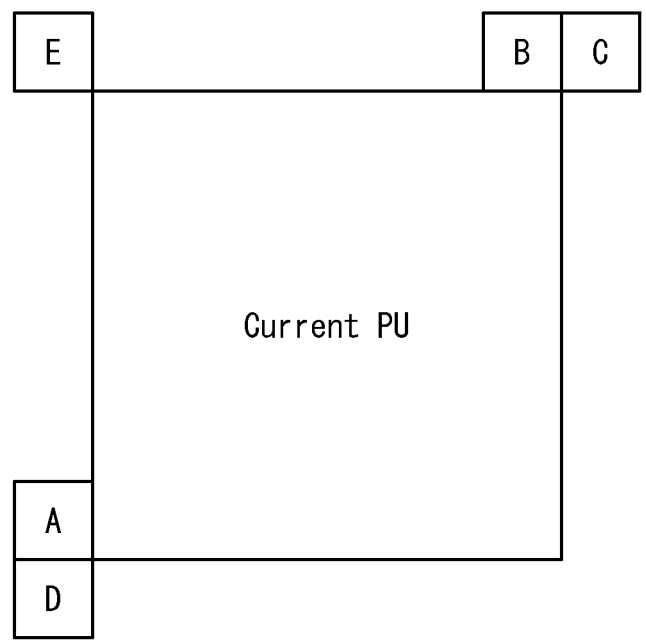

[FIG. 47]
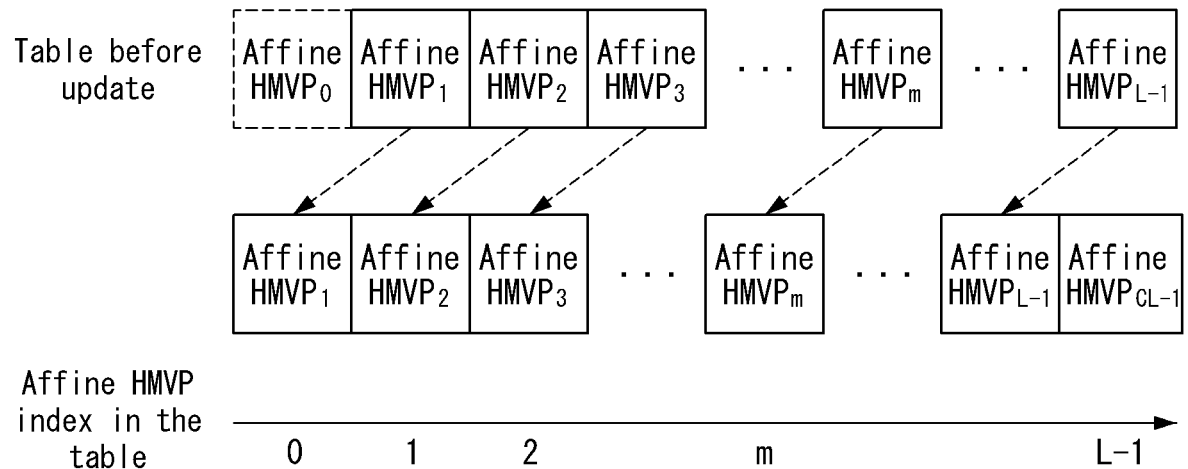

[FIG. 48]
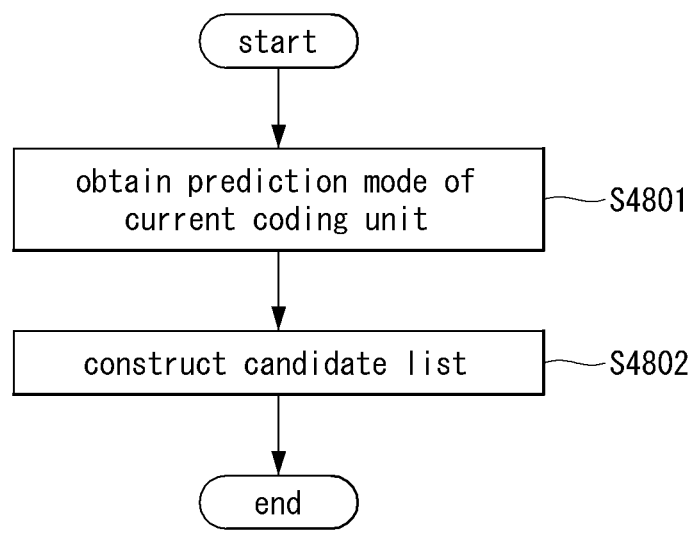

[FIG. 49]
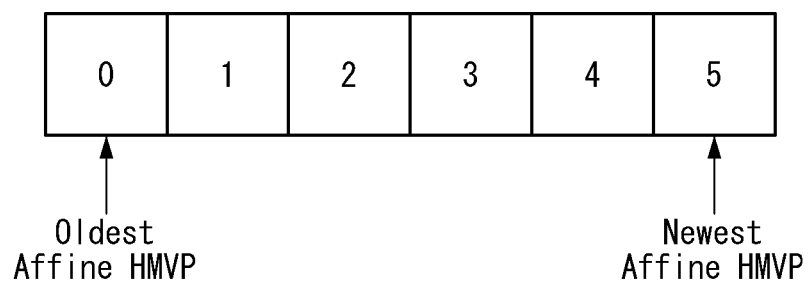

[FIG. 50]
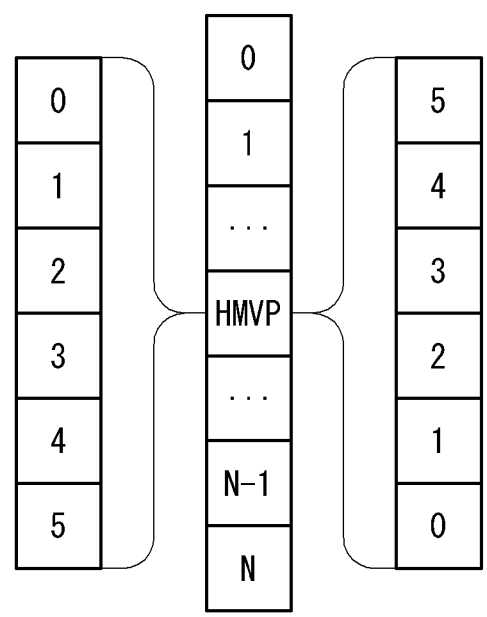

[FIG. 51]
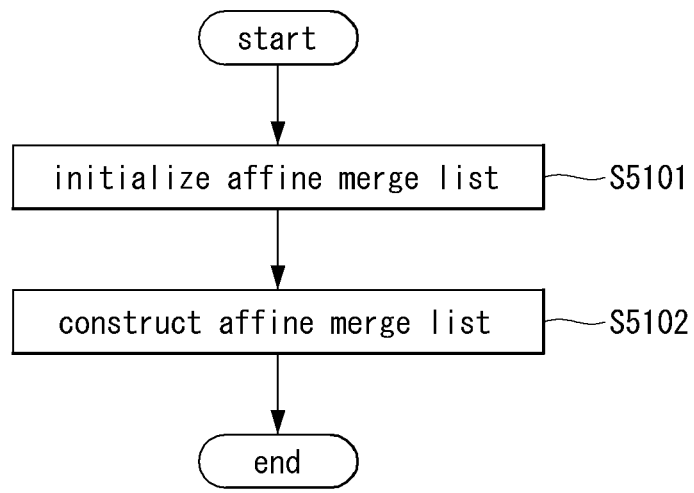

[FIG. 52]
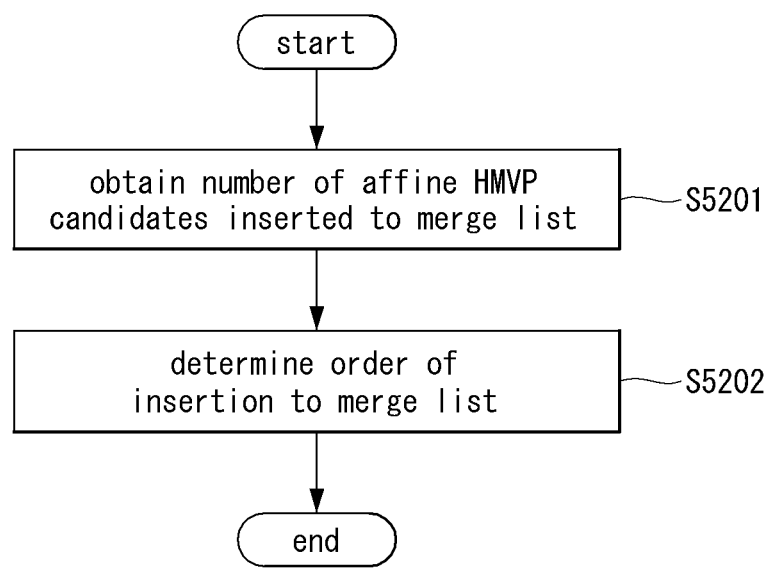

[FIG. 53]
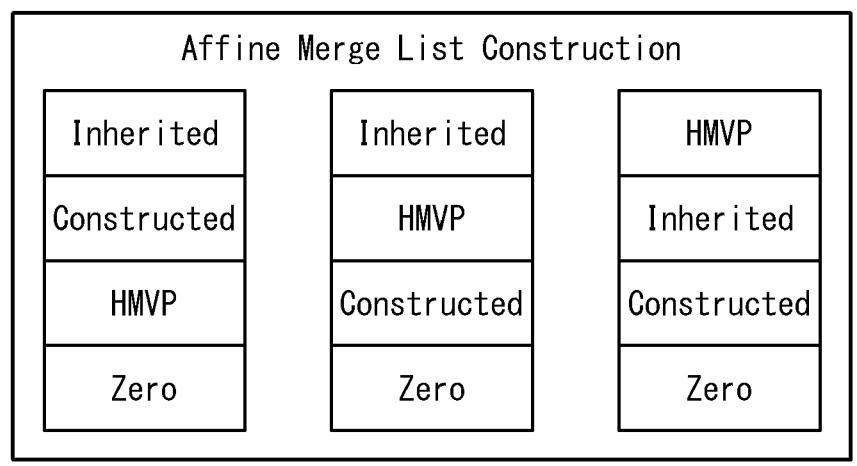

[FIG. 54]
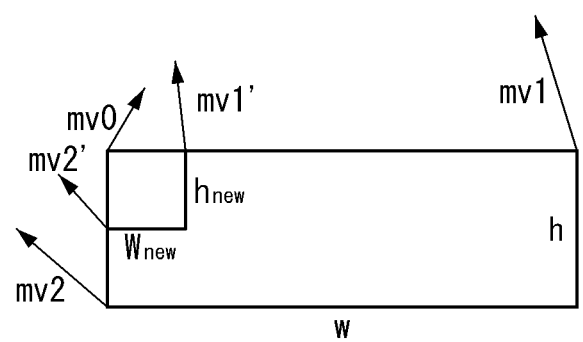

[FIG. 55]
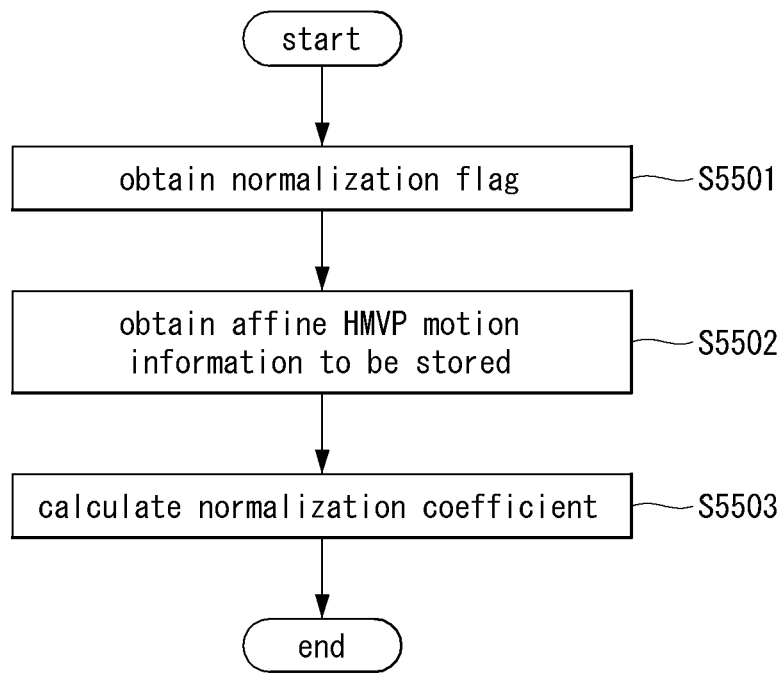

[FIG. 56]
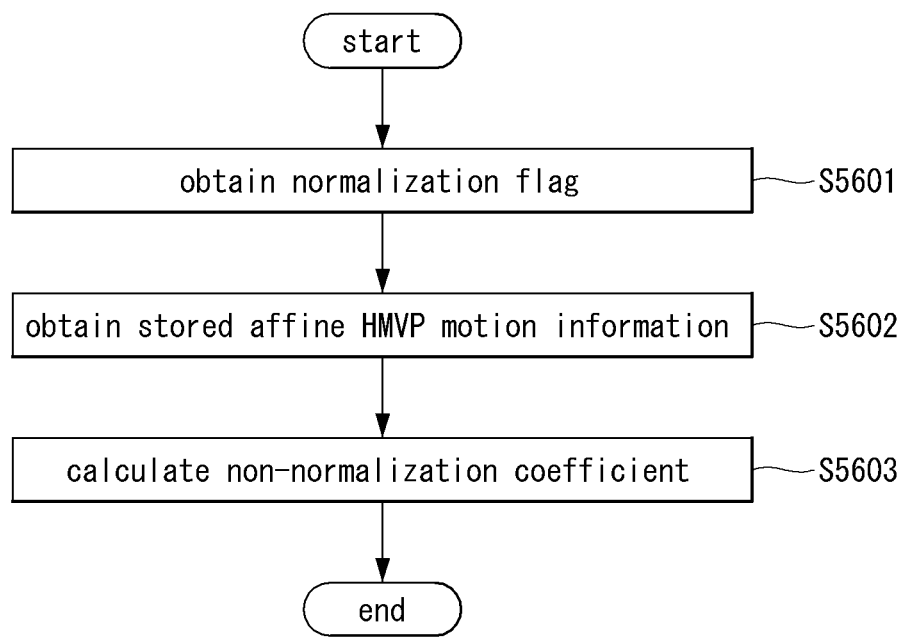

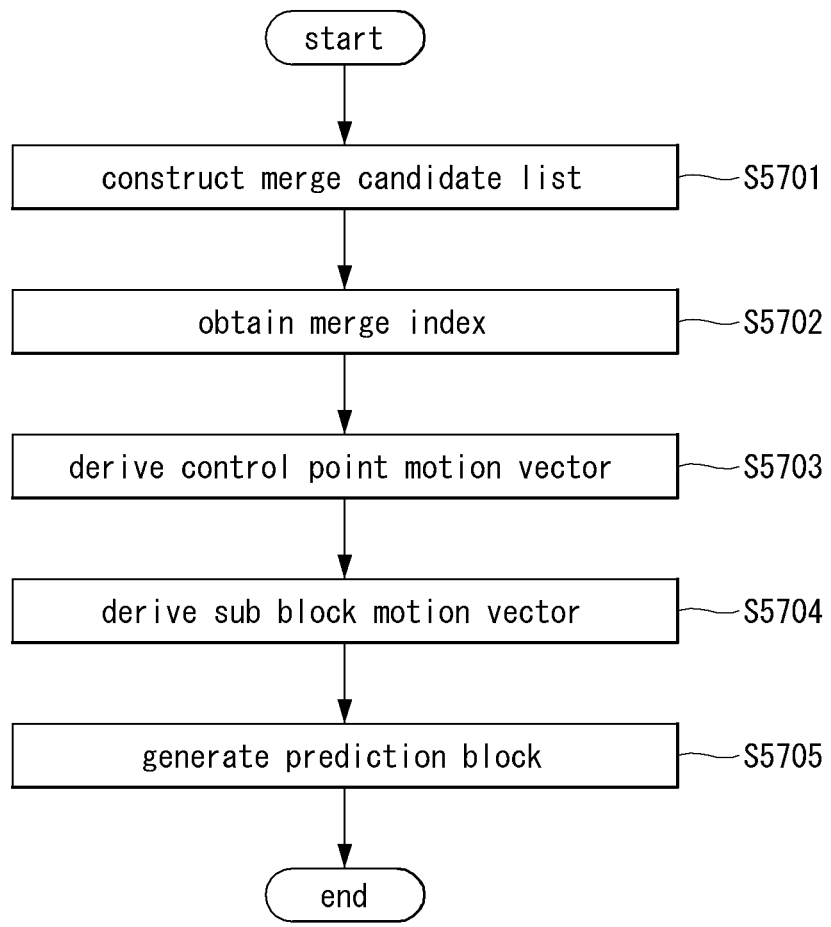
[FIG. 57]

[FIG. 58]
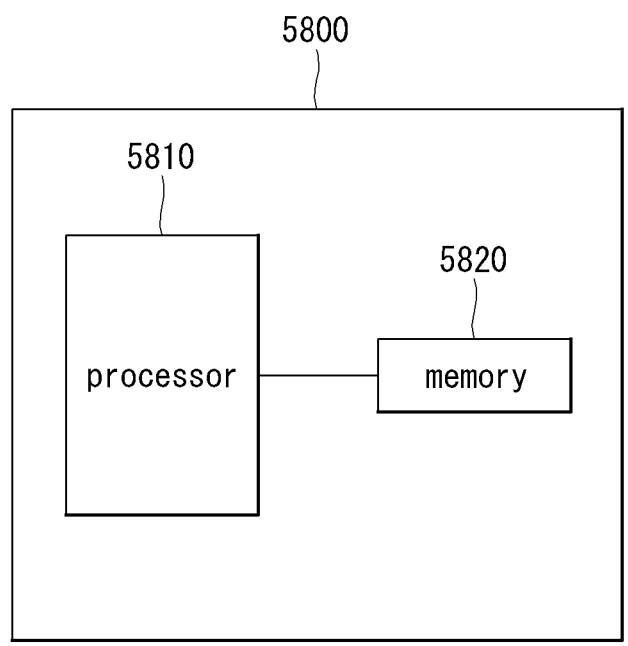

[FIG. 59]
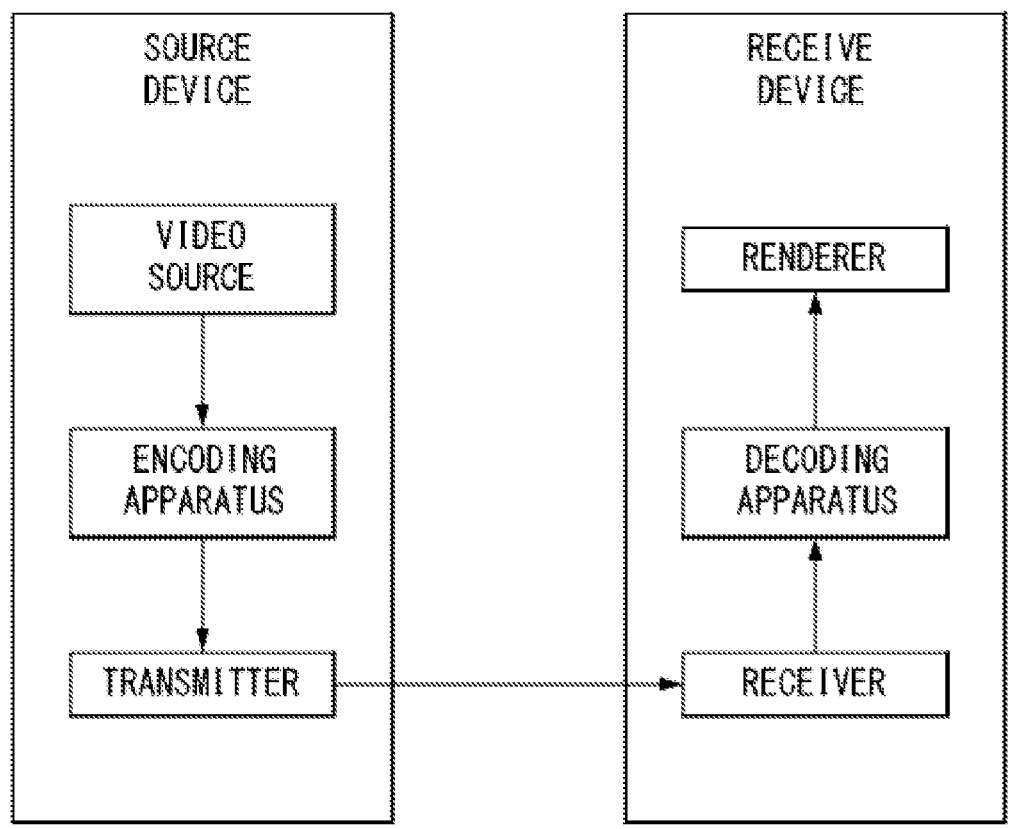

[FIG. 60]
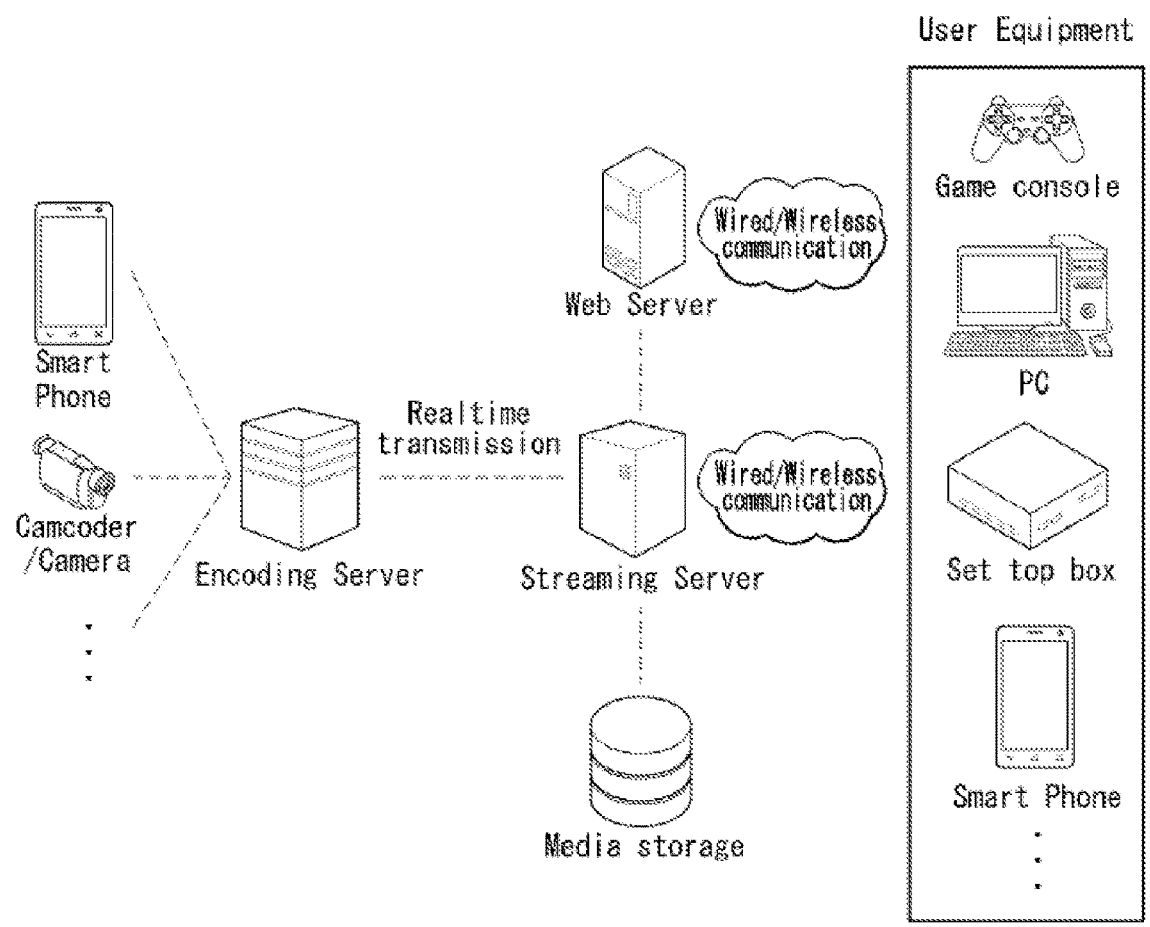

METHOD AND APPARATUS FOR PROCESSING VIDEO SIGNALS USING AFFINE PREDICTION

This application is the National Stage filing under 35 U.S.C. 371 of International Application No. PCT/KR2019/012365, filed on Sep. 23, 2019, which claims the benefit of U.S. Provisional Application No. 62/734,289, filed on Sep. 21, 2018, the contents of which are all hereby incorporated by reference herein in their entirety.

TECHNICAL FIELD

Embodiments of the disclosure relate to methods and devices for processing video signals using affine prediction, and particularly, to methods and devices for processing video signals by performing affine prediction using history-based affine candidates.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DETAILED DESCRIPTION OF THE DISCLOSURE

Technical Problem

Embodiments of the disclosure aim to propose a history-based affine HMVP candidate that may be inserted into a candidate list in performing affine prediction.

Objects of the disclosure are not limited to the foregoing, and other unmentioned objects would be apparent to one of ordinary skill in the art from the following description.

Technical Solution

According to an embodiment of the disclosure, a method for processing a video signal using affine prediction comprises constructing a merge candidate list of a current block based on motion information for a neighboring block when the affine prediction applies to the current block, obtaining a merge index indicating a merge candidate applied to the current block in the merge candidate list, deriving a motion vector for a plurality of control points of the current block using motion information for a merge candidate indicated by the merge index, deriving a motion vector of each of a plurality of sub blocks included in the current block using the motion vector of the control points, and generating a prediction block of the current block using the motion vector of each of the sub blocks, wherein the constructed merge candidate list includes an affine history-based merge candidate (HMVP).

Preferably, configuring the merge candidate list may include adding the affine HMVP from an affine HMVP list including motion information for a block coded in a previously coded affine mode.

Preferably, configuring the merge candidate list may include adding motion information for a neighboring block coded in an affine mode among neighboring blocks of the current block to the merge candidate list, adding a combination of motion information for the neighboring blocks of the current block to the merge candidate list, and adding the affine HMVP from an affine HMVP list including motion information for a block coded in a previously coded affine mode.

Preferably, the affine HMVP may be a candidate determined based on a predefined order among candidates included in the affine HMVP list.

Preferably, the affine HMVP list may include motion information on which normalization is performed based on a width and height of a block coded in an affine mode on a motion vector of a control point of a block coded in the affine mode.

Preferably, the method may further comprise obtaining a flag indicating whether to apply the normalization. The flag may be signaled in a unit of a sequence, a picture, a slice, a coding tree unit, or a coding unit.

According to another embodiment of the disclosure, a device for processing a video signal using affine prediction comprises a memory storing the video signal and a processor coupled with the memory. The processor may construct a merge candidate list of a current block based on motion information for a neighboring block when the affine prediction applies to the current block, obtains a merge index indicating a merge candidate applied to the current block in the merge candidate list, derive a motion vector for a plurality of control points of the current block using motion information for a merge candidate indicated by the merge index, derive a motion vector of each of a plurality of sub blocks included in the current block using the motion vector of the control points, and generate a prediction block of the current block using the motion vector of each of the sub blocks. The constructed merge candidate list may include an affine history-based merge candidate (HMVP).

Advantageous Effects

According to embodiments of the disclosure, more accurate prediction and enhanced compression performance may be achieved by constructing a merge or AMVP candidate list for affine prediction using history-based affine HMVP candidates.

Effects of the disclosure are not limited to the foregoing, and other unmentioned effects would be apparent to one of ordinary skill in the art from the following description.

DESCRIPTION OF DRAWINGS

In order to help understanding of the disclosure, the accompanying drawings which are included as a part of the Detailed Description provide embodiments of the disclosure and describe the technical features of the disclosure together with the Detailed Description.

FIG. 1 is a schematic block diagram of an encoding apparatus in which encoding of a video/image signal is performed as an embodiment to which the disclosure is applied.

FIG. 2 is a schematic block diagram of a decoding apparatus in which decoding of a video/image signal is performed as an embodiment to which the disclosure is applied.

FIG. 3 is a diagram illustrating an example of a multi-type tree structure to which the disclosure may be applied.

FIG. 4 is a diagram illustrating a signaling mechanism of partitioning information of a quadtree having a nested multi-type tree structure as an embodiment to which the disclosure may be applied.

FIG. 5 is a diagram illustrating a method for splitting a CTU into multiple CUs based on a quadtree and nested multi-type tree structure as an embodiment to which the disclosure may be applied.

FIG. 6 is a diagram illustrating a method for limiting ternary-tree splitting as an embodiment to which the disclosure may be applied.

FIG. 7 is a diagram illustrating redundant partitioning patterns which may occur in binary-tree partitioning and ternary-tree partitioning as an embodiment to which the disclosure may be applied.

FIGS. 8 and 9 are diagrams illustrating an inter prediction based video/image encoding method according to an embodiment of the disclosure and an inter prediction unit in an encoding apparatus according to an embodiment of the disclosure.

FIGS. 10 and 11 are diagrams illustrating an inter prediction based video/image decoding method according to an embodiment of the disclosure and an inter prediction unit in a decoding apparatus according to an embodiment of the disclosure.

FIG. 12 is a diagram for describing a neighbor block used in a merge mode or a skip mode as an embodiment to which the disclosure is applied.

FIG. 13 is a flowchart illustrating a method for configuring a merging candidate list according to an embodiment to which the disclosure is applied.

FIG. 14 is a flowchart illustrating a method for configuring a merging candidate list according to an embodiment to which the disclosure is applied.

FIG. 15 illustrates an example of motion models according to an embodiment of the disclosure.

FIG. 16 illustrates an example of a control point motion vector for an affine motion prediction according to an embodiment of the disclosure.

FIG. 17 illustrates an example of a motion vector for each subblock of a block to which an affine motion prediction according to an embodiment of the disclosure has been applied.

FIG. 18 illustrates an example of neighbor blocks used for an affine motion prediction in an affine merge mode according to an embodiment of the disclosure.

FIG. 19 illustrates an example in which a block on which an affine motion prediction is performed using neighbor blocks to which an affine motion prediction according to an embodiment of the disclosure has been applied.

FIG. 20 is a diagram for describing a method of generating a merge candidate list using peripheral affine coding blocks according to an embodiment of the disclosure.

FIGS. 21 and 22 are diagrams for describing a method of configuring an affine merge candidate list using a neighbor block encoded by an affine prediction according to an embodiment of the disclosure.

FIG. 23 illustrates an example of neighbor blocks used for an affine motion prediction in an affine inter mode according to an embodiment of the disclosure.

FIG. 24 illustrates an example of neighbor blocks used for an affine motion prediction in the affine inter mode according to an embodiment of the disclosure.

FIGS. 25 and 26 are diagrams illustrating a method of deriving motion vector candidates using motion information of neighbor blocks in the affine inter mode according to an embodiment of the disclosure.

FIG. 27 illustrates an example of a method of deriving an affine motion vector field in a subblock unit according to an embodiment of the disclosure.

FIG. 28 illustrates a method of generating a prediction block and a motion vector in an inter prediction to which an affine motion model according to an embodiment of the disclosure has been applied.

FIG. 29 is a diagram illustrating a method of performing a motion compensation based on a motion vector of a control point according to an embodiment of the disclosure.

FIG. 30 is a diagram illustrating a method of performing a motion compensation based on motion vectors of control points in a nonregular block according to an embodiment of the disclosure.

FIG. 31 is a diagram illustrating a method of performing a motion compensation based on motion vectors of control points in a nonregular block according to an embodiment of the disclosure.

FIGS. 32 to 38 are diagrams illustrating a method of performing a motion compensation based on motion vectors of control points in a nonregular block according to an embodiment of the disclosure.

FIG. 39 illustrates an overall coding structure for deriving a motion vector according to an embodiment of the disclosure.

FIG. 40 illustrates an example of an MVD coding structure according to an embodiment of the disclosure.

FIG. 41 illustrates an example of an MVD coding structure according to an embodiment of the disclosure.

FIG. 42 illustrates an example of an MVD coding structure according to an embodiment of the disclosure.

FIG. 43 illustrates an example of an MVD coding structure according to an embodiment of the disclosure.

FIG. 44 illustrates a decoding structure for motion vector prediction according to an embodiment of the disclosure.

FIG. 45 is a view illustrating example merge candidates used for affine prediction according to an embodiment of the disclosure.

FIG. 46 is a view illustrating examples of inherited affine candidates used for affine prediction according to an embodiment of the disclosure.

FIG. 47 illustrates an example lookup table for storing history-based affine candidates according to an embodiment of the disclosure.

FIG. 48 is a flowchart illustrating an example method for constructing a candidate list according to a prediction mode according to an embodiment of the disclosure.

FIG. 49 illustrates an example lookup table storing history-based affine candidates according to an embodiment of the disclosure.

FIG. 50 illustrates an example method for constructing a candidate list used for affine prediction using history-based affine candidates according to an embodiment of the disclosure.

FIG. 51 is a flowchart illustrating an example method for constructing a candidate list in an affine merge mode according to an embodiment of the disclosure.

FIG. 52 is a flowchart illustrating an example method for constructing a candidate list in an affine merge mode according to an embodiment of the disclosure.

FIG. 53 is a view illustrating an example method for constructing an affine merge candidate list according to an embodiment of the disclosure.

FIG. 54 is a view for describing a method for normalizing motion vectors of control points according to an embodiment of the disclosure.

FIGS. 55 and 56 are views illustrating example normalization/denormalization processes for history-based affine candidates according to an embodiment of the disclosure.

FIG. 57 is a flowchart illustrating an example method for processing video signals using affine prediction according to an embodiment of the disclosure.

FIG. 58 is a block diagram illustrating an example device for processing video signals according to an embodiment of the disclosure.

FIG. 59 illustrates a video coding system according to the disclosure.

FIG. 60 is a view illustrating a structure of a content streaming system according to an embodiment of the disclosure.

MODE FOR DISCLOSURE

Hereinafter, preferred embodiments of the disclosure are described in detail with reference to the accompanying drawings. A detailed description to be disclosed along with the accompanying drawings are intended to describe some embodiments of the disclosure and are not intended to describe a sole embodiment of the disclosure. The following detailed description includes more details in order to provide full understanding of the disclosure. However, those skilled in the art will understand that the disclosure may be implemented without such more details.

In some cases, in order to avoid that the concept of the disclosure becomes vague, known structures and devices are omitted or may be shown in a block diagram form based on the core functions of each structure and device.

Although most terms used in the disclosure have been selected from general ones widely used in the art, some terms have been arbitrarily selected by the applicant and their meanings are explained in detail in the following description as needed. Thus, the disclosure should be understood with the intended meanings of the terms rather than their simple names or meanings.

Specific terms used in the following description have been provided to help understanding of the disclosure, and the use of such specific terms may be changed in various forms without departing from the technical sprit of the disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighbor block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighbor block and the current block. The motion information may include a motion vector and a reference picture index. The motion information may further include inter prediction direction (L0 prediction, L1 prediction, Bi prediction) information. In the case of inter prediction, a neighbor block may include a spatial neighbor block within a current picture and a temporal neighbor block within a reference picture. A reference picture including a reference block and a reference picture including a temporal neighbor block may be the same or different. The temporal neighbor block may be referred to as a name called a co-located reference block or a co-located CU (colCU). A reference picture including a temporal neighbor block may be referred to as a co-located picture (colPic). For example, the inter predictor 180 may construct a motion information candidate list based on neighbor blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighbor block as motion information of a current block. In the case of the skip mode, unlike the merge mode, a residual signal may not be transmitted. In the case of a motion vector prediction (MVP) mode, a motion vector of a neighbor block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blu-ray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighbor block or motion information of a temporal neighbor block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighbor block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighbor block and the current block. The motion information may include a motion vector and a reference picture index. The motion information may further include inter prediction direction (L0 prediction, L1 prediction, Bi prediction) information. In the case of inter prediction, a neighbor block may include a spatial neighbor block within a current picture and a temporal neighbor block within a reference picture. For example, the inter predictor 260 may configure a motion information candidate list based on neighbor blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighbor block or motion information of a temporal neighbor block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include an N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the disclosure may be applied.

In an embodiment of the disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree having a nested multi-type tree structure as an embodiment to which the disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtszie (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.
Otherwise (the block is a BTT node or the size of the block is smaller than or equal to the minimum QT size), the block is forced to be split with SPLIT_BT_HOR mode.
Otherwise if a portion of a tree node block exceeds the right picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_VER mode.
Otherwise (the block is a BTT node or the size of the block is smaller than or equal to the minimum QT size), the block is forced to be split with SPLIT_BT_VER mode.

The quadtree coding block structure accompanying the multi-type tree may provide a very flexible block partitioning structure. Due to spitting types supported to the multi-type tree, different splitting patterns may potentially cause the same coding block structure result in some cases. Generation of the redundant splitting patterns is limited to reduce a data mount of partitioning information. This will be described with reference to following drawings.

FIG. 7 is a diagram illustrating redundant partitioning patterns which may occur in binary-tree partitioning and ternary-tree partitioning as an embodiment to which the disclosure may be applied.

As illustrated in FIG. 7, two levels of consecutive binary splits in one direction have the same coding block structure as binary splitting for a center partition after the ternary splitting. In such a case, binary tree splitting (in the given direction) for the center partition of the ternary tree splitting may be limited. The limitation may be applied to CUs of all pictures. When specific splitting is limited, signaling of syntax elements may be modified by reflecting such a limitation case and the number of bits signaled for partitioning may be reduced through the modified signaling. For example, like the example illustrated in FIG. 7, when the binary tree splitting for the center partition of the CU is limited, a syntax element mtt_split_cu_binary_flag indicating whether the splitting is the binary splitting or the ternary splitting may not be signaled and the value may be inferred as 0 by the decoder.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

In the disclosure, a detailed description of the inter prediction method described in FIGS. 1 and 2 above is made and the decoder may be represented as an inter prediction based video/image decoding method of FIG. 10 and an inter-prediction unit in the decoding apparatus of FIG. 11 to be described below. Moreover, the encoder may be represented as an inter prediction based video/image encoding method of FIG. 8 and the inter-prediction unit in the encoding apparatus of FIG. 9 to be described below. In addition, encoded data by FIGS. 8 and 9 may be stored in the form of a bitstream.

The prediction unit of the encoding apparatus/decoding apparatus may derive the predicted sample by performing the inter prediction in a unit of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index.

In this case, in order to reduce an amount of motion information transmitted in the inter-prediction mode, the motion information of the current block may be predicted in a unit of a block, a subblock, or a sample based on a correlation of the motion information between the neighbor block and the current block. The motion information may include the motion vector and the reference picture index. The motion information may further include inter-prediction type (L0 prediction, L1 prediction, Bi prediction, etc.) information.

In the case of applying the inter prediction, the neighbor block may include a spatial neighbor block which is present in the current picture and a temporal neighbor block which is present in the reference picture. A reference picture including the reference block and a reference picture including the temporal neighbor block may be the same as each other or different from each other. The temporal neighbor block may be referred to as a name such as a collocated reference block, a collocated CU (colCU), etc., and the reference picture including the temporal neighbor block may be referred to as a collocated picture (colPic). For example, a motion information candidate list may be configured based on the neighbor blocks of the current block and a flag or index information indicating which candidate is selected (used) may be signaled in order to derive the motion vector and/or reference picture index of the current block.

The inter prediction may be performed based on various prediction modes and for example, in the case of a skip mode and a merge mode, the motion information of the current block may be the same as the motion information of the selected neighbor block. In the case of the skip mode, the residual signal may not be transmitted unlike the merge mode. In the case of a motion vector prediction (MVP) mode, the motion vector of the selected neighbor block may be used as a motion vector predictor and a motion vector difference may be signaled. In this case, the motion vector of the current block may be derived by using a sum of the motion vector predictor and the motion vector difference.

FIGS. 8 and 9 are diagrams illustrating an inter prediction based video/image encoding method according to an embodiment of the disclosure and an inter prediction unit in an encoding apparatus according to an embodiment of the disclosure.

Referring to FIGS. 8 and 9, S801 may be performed by the inter-prediction unit 180 of the encoding apparatus and S802 may be performed by the residual processing unit of the encoding apparatus. Specifically, S802 may be performed the subtraction unit 115 of the encoding apparatus. In S803, prediction information may be derived by the inter-prediction unit 180 and encoded by the entropy encoding unit 190. In S803, residual information may be derived by the residual processing unit and encoded by the entropy encoding unit 190. The residual information is information on the residual samples. The residual information may include information on quantized transform coefficients for the residual samples.

As described above, the residual samples may be derived as transform coefficients by the transform unit 120 of the encoding apparatus and the transform coefficients may be derived as quantized transform coefficients by the quantization unit 130. Information on the quantized transform coefficients may be encoded through a residual coding procedure by the entropy encoding unit 190.

The encoding apparatus performs inter prediction for the current block (S801). The encoding apparatus may derive the inter prediction mode and the motion information of the current block and generate predicted samples of the current block. Here, an inter prediction mode determining procedure, a motion information deriving procedure, and a generation procedure of the prediction samples may be simultaneously performed and any one procedure may be performed earlier than other procedures. For example, the inter-prediction unit 180 of the encoding apparatus may include a prediction mode determination unit 181, a motion information derivation unit 182, and a predicted sample derivation unit 183, and the prediction mode determination unit 181 may determine the prediction mode for the current block, the motion information derivation unit 182 may derive the motion information of the current block, and the predicted sample derivation unit 183 may derive motion samples of the current block.

For example, the inter-prediction unit 180 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S802). The encoding apparatus may derive the residual samples by comparing original samples of the current block and the predicted samples.

The encoding apparatus encodes image information including prediction information and residual information (S803). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information.

Further, the information on the motion information may include information indicating whether to apply L0 prediction, L1 prediction, or bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstructed picture (or reconstructed samples or reconstructed blocks) in the memory and utilize the reconstructed picture as the reference picture. The in-loop filtering procedure may be further applied to the reconstructed picture as described above.

FIGS. 10 and 11 are diagrams illustrating an inter prediction based video/image decoding method according to an embodiment of the disclosure and an inter prediction unit in a decoding apparatus according to an embodiment of the disclosure.

Referring to FIGS. 10 and 11, the decoding apparatus may perform an operation corresponding to the operation performed by the encoding apparatus. The decoding apparatus may perform the prediction for the current block based on received prediction information and derive the prediction samples.

S1001 to S1003 may be performed by the inter-prediction unit 260 of the decoding apparatus and the residual information of S1004 may be obtained from the bitstream by the entropy decoding unit 210 of the decoding apparatus. The residual processing unit of the decoding apparatus may derive the residual samples for the current block based on the residual information. Specifically, the dequantization unit 220 of the residual processing unit may derive transform coefficients by performing dequantization based on quantized transform coefficients derived based on the residual information and the inverse transform unit 230 of the residual processing unit may derive the residual samples for the current block by performing inverse transform for the transform coefficients. S1005 may be performed by the addition unit 235 or the reconstruction unit of the decoding apparatus.

Specifically, the decoding apparatus may determine the prediction mode for the current block based on the received prediction information (S1001). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S1002). For example, when the skip mode or the merge mode is applied to the current block, the decoding apparatus may configure the merging candidate list to be described below and select one merge candidate among the merge candidates included in the merging candidate list. The selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. The selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration as described below and, in this case, the motion information of the current block may be derived according to a procedure disclosed in the prediction mode to be described below. In this case, the candidate list configuration may be omitted.

The decoding apparatus may generate the predicted samples for the current block based on the motion information of the current block (S1003). In this case, the reference picture may be derived based on the reference picture index of the current block and the predicted samples of the current block may be derived by using the samples of the reference block indicated by the motion vector of the current block on the reference picture. In this case, as described below, in some cases, a prediction sample filtering procedure for all or some of the prediction samples of the current block may be further performed.

For example, the inter-prediction unit 260 of the decoding apparatus may include a prediction mode determination unit 261, a motion information derivation unit 262, and a predicted sample derivation unit 263, and the prediction mode determination unit 261 may determine the prediction mode for the current block based on the received prediction mode information, the motion information derivation unit 262 may derive the motion information (the motion vector and/or reference picture index) of the current block based on the information on the received motion information, and the predicted sample derivation unit 263 may derive the predicted samples of the current block.

The decoding apparatus generates the residual samples for the current block based on the received residual information (S1004). The decoding apparatus may generate the reconstructed samples for the current block based on the predicted samples and the residual samples and generate the reconstructed picture based on the generated reconstructed samples (S1005). Thereafter, the in-loop filtering procedure may be further applied to the reconstructed picture as described above.

As described above, the inter prediction procedure may include an inter prediction mode determining step, a motion information deriving step depending on the determined prediction mode, and a prediction performing (predicted sample generating) step based on the derived motion information.

Determination of Inter Prediction Mode

Various inter prediction modes may be used for predicting the current block in the picture. For example, various modes including a merge mode, a skip mode, an MVP mode, an affine mode, and the like may be used. A decoder side motion vector refinement (DMVR) mode, an adaptive motion vector resolution (AMVR) mode, etc., may be further used as an ancillary mode. The affine mode may be referred to as an affine motion prediction mode. The MVP mode may be referred to as an advanced motion vector prediction (AMVP) mode.

The prediction mode information indicating the inter prediction mode of the current block may be signaled from the encoding apparatus to the decoding apparatus. The prediction mode information may be included in a bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags.

For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may be configured as one candidate of the merging candidate list or MVP candidate list as described below.

Derivation of Motion Information According to Inter Prediction Mode

The inter prediction may be performed by using the motion information of the current block. The encoding apparatus may derive optimal motion information for the current block through a motion estimation procedure. For example, the encoding apparatus may search a similar reference block having a high correlation in a unit of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on an SAD between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

Merge Mode and Skip Mode

FIG. 12 is a diagram for describing a neighbor block used in a merge mode or a skip mode as an embodiment to which the disclosure is applied.

When the merge mode is applied, the motion information of the current prediction block is not directly transmitted and the motion information of the current prediction block is derived by using the motion information of a neighboring prediction block. Accordingly, flag information indicating that the merge mode is used and a merge index indicating which neighboring prediction block is used are transmitted to indicate the motion information of the current prediction block.

According to an embodiment of the disclosure,

The encoder may search a merge candidate block used for deriving the motion information of the current prediction block in order to perform the merge mode. For example, up to five merge candidate blocks may be used, but the disclosure is not limited thereto. In addition, the maximum number of merge candidate blocks may be transmitted in a slider header (or tile group header) and the disclosure is not limited thereto. After finding the merge candidate blocks, the encoder may generate the merging candidate list and selects a merge candidate block having the smallest cost among the merge candidate blocks as a final merge candidate block.

The disclosure provides various embodiments for the merge candidate block constituting the merging candidate list.

As the merging candidate list, for example, five merge candidate blocks may be used. For example, four spatial merge candidates and one temporal merge candidate may be used. As a specific example, in the case of the spatial merge candidate, the blocks illustrated in FIG. 12 may be used as the spatial merge candidate.

FIG. 13 is a flowchart illustrating a method for configuring a merging candidate list according to an embodiment to which the disclosure is applied.

Referring to FIG. 13, a coding apparatus (encoder/decoder) inserts the spatial merge candidates derived by searching the spatial neighbor blocks of the current block into the merging candidate list (S1301). For example, the spatial neighbor blocks may include a bottom left corner neighbor block, a left neighbor bock, a top right corner neighbor block, a top neighbor block, and a top left corner neighbor block of the current block. However, this is an example and additional neighbor blocks including a right neighbor block, a bottom neighbor block, a bottom right neighbor block, and the like may be further used as the spatial neighbor blocks in addition to the spatial neighbor blocks. The coding apparatus may derive available blocks by searching the spatial neighbor blocks based on a priority and derive the motion information of the detected blocks as the spatial merge candidates. For example, the encoder and decoder may search five blocks illustrated in FIG. 12 in the order of A1, B1, B0, A0, and B2 and sequentially index the available candidates and configure the indexed candidates as the merging candidate list.

The coding apparatus inserts the temporal merge candidate derived by searching the temporal neighbor block of the current block into the merging candidate list (S1302). The temporal neighbor block may be positioned on the reference picture which is a different picture from the current picture at which the current block is positioned. The reference picture at which the temporal neighbor block is positioned may be referred to as a collocated picture or a col picture. The temporal neighbor block may be searched in the order of a bottom right corner neighbor block and a bottom right center block of a co-located block for the current block on the col picture.

Meanwhile, when motion data compression is applied, specific motion information may be stored as representative motion information in the col picture for each predetermined storage unit. In this case, motion information for all blocks in the predetermined storage unit need not be stored, and as a result, a motion data compression effect may be obtained. In this case, the predetermined storage unit may be predetermined for each 16×16 sample unit or 8×8 sample unit or size information for the predetermined storage unit may be signaled from the encoder to the decoder. When the motion data compression is applied, the motion information of the temporal neighbor block may be replaced with the representative motion information of the predetermined storage unit at which the temporal neighbor block is positioned.

In other words, in this case, in terms of implementation, the temporal merge candidate may be derived based on motion information of a prediction block covering a location subject to arithmetic right shift and then arithmetic left shift by a predetermined value based on a coordinate (top left sample position) of the temporal neighbor block other than a prediction block positioned on the coordinate of the temporal neighbor block. For example, when the predetermined storage unit is a 2n×2n sample unit, if the coordinate of the temporal neighbor block is (xTnb, yTnb), motion information of a prediction block positioned at ((xTnb>>n)<<n), (yTnb>>n)<<n)) which is a modified location may be used for the temporal merge candidate.

Specifically, for example, when the predetermined storage unit is a 16×16 sample unit, if the coordinate of the temporal neighbor block is (xTnb, yTnb), motion information of a prediction block positioned at ((xTnb>>4)<<4), (yTnb>>4)<<4)) which is a modified location may be used for the temporal merge candidate. Alternatively, for example, when the predetermined storage unit is an 8×8 sample unit, if the coordinate of the temporal neighbor block is (xTnb, yTnb), motion information of a prediction block positioned at ((xTnb>>3)<<3), (yTnb>>3)<<3)) which is a modified location may be used for the temporal merge candidate.

The coding apparatus may check whether the current number of merge candidates is smaller than the maximum number of merge candidates (S1303). The maximum number of merge candidates may be predefined or signaled from the encoder to the decoder. For example, the encoder may generate information on the maximum number of merge candidates and encode the generated information and transfer the encoded information to the decoder in the form of a bitstream. When the maximum number of merge candidates is completely filled, a subsequent candidate addition process may not be performed.

As the checking result, when the current number of merge candidates is smaller than the maximum number of merge candidates, the coding apparatus inserts additional merge candidates into the merging candidate list (S1304). The additional merge candidates may include, for example, ATMVP, a combined bi-predictive merge candidate (when a slice type of current slice is type B) and/or a zero-vector merge candidate.

As the checking result, when the current number of merge candidates is not smaller than the maximum number of merge candidates, the coding apparatus may terminate the configuration of the merging candidate list. In this case, the encoder may select an optimal merge candidate among the merge candidates constituting the merging candidate list based on rate-distortion (RD) cost and signal selection information (e.g., merge index) indicating the selected merge candidate to the decoder. The decoder may select the optimal merge candidate based on the merging candidate list and the selection information.

The motion information of the selected merge candidate may be used as the motion information of the current block and the predicted samples of the current block may be derived based on the motion information of the current block as described above. The encoder may derive the residual samples of the current block based on the predicted samples and signal the residual information for the residual samples to the decoder. The decoder may generate the reconstructed samples based on the residual samples derived based on the residual information and the predicted samples and generate the reconstructed picture based on the generated reconstructed samples as described above.

When the skip mode is applied, the motion information of the current block may be derived by the same method as the case where the merge mode is applied as above. However, when the skip mode is applied, a residual signal for the corresponding block is omitted, and as a result, the predicted samples may be directly used as the reconstructed samples.

MVP Mode

FIG. 14 is a flowchart illustrating a method for configuring a merging candidate list according to an embodiment to which the disclosure is applied.

When the motion vector prediction (MVP) mode is applied, a motion vector predictor (mvp) candidate list may be generated by using the motion vector of the reconstructed spatial neighbor block (e.g., may be the neighbor block described in FIG. 12 above) and/or the motion vector corresponding to the temporal neighbor block (or Col block). In other words, the motion vector of the reconstructed spatial neighbor block and/or the motion vector corresponding to the temporal neighbor block may be used as the motion vector predictor candidate.

The information on the prediction may include selection information (e.g., an MVP flag or MVP index) indicating an optimal motion vector predictor candidate selected among the motion vector predictor candidates included in the list. In this case, the predictor may select the motion vector predictor of the current block among the motion vector predictor candidates included in the motion vector candidate list by using the selected information. The predictor of the encoding apparatus may obtain a motion vector difference (MVD) between the motion vector and the motion vector predictor of the current block and encode the obtained MVD and output the encoded MVD in the form of the bitstream. In other words, the MVD may be obtained by a value obtained by subtracting the motion vector predictor from the motion vector of the current block. In this case, the predictor of the decoding apparatus may obtain the motion vector difference included in the information on the prediction and derive the motion vector of the current block by adding the motion vector difference and the motion vector predictor. The predictor of the decoding apparatus may obtain or derive the reference picture index indicating the reference picture from the information on the prediction. For example, the motion vector predictor candidate list may be configured as illustrated in FIG. 14.

Affine Motion Prediction

FIG. 15 illustrates an example of motion models according to an embodiment of the disclosure.

A conventional image compression technology (e.g., high efficiency video coding (HEVC)) uses one motion vector in order to represent a motion of a coding block. Although an optimum motion in a block unit may be represented for each block in a method using one motion vector, the optimum motion may not be actually an optimum motion of each pixel. Accordingly, if optimum motion vector is determined in a pixel unit, coding efficiency will be increased. Therefore, an embodiment of the disclosure describes a motion prediction method of encoding or decoding a video signal using a multi-motion model. In particular, a motion vector may be represented in each pixel unit or subblock unit of a block using motion vectors at two to four control points. A prediction scheme using such motion vectors of a plurality of control points may be denoted as an affine motion prediction, an affine prediction, etc.

An affine motion model according to an embodiment of the disclosure may represent four motion models, such as those illustrated in FIG. 15. An affine motion model that represents three motions (translation, scale, and rotate) among motions capable of representing the Affine motion model is denoted as a similarity (or simplified) affine motion model. In describing embodiments of the disclosure, the similarity (or simplified) affine motion model is basically described for convenience of description, but the disclosure is not limited thereto.

FIG. 16 illustrates an example of a control point motion vector for an affine motion prediction according to an embodiment of the disclosure.

As in FIG. 16, an affine motion prediction may determine motion vectors at pixel positions (or subblocks) included in a block using a pair of two control point motion vectors (CPMV) v_0 and v_1. In this case, a set of the motion vectors may be denoted as an affine motion vector field (MVF). In this case, the affine motion vector field may be determined using Equation 1 below.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases}$$ [Equation 1]

In Equation 1, v_0(v_0={v_0x, v_0y}) indicates a motion vector CPMV0 at a first control point at the top left position of a current block 1300. v_1(v_1={v_1x, v_1y}) indicates a motion vector CPMV1 at a second control point at the top right position of the current block 1300. Furthermore, w indicates the width of the current block 1300. v(v={v_x, v_y}) indicates a motion vector at a {x,y} position. A motion vector in a subblock (or pixel) unit may be derived using Equation 1. In an embodiment, motion vector precision may be rounded as 1/16 precision.

FIG. 17 illustrates an example of a motion vector for each subblock of a block to which an affine motion prediction according to an embodiment of the disclosure has been applied.

Referring to FIG. 17, in a coding or decoding process, an affine motion vector field (MVF) may be determined in a pixel unit or block unit. That is, in an affine motion prediction, a motion vector of a current block may be derived in a pixel unit or a subblock unit.

If an affine motion vector field is determined in the pixel unit, a motion vector may be obtained based on each pixel value. If an affine motion vector field is determined in the block unit, a motion vector of a block may be obtained based on a center pixel value of the corresponding block. In the disclosure, as in FIG. 17, a case where an affine motion vector field (MVF) is determined in a 4*4 block unit is assumed. However, this is for convenience of description and does not limit an embodiment of the disclosure. FIG. 17 illustrates an example of a case where a coding block is composed of 16*16 samples and an affine motion vector field (MVF) is determined in a block unit of a 4*4 size.

An affine motion prediction may include an affine merge mode (or AF_MERGE) and an affine inter mode (or AF_INTER). The AF_INTER mode may include an AF_4_INTER mode using a four-parameter-based motion model and an AF_6_INTER mode using a six-parameter-based motion model.

Affine Merge Mode

AF_MERGE determines control point motion vector (CPMV)s according to the affine motion model of the neighbouring block coded as the affine motion prediction. An affine coded neighbouring block in a search order may be used for AF_MERGE. A current block can be coded as AF_MERGE when one or more of the neighbouring blocks are coded as affine motion prediction.

That is, if the affine merge mode is applied, CPMVs of a current block may be derived using CPMVs of a neighbor block. In this case, the CPMVs of the neighbor block may be used as the CPMVs of the current block without any change. The CPMVs of the neighbor block are modified based on the size of the neighbor block and the size of the current block and may be used as the CPMVs of the current block.

FIG. 18 illustrates an example of neighbor blocks used in an affine motion prediction in an affine merge mode according to an embodiment of the disclosure.

In the affine merge (AF_MERGE) mode, the encoder may perform encoding as in the following process.

Step-1: Scan neighbor blocks A to E 1810, 1820, 1830, 1840, and 1850 of a current coding block 1800 in the alphabetical sequence. A block first coded in the affine prediction mode according to the scanning sequence is determined as a candidate block of affine merge (AF_MERGE)

Step-2: Determine an affine motion model using a control point motion vector (CPMV) of a determined candidate block Step-3: Determine a control point motion vector (CPMV) of the current block 1800 according to the affine motion model of the candidate block, and determine the MVF of the current block 1800.

FIG. 19 illustrates an example in which a block on which an affine motion prediction is performed using neighbor blocks to which an affine motion prediction according to an embodiment of the disclosure has been applied.

For example, as in FIG. 19, if a block A 1920 is coded in an affine mode, after the block A 1920 is determined as a candidate block, an affine motion model may be derived using control point motion vectors (CPMV) (e.g., v2 and v3) of the block A 1920, and control point motion vectors (CPMV) v0 and v1 of a current block 1900 may be determined. The affine motion vector field (MVF) of the current block 1900 may be determined based on the control point motion vectors (CPMV) of the current block 1900, and encoding may be performed.

FIG. 20 is a diagram for describing a method of generating a merge candidate list using peripheral affine coding blocks according to an embodiment of the disclosure.

Referring to FIG. 20, if a CPMV pair is determined using an affine merge candidate, candidates, such as those illustrated in FIG. 20, may be used. In FIG. 20, a case where the scan sequence of a candidate list is set as A, B, C, D, and E is assumed. However, the disclosure is not limited thereto, and the scan sequence may be previously set in various sequences.

In an embodiment, if the number of candidates (hereinafter may be denoted as affine candidates) coded in an affine mode (or affine prediction) available in neighbor blocks (i.e., A, B, C, D, and E) is 0, an affine merge mode of a current block may be skipped. If the number of available affine candidates is one (e.g., A), a motion model of a corresponding candidate may be used to derive control point motion vectors CPMV_0 and CPMV_1 of a current block. In this case, an index indicative of the corresponding candidate may not be necessary (or coded). If the number of available affine candidates is two or more, two candidates in the scanning sequence may be configured as a candidate list for AF_MERGE. In this case, candidate selection information, such as an index indicative of a candidate selected within the candidate list, may be signaled. The selection information may be a flag or index information, and may be denoted as AF_MERGE_flag, AF_merge_idx, etc.

In an embodiment of the disclosure, motion compensation for the current block may be performed based on a size of a sub-block. In this case, a sub-block size of the affine block (current block) is derived. If both width and height of the sub-block are larger than 4 luma samples, a motion vectors for each sub-block is derived and DCT-IF based motion compensation (1/16 pel for luma and 1/32 for chroma) can be invoked for the sub-block. Otherwise, enhanced bi-linear interpolation filter based motion compensation is invoked for the whole affine block.

In an embodiment of the disclosure, when merge/skip flag is true and both width and height for the CU are larger than or equal to 8, an affine flag in CU level is signalled in the bitstream to indicate whether affine merge mode is used. And when the CU is coded as AF_MERGE, the merge candidate index with maximum value 5 is signalled for specifying which motion information candidate in the affine merge candidate list is used for the CUA FIGS. 21 and 22 are diagrams for describing a method of configuring an affine merge candidate list using a neighbor block encoded by an affine prediction according to an embodiment of the disclosure.

Referring to FIG. 21, the affine merge candidate list is constructed as following steps.

1) Insert Model Based Affine Candidates

Model based affine candidate means that the candidate is derived from the valid neighbor reconstructed block coded in the affine mode. As shown in FIG. 21, the scan order for the candidate block is from left (A), above (b), above right (C), left bottom (D) to above left (E).

If the neighbour left bottom block A is coded in 6-parameter affine mode, the motion vectors v_4, v_5, and v_6 of the top left corner, above right corner and left bottom corner of the CU which contains the block A are obtained. And the motion vectors v_0, v_1, and v_2 of the top left corner on the current CU is calculated according to v_4, v_5, and v_6 by 6-parameter affine model.

If the neighbour left bottom block A is coded in 4-parameter affine mode, the motion vectors v_4 and v_5 of the top left corner and above right corner of the CU which contains the block A are obtained. And the motion vectors v_0 and v_1 of the top left corner on the current CU is calculated according to v_4 and v_5 by 4-parameter affine model.

2) Insert Control Point Based Affine Candidates

Referring to FIG. 21, control points based candidate means the candidate is constructed by combining the neighbor motion information of each control point.

The motion information for the control points is derived firstly from the specified spatial neighbors and temporal neighbor shown in FIG. 21. CP_k (k=1, 2, 3, 4) represents the k-th control point. A, B, C, D, E, F and G are spatial positions for predicting CP_k (k=1, 2, 3); H is temporal position for predicting CP4.

The coordinates of CP_1, CP_2, CP_3 and CP_4 is (0, 0), (W, 0), (H, 0) and (W, H), respectively, where W and H are the width and height of current block.

The motion information of each control point is obtained according to the following priority order.

For CP_1, the checking priority is A→B→C, A is used if it is available. Otherwise, if B is available, B is used. If both A and B are unavailable, C is used. If all the three candidates are unavailable, the motion information of CP1 cannot be obtained.

For CP_2, the checking priority is E→D;
For CP_3, the checking priority is G→F;
For CP_4, H is used.

Secondly, the combinations of controls points are used to construct the motion model.

Motion vectors of two control points are needed to compute the transform parameters in 4-parameter affine model. The two control points can be selected from one of the following six combinations ({CP_1, CP_4}, {CP_2, CP_3}, {CP_1, CP_2}, {CP_2, CP_4}, {CP_1, CP_3}, {CP_3, CP_4}). For example, use the CP_1 and CP_2 control points to construct 4-parameter affine motion model, denoted as Affine (CP_1, CP_2).

Motion vectors of three control points are needed to compute the transform parameters in 6-parameter affine model. The three control points can be selected from one of the following four combinations ({CP_1, CP_2, CP_4}, {CP_1, CP_2, CP_3}, {CP_2, CP_3, CP_4}, {CP_1, CP_3, CP_4}). For example, use CP_1, CP_2 and CPv3 control points to construct 6-parameter affine motion model, denoted as Affine (CP_1, CP_2, CP_3).

Also, in an embodiment of the disclosure, in the affine merge mode, if the affine merge candidate exists, it can be always considered as six-parameter affine mode.

Affine Inter Mode

FIG. 23 illustrates an example of neighbor blocks used in an affine motion prediction in an affine inter mode according to an embodiment of the disclosure.

Referring to FIG. 23, an affine motion prediction may include an affine merge mode (or AF_MERGE) and an affine inter mode (or AF_INTER). In the affine inter mode (AF_INTER), after two control point motion vector prediction (CPMVP) and CPMV are determined, a control point motion vector difference CPMVD corresponding to a difference may be transmitted from the encoder to the decoder. A detained process of encoding the affine inter mode AF_INTER may be as follows.

Step-1: Determine two CPMVP pair candidates

Step-1.1: Determine a maximum of twelfth CPMVP candidate combinations (refer to Equation 2 below)

$$\{(v_0,v_1,v_2)|v_0=\{v_A,v_B,v_C\},v_1=\{v_D,v_E\},v_2=\{v_F,v_G\}\} \quad \text{[Equation 2]}$$

In Equation 2, v_0 indicates a motion vector CPMV0 at a top left control point 2310 of a current block 2300. v_1 indicates a motion vector CPMV1 at the top right control point 2311 of the current block 2300. v_2 indicates a motion vector CPMV2 at the bottom left control point 2312 of the current block 2300. v_A indicates the motion vector of a neighbor block A 2320 neighboring the top left of the top left control point 2310 of the current block 2300. v_B indicates the motion vector of a neighbor block B 2322 neighboring the top of the top left control point 2310 of the current block 2300. vC indicates the motion vector of a neighbor block C 2324 neighboring the left of the top left control point 2310 of the current block 2300, v_D indicates the motion vector of a neighbor block D 2326 neighboring the top of the top right control point 2311 of the current block 2300. v_E indicates the motion vector of a neighbor block E 2328 neighboring the top right of the top right control point 2311 of the current block 2300. v_F indicates the motion vector of a neighbor block F 2330 neighboring the left of the bottom left control point 2312 of the current block 2300. v_G indicates the motion vector of a neighbor block G 2332 neighboring the left of the bottom left control point 2312 of the current block 2300.

Step-1.2: Use top two candidates sorted based on a smaller difference value (DV) in a CPMVP candidate combination (refer to Equation 3 below)

$$DV=|(v_{1x}-v_{0x})*h-(v_{2y}-v_{0y})*w|+|(v_{1y}-v_{0y})* h+(v_{2x}-v_{0x})*w| \quad \text{[Equation 3]}$$

v_0x indicates the x-axis element of the motion vector V0 or CPMV0 at the top left control point 2310 of the current block 2300. v_1x indicates the x-axis element of the motion vector V1 or CPMV1 at the top right control point 2311 of the current block 2300. v_2x indicates the x-axis element of the motion vector V_2 or CPMV_2 at the bottom left control point 2312 of the current block 2300. v_0y indicates the y-axis element of the motion vector V_0 or CPMV_0 at the top left control point 2310 of the current block 2300. v_1y indicates the y-axis element of the motion vector V_1 or CPMV_1 at the top right control point 2311 of the current block 2300. v_2y indicates the y-axis element of the motion vector V_2 or CPMV_2 at the bottom left control point 2312 of the current block 2300. w indicates the width of the current block 2300. h indicates the height of the current block 2300.

Step-2: Use an AMVP candidate list when a control point motion vector predictor (CPMVP) pair candidate is smaller than 2

Step-3: Determine a control point motion vector predictor (CPMVP) of each of two candidates, and optimally selects a candidate and CPMV having a smaller value as by comparing RD costs Step-4: Transmit an index corresponding to the optimum candidate and a control point motion vector difference (CPMVD)

In an embodiment of the disclosure, in AF_INTER, the construction process of the CPMVP candidate is provided. Same as AMVP, the number of candidate is two and the index indicating the position of candidate list is signaled.

The construction process of a CPMVP candidate list is as follows:

1) Scan the neighbouring blocks to check whether it is coded as the affine motion prediction or not. If the scanned block is coded as the affine prediction, derive the motion vector pair of current block from the affine motion model of the scanned neighbouring block until the number of candidate is two.

2) If the number of candidate is less than two, perform the candidate construction process. Also, in an embodiment of the disclosure, a four-parameter (two-control-point) affine inter mode is used to predict the content with the motion model of zoom-in/out and rotation. As shown in FIG. 16, the affine motion field of the block is described by two-control-point motion vectors.

The motion vector field (MVF) of a block is described by the previously described equation 1.

In the prior art, the advanced motion vector prediction (AMVP) mode needs to signal a motion vector prediction (MVP) index and motion vector differences (MVDs). When the AMVP mode is applied in this disclosure, an affine_flag is signaled to indicate whether the affine prediction is used. If the affine prediction is applied, the syntax of inter_dir, ref_idx, mvp_index, and two MVDs (mvd_x and mvd_y) are signaled. An affine MVP pair candidate list containing two affine MVP pairs is generated. The signaled mvp_index is used to select one of them. The affine MVP pair is generated by two kinds of affine MVP candidates. One is the spatial inherited affine candidate, and the other is the corner derived affine candidate. If the neighbor CUs are coded in the affine mode, the spatial inherited affine candidates can be generated. The affine motion model of the neighbor affine coded block is used to generate the motion vectors of the two-control point MVP pair. The MVs of the two-control point MVP pair of the spatial inherited affine candidate are derived by using the following equations.

$$V_{0x}=V_{B0x}+(V_{B2\_x}-V_{B0x})*(\text{posCurCU\_Y-pos-RefCU\_Y})/\text{RefCU\_height}+(V_{B1x}-V_{B0x})*(\text{posCur-CU\_X-posRefCU\_X})/\text{RefCU\_width} \quad \text{[Equation 4]}$$

$$V_{0y}=V_{B0y}+(V_{B2\_y}-V_{B0y})*(\text{posCurCU\_Y-pos-RefCU\_Y})/\text{RefCU\_height}+(V_{B1y}-V_{B0y})*(\text{posCur-CU\_X-posRefCU\_X})/\text{RefCU\_width} \quad \text{[Equation 5]}$$

Where V_B0, V_B1, and V_B2 can be replaced by the top-left MV, top-right MV, and bottom-left MV of any reference/neighbor CU, (posCurCU_X, posCurCU_Y) is the position of the top-left sample of the current CU relative to the top-left sample of the frame, (posRefCU_X, posRefCU_Y) is the position of the top-left sample of the reference/neighbor CU relative to the top-left sample of the frame.

$$V_{1x} = V_{B0x} + (V_{B1x} - V_{B0x}) * CU\_width/RefCU\_width \quad [\text{Equation 6}]$$

$$V_{1y} = V_{B0y} + (V_{B1y} - V_{B0y}) * CU\_width/RefCU\_width \quad [\text{Equation 7}]$$

FIG. 24 illustrates an example of neighbor blocks used for an affine motion prediction in the affine inter mode according to an embodiment of the disclosure.

Referring to FIG. 24, if the number of the MVP pairs is smaller than 2, the corner derived affine candidate is used. The neighbor motion vectors, as shown in FIG. 24, are used to derive the affine MVP pair. For the first corner derived affine candidate, the first available MV in set A (A0, A1, and A2) and first available MV in set B (B0 and B1) are used to construct the first MVP pair. For the second corner derived affine candidate, the first available MV in set A and first available MV in set C (C0 and C1) are used to calculate the MV of top-right control point. The first available MV in set A and the calculated top-right control point MV are the second MVP pair.

In an embodiment of the disclosure, two candidate sets with two (three) candidates {mv_0, mv_1} ({mv_0, mv_1, mv_2) are used to predict two (three) control points of the affine motion model. Given motion vector difference vectors, mvd_0, mvd_1, mvd_2, the control points are calculated by using the following equations.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0 \quad [\text{Equation 8}]$$

FIGS. 25 and 26 are diagrams illustrating a method of deriving motion vector candidates using motion information of neighbor blocks in the affine inter mode according to an embodiment of the disclosure.

The affine candidate list is appended sequentially by extending affine motion from spatial neighbor blocks (extrapolated affine candidates), the combination of motion vectors from spatial neighbor blocks (virtual affine candidates) and HEVC motion vector prediction (MVP) candidates until there are two affine MVPs in the candidate list. The candidate sets are constructed as follows:

1. Up to two different affine MV predictor sets are derived from affine motion of the neighbor blocks. Neighboring blocks A0, A1, B0, B1, and B2 as shown in FIG. 25 are checked. If the neighbor block is coded using affine motion model and its reference frame is same as the reference frame of the current block, MVs at two (for 4-parameter affine model) or three (for 6-parameter affine model) control points of the current block are derived from the affine model of this neighbor.

2. FIG. 29 shows the neighbor blocks used to generate the virtual affine candidate set. The neighboring MVs are divided into three groups: S_0={mv_A, mv_B, mv_C}, S_1={mv_D, mv_E} and S_2={mv_F, mv_G}. mv_0 is the first MV in S0 that refers to the same reference picture as the current block; mv_1 is the first MV in S1 that refers to the same reference picture of the current block; and mv_2 is the first in S2 that refers to the same reference picture of the current block.

If only mv_0 and mv_1 can be found, mv_2 is derived as by using the following equation.

$$\overline{mv}_2^x = \overline{mv}_0^x - h\frac{(\overline{mv}_1^y - \overline{mv}_0^y)}{w}, \overline{mv}_2^y = \overline{mv}_0^y + h\frac{(\overline{mv}_1^x - \overline{mv}_0^x)}{w}, \quad [\text{Equation 9}]$$

Referring to Equation 9, the current block size is W×H.

If only mv_0 and mv_2 can be found, mv_1 is derived by using the following equation.

$$\overline{mv}_1^x = \overline{mv}_0^x + h\frac{(\overline{mv}_2^y - \overline{mv}_0^y)}{w}, \overline{mv}_1^y = \overline{mv}_0^y - h\frac{(\overline{mv}_2^x - \overline{mv}_0^x)}{w}. \quad [\text{Equation 10}]$$

In an embodiment of the disclosure, Affine inter may be performed according to the following sequence.
Input: affine motion parameters, reference picture samples
Output: prediction block of a CU
Process
    Derive sub-block size of the affine block
    If both width and height of the sub-block are larger than 4 luma samples,
    For each sub-block
    Derive the motion vector for the sub-block.
    DCT-IF based motion compensation (1/16 pel for luma and 1/32 for chroma) is invoked for the sub-block
    Otherwise, enhanced bi-linear interpolation filter based motion compensation is invoked for the whole affine block Also, in an embodiment of the disclosure, when merge/skip flag is false and both width and height for the CU are larger than or equal to 8, an affine flag in CU level is signalled in the bitstream to indicate whether affine inter mode is used. And when the CU is coded as affine inter mode, a model flag is signalled for specifying whether 4-parameter or 6-parameter affine model is used for this CU. If the model flag is true, AF_6_INTER mode (6-parameter affine model) is applied and 3 MVDs will be parsed; otherwise, AF_6_INTER mode (4-parameter affine model) is applied and 2 MVDs will be parsed.

In AF_4_INTER mode, similar to affine merge mode, affine motion vector pairs extrapolated from neighbour blocks coded in the affine mode are constructed and insert into candidate list firstly.

After that, if the size of the candidate list is smaller than 4, candidates with motion vector pair {(v_0,v_1)|v0={v_A, v_B,v_c},v_1={v_D, v_E}} is constructed using the neighbour blocks. As shown in FIG. 22, v_0 is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select v_1 from the neighbour block D and E is similar. When the candidate list is larger than 4, the candidates are firstly sorted according to the consistency of the neighbouring motion vectors (similarity of the two motion vectors in a pair candidate) and only the first four candidates are kept.

If the number of candidate list is smaller than 4, the list is padded by the motion vector pair composed by duplicating each of the AMVP candidates.

In AF_6_INTER mode, similar to affine merge mode, affine motion vector triples extrapolated from neighbour blocks coded in the affine mode are constructed and insert into candidate list firstly.

After that, if the size of the candidate list is smaller than 4, candidates with motion vector triples {(v_0, v_1, v_2) |v0={v_A, v_B, v_c}, v1={v_D, v_E}, v2={v_G, v_H}} is constructed using the neighbour blocks. As shown in FIG. 22, v_0 is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select v_1 from the neighbour block D and E, and select v_2 from F and G is similar. When the candidate list is larger than 4, the candidates are firstly sorted according to the consistency of the neighbouring motion vectors (similarity of the two motion vectors in a triple candidate) and only the first four candidates are kept.

If the number of candidate list is smaller than 4, the list is padded by the motion vector triple composed by duplicating each of the AMVP candidates.

After the CPMV of the current CU are derived, according to the number of affine parameters, the MVF of the current CU is generated according to the following Equation 11 for 4-parameter affine model, and according to the following Equation 12 for 6-parameters affine model.

$$\begin{cases} v_x = \dfrac{v_{1x} - v_{0x}}{W}x - \dfrac{v_{1y} - v_{0y}}{W}y + v_{0x} \\ v_y = \dfrac{v_{1y} - v_{0y}}{W}x + \dfrac{v_{1x} - v_{0x}}{W}y + v_{0y} \end{cases} \quad \text{[Equation 11]}$$

$$\begin{cases} v_x = \dfrac{v_{1x} - v_{0x}}{W}x + \dfrac{v_{2x} - v_{0x}}{H}y + v_{0x} \\ v_y = \dfrac{v_{1y} - v_{0y}}{W}x + \dfrac{v_{2y} - v_{0y}}{H}y + v_{0y} \end{cases} \quad \text{[Equation 12]}$$

The sub-block size M×N is derived as in the following Equation 13, where MvPre is the motion vector fraction accuracy (1/16).

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \quad \text{[Equation 13]}$$

After derived by Equation 12, M and N should be adjusted downward if necessary to make it a divisor of w and h, respectively. If M or N is smaller than 8, WIF is applied; otherwise, sub-block based affine motion compensation is applied.

FIG. 27 illustrates an example of a method of deriving an affine motion vector field in a subblock unit according to an embodiment of the disclosure.

Referring to FIG. 27, to derive motion vector of each M×N sub-block, the motion vector of the center sample of each sub-block, as shown in FIG. 27, is calculated according to Equation 11 or Equation 12, and rounded to 1/16 fraction accuracy. Then the SHVC upsampling interpolation filters are applied to generate the prediction of each sub-block with derived motion vector.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample, the additional interpolation filters of 1/32 pel fractional positions are derived by using the average of the filters of the two neighbouring 1/16 pel fractional positions.

AF_MERGE mode is selected at the encoder-side in the similar way as conventional merge mode selection is performed. The candidate list is constructed firstly, and minimum RD-cost inside the candidates is selected to compare with RD-cost of other inter modes. Result of this comparison is a decision whether AF_MERGE is applied or not.

For AF_4_INTER mode, a RD cost check is used to determine which motion vector pair candidate is selected as the control point motion vector prediction (CPMVP) of the current CU. After the CPMVP of the current affine CU is determined, affine motion estimation is applied and the control point motion vector (CPMV) is found. Then the difference of the CPMV and the CPMVP is decided.

In encoder side, AF_6_INTER mode will only be verified when AF_MERGE or AF_4_INTER mode is selected as the best mode in the previous mode selected stage.

In an embodiment of the disclosure, affine inter (affine AMVP) mode can be performed as below:

1) AFFINE_MERGE_IMPROVE: instead of finding the first neighbor block in the affine mode, the improvement tries to find the neighbor block with the largest coding unit size as the affine merge candidate.

2) AFFINE_AMVP_IMPROVE: add the neighbor blocks in the affine mode to the affine AMVP candidate list similar to the traditional AMVP process.

The detailed affine AMVP candidate list construction process is as follows.

First, the below left neighbor block is checked whether it is using the affine motion model and has the reference index with the current reference index. If it does not exist, the left neighbor block is then checked in the same way. If it does not exist, the below left neighbor block is checked whether it is using the affine motion model and with the different reference index. If it exists, the scaled affine motion vector is added to the reference picture list. If it does not exist, the left neighbor block with be checked in the same way.

Second, the above right neighbor block, the above neighbor block, and above left neighbor block will then be checked in the same way.

If we have found two candidates after the above processes, we will have finished constructing the affine AMVP candidate lists. If we have not found two candidates, the original process in the JEM software will be performed to construct the affine AMVP candidate lists.

3) AFFINE_SIX_PARAM: besides the four-parameter affine motion model, six-parameter affine motion model is also added as an additional model.

The six parameter affine motion model is derived by using the following equation.

$$\begin{cases} MV_x = ax + by + c \\ MV_y = dx + ey + f \end{cases} \quad \text{[Equation 14]}$$

Since there are six-parameters in the above motion model, three motion vectors in the above left position MV_0, the above right position MV_1, and the bottom left position MV_2 are needed to determine the model. The three motion vectors are determined in a similar way as the two motion vectors in the four-parameter affine motion model. Note that the affine model merge is always set as the six-parameter affine motion model.

4) AFFINE_CLIP_REMOVE: delete the motion vector constraints for all the affine motion vectors. Let the motion compensation process handle the motion vector constraints themselves.

Affine Motion Model

As described above, various affine motion models may be used or considered in the Affine inter prediction. For example, the Affine motion model may represent four motions as in FIG. 15. An affine motion model that represents three motions (translation, scale, and rotate), among motions capable of representing the Affine motion model, may be called a similarity (or simplified) affine motion model. The number of CPMVs derived depending on which one of the affine motion models is used and/or a method of deriving a sample/subblock unit MV of a current block may be different.

motion model can be used. In AF_INTER, a six-parameter motion model is proposed to use in addition to the existing a four parameter motion model in JEM. The six-parameter affine motion model is described in the following Equation 15.

$$x' = a*x + b*y + c$$
$$y' = d*x + e*y + f \quad \text{[Equation 15]}$$

Here, the coefficients a, b, c, d, e, and f are the affine motion parameters and, (x,y) and (x',y') are the co-ordinates of pixel location before and after the transformation of the affine motion model. To use the affine motion model in video coding, if CPMV0, CPMV1 and CPMV2 are the MV for CP0 (left above), CP1 (right above) and CP2 (left bottom), Equation 16 can be described as:

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \quad \text{[Equation 16]}$$

where CPMV_0={v_0x,v_0y}, CPMV_1={v_1x,v_1y}, CPMV_2={v_2x,v_2y}, and w and h are the width and the height of coding block, respectively. Equation 16 describes the motion vector field (MVF) of a block.

A flag is parsed at the CU level to indicate whether the four-parameter or the six-parameter affine motion model is used when the neighbor blocks are coded as the affine prediction. If no neighbor block is coded as the affine prediction, the flag is skipped and four-parameter model is used for the affine prediction. In other words, the six-parameter model is considered in the condition that one or more of the neighbor blocks are coded as the affine motion model. When it comes to the number of CPMVD, two and three CPMVDs are signaled for the four-parameter and six-parameter affine motion model, respectively.

Also, in an embodiment of the disclosure, pattern-matched motion vector refinement can be used. In the pattern-matched motion vector derivation (named PMMVD in JEM encoder description, shortened to PMVD in this document) of JEM, the decoder needs to evaluate several motion vector (MV) candidates to determine a starting MV candidate for CU-level search. In sub-CU-level search, in addition to the best CU-level MV, several MV candidates are added. The decoder needs to evaluate these MV candidates to find the best MV, which requires a lot of memory bandwidth. In the proposed pattern-matched motion vector refinement (PMVR), the concepts of template matching and bilateral matching in PMVD in JEM are adopted. One PMVR_flag is signaled when skip mode or merge mode is selected to indicate PMVR is enabled or not. To reduce the memory bandwidth requirement significantly in comparison with PMVD, a MV candidate list is generated, and a starting MV candidate index is explicitly signaled if PMVR is applied.

The candidate list is generated by using merge candidate list generation process, but the sub-CU merge candidates, e.g., the affine candidates and ATMVP candidates, are excluded. For bilateral matching, only the uni-prediction MV candidate is included. A bi-prediction MV candidate is divided into two uni-prediction MV candidates. Also, similar MV candidates (MV differences smaller than a pre-defined threshold) are also removed. For the CU-level search, a diamond search MV refinement is performed starting from the signaled MV candidate.

The sub-CU-level search is only enabled for the bilateral matching merge mode. To reduce memory bandwidth, only the MV determined from the CU-level search is evaluated. The search window of the sub-CU-level search for all sub-CUs is the same as the search window of the CU-level search. Therefore, no additional bandwidth is required for sub-CU-level search.

The template matching is also used to refine the MVP in AMVP mode. In AMVP mode, two MVPs are generated by using HEVC MVP generation process, and one MVP index is signaled to select one of them. The selected MVP is further refined by using template matching in PMVR. If the adaptive motion vector resolution (AMVR) is applied, the MVP is rounded to the corresponding precision before template matching refinement. This refinement process is named as pattern-matched motion vector predictor refinement (PMVPR). In the rest of this document, if not particularly specified, PMVR includes template matching PMVR, bilateral matching PMVR, and PMVPR.

To reduce the memory bandwidth requirement, the PMVR is disabled for 4×4, 4×8, and 8×4 CUs. To further reduce the memory bandwidth requirement, the search range of {template matching, bilateral matching} for CU area equal to 64 is reduced to {±2, ±4}, and the search range of {template matching, bilateral matching} for CU area larger than 64 is reduced to {±6, ±8}. By using all the above methods described in this PMVR section, the required memory bandwidth is reduced from 45.9× in PMVD of JEM-7.0 to 3.1× in PMVR, compared to the worst case in HEVC.

Application Technology when Affine is Used in a Non-QT Block

FIG. 28 illustrates a method of generating a prediction block and a motion vector in an inter prediction to which an affine motion model according to an embodiment of the disclosure has been applied.

FIG. 28 shows an equation for deriving a motion vector if an affine motion model is applied. The motion vector may be derived based on the following equation 17.

$$(V_x, V_y) = (x - x', y - y')$$
$$V_x = (1-a)x - by - e$$
$$V_y = -cx + (1-d)y - f \quad \text{[Equation 17]}$$

In this case, v_x indicates the x component of a sample unit motion vector of an (x, y) coordinate sample within a current block. v_y indicates the y component of the sample unit motion vector of the (x, y) coordinate sample within the current block. That is, (v_x, v_y) becomes sample unit motion vectors of the (x, y) coordinate sample. In this case, a, b, c, d, e, and f indicate parameters of an equation for deriving the sample unit motion vectors of the (x, y) coordinates from the control points (CP) of the current block. The CP may be represented as a control pixel. The parameters may be derived from motion information of CPs of each PU transmitted in a PU unit. The equation for deriving the sample unit motion vectors derived from the motion information of the CPs may be applied to each sample of a block, and may be derived as the position of the sample within a reference image based on the x-axis and y-axis relative position of each sample. The sample unit motion vector may be differently derived depending on the size, asymmetrical or symmetrical, block position, etc. of a block in a QTBT(TT) block partition structure, and a detailed embodiment thereof is illustrated through FIGS. 29 to 38.

FIG. 29 is a diagram illustrating a method of performing a motion compensation based on a motion vector of a control point according to an embodiment of the disclosure.

Referring to FIG. 29, a case where a current block is an 2N×2N block is assumed and described. For example, a motion vector of a top left sample within the current block may be said to be v_0. Furthermore, the motion vectors of CPs may be said to be v_1 and v_2 using, as CPs, the samples of neighbor blocks neighboring the current block. That is, assuming that the width and height of the current block are S and coordinates at the top left sample position of the current block are (xp, yp), the coordinates of CP0 among the CPs may be said to be (xp, yp), the coordinates of CP1 may be said to be (xp+S, yp), and the coordinates of CP2 may be said to be (xp, yp+S). The motion vector of the CP0 may be said to be v_0, the motion vector of the CP1 may be said to be v_1, and the motion vector of the CP2 may be said to be v_2. A sample unit motion vector may be derived using the motion vectors of the CPs. The sample unit motion vector may be derived based on the following equation 18.

$$V_x = \frac{V_{x1} - V_{x0}}{S}x + \frac{V_{x2} - V_{x0}}{S}y + V_{x0}$$
$$V_y = \frac{V_{y1} - V_{y0}}{S}x + \frac{V_{y2} - V_{y0}}{S}y + V_{y0}$$
[Equation 18]

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2. The motion vectors of samples within the current block may be derived based on relative positions within the current block according to an equation for deriving a sample unit motion vector, such as Equation 18.

FIG. 30 is a diagram illustrating a method of performing a motion compensation based on motion vectors of control points in a nonregular block according to an embodiment of the disclosure.

FIG. 30 illustrates the CPs of a block partitioned into N×2N. An equation for deriving a sample unit motion vector within a current block may be driven using the same method as that of the partitioning type 2N×2N. In a process of deriving the equation, a width value suitable for a shape of the current block may be used. In order to derive the sample unit motion vector, three CPs may be derived. The positions of the CPs may be adjusted as in FIG. 30. That is, assuming that the width and height of a current block are S/2 and S and the coordinates of the current block at the top left sample position are (xp, yp), the coordinates of CP0 of the CPs may be (xp, yp), the coordinates of CP1 thereof may be (xp+S/2, yp), and the coordinates of CP2 may be (xp, yp+S). The sample unit motion vector may be derived based on the following equation 19.

$$V_x = \frac{2(V_{x1} - V_{x0})}{S}x + \frac{V_{x2} - V_{x0}}{S}y + V_{x0}$$
$$V_y = \frac{2(V_{y1} - V_{y0})}{S}x + \frac{V_{y2} - V_{y0}}{S}y + V_{y0}$$
[Equation 19]

In this case, vx and vy indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2, respectively. Equation 3 indicates an equation for deriving a sample unit motion vector in which the width of the current block is considered to be S/2. The motion vectors of samples within the current block partitioned from a CU based on the partitioning type N×2N may be derived based on relative positions within the current block according to an equation for deriving a sample unit motion vector, such as Equation 19.

FIG. 31 is a diagram illustrating a method of performing a motion compensation based on motion vectors of control points in a nonregular block according to an embodiment of the disclosure.

FIG. 31 illustrates blocks partitioned based on the partitioning type 2N×N. In order to derive a sample unit motion vector, three CPs may be derived. The height of a current block may be adjusted to S/2 based on a shape of the current block shown in FIG. 31 by adjusting the positions of the CPs as in FIG. 31. That is, assuming that the width and height of the current block are S and S/2 and the coordinates of the current block at the top left sample position are (xp, yp), the coordinates of CP0 among the CPs may be (xp, yp), the coordinates of CP1 may be (xp+S, yp), and the coordinates of CP2 may be (xp, yp+S/2). A sample unit motion vector may be derived based on the following equation 20.

$$V_x = \frac{V_{x1} - V_{x0}}{S}x + \frac{2(V_{x2} - V_{x0})}{S}y + V_{x0}$$
$$V_y = \frac{V_{y1} - V_{y0}}{S}x + \frac{2(V_{y2} - V_{y0})}{S}y + V_{y0}$$
[Equation 20]

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2, respectively. Equation 4 indicates an equation for deriving a sample unit motion vector in which the height of the current block has been considered to be S/2. Motion vectors of each sample within a current block partitioned from a CU based on the partitioning type 2N×N may be derived based on relative positions within the current block according to an equation for deriving a sample unit motion vector, such as Equation 4.18.

FIGS. 32 to 38 are diagrams illustrating a method of performing a motion compensation based on motion vectors of control points in a nonregular block according to an embodiment of the disclosure.

FIG. 32 illustrates the CPs of asymmetrical current blocks. As illustrated in FIG. 32, the width and height of the asymmetrical current blocks may be said to be W and H. In order to derive a sample unit motion vector, three CPs of each current block may be derived. The coordinates of the CPs may be adjusted based on a width and height based on a shape of a current block as in FIG. 32. That is, assuming that the width and height of the current block is W and H and the coordinates of each current block at a top left sample position are (xp, yp), the coordinates of CP0 among the CPs may be set as (xp, yp), the coordinates of CP1 may be set as (xp+W, yp), and the coordinates of CP2 may be set as (xp, yp+H). In this case, a sample unit motion vector within the current block may be derived based on the following equation 21.

$$V_x = \frac{V_{x1} - V_{x0}}{W}x + \frac{V_{x1} - V_{x0}}{H}y + V_{x0}$$
$$V_y = \frac{V_{y1} - V_{y0}}{W}x + \frac{V_{y2} - V_{y0}}{H}y + V_{y0}$$
[Equation 21]

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2. Equation 21 indicates an equation for deriving a sample unit motion vector in which the width and height of asymmetrical current blocks have been considered.

Meanwhile, according to the disclosure, in order to reduce the amount of data for motion information of CPs indicated in a block unit, motion information prediction candidates for at least one CP may be selected based on motion information of a neighbor block or a neighbor sample for a current block. The motion information prediction candidate may be called an affine motion information candidate or an affine motion vector candidate. The affine motion information candidates may include the contents disclosed with reference to FIGS. 33 to 38, for example.

ATMVP Simplification

Advanced temporal motion vector prediction (ATMVP) is inter prediction using temporal motion information candidates and may represent inter prediction using motion information candidates proposed to enhance the legacy TMVP. In the embodiment of the disclosure, the ATMVP is not limited by its term, and the ATMVP may be denoted as a subblock time merge candidate, a subblock-based time merge candidate, a subblock time motion vector predictor, or a subblock-based time motion vector predictor.

Specifically, the TMVP which uses the motion vector of the colPB in the center position of the current block or the right-bottom block of the current block as a temporal motion information candidate may not reflect intra-screen motion. In contrast, when the ATMVP is applied, the motion vector of the colPB in the position indicated by the motion vector of a neighboring block may be used as an ATMVP candidate.

As an example to which the ATMVP is applied, the motion vector (temporal vector) of the spatial neighbor block first available is found while checking in the order of merge candidate configuration, and then, the location indicated by the temporal vector in the reference picture may be derived as the col-PB (ATMVP candidate). Further, the motion vector of the corresponding block may be used in each sub-block unit using the temporal vector. In this case, when there is no MV in a specific sub-block, the MV of the block located in the center of the corresponding block is used as an MV for the unavailable sub-block and is stored as a representative MV.

Further, various ATMVP simplification schemes may be proposed that may further reduce memory usage while using the ATMVP.

In an embodiment, since the reference pictures (designated as a slice segment header) for finding the reference block are limited to the collocated picture, the usage of memory may be reduced. For example, up to 4 reference pictures may be used. To find the reference block, the temporal vector may be derived from one of the spatial candidates according to the scanning order. If the current candidate has the same reference picture as the co-located picture, the search process may be terminated.

In one embodiment, modifications to ATMVP and/or STMVP sub-block merge modes may be applied.

1. Signaling may be added at the picture/slice-level, so that various sub-block sizes may be used to derive ATMVP/STMVP based motion information.

2. A simplified ATMVP-based motion information derivation may be used by allowing one co-located picture to be used.

In one embodiment, it is proposed to support picture/slice-level adaptation of the granularity of the motion field derived by the ATMVP and STMVP modes. Specifically, a default value of a sub-block size used to derive motion parameters for ATMVP and STMVP in a slice indicating a sequence parameter set (SPS) may be signaled in the SPS. Additionally, one flag is signaled in the slice segment header. If this flag is 0, this indicates that the default sub-block size as designated in the SPS is used for deriving ATMVP/STMVP-based motion in the current slice. Otherwise (that is, if this flag is set to 1), another syntax element is signaled in the slice segment header to specify the ATMVP/STMVP subblock size used for the slice.

In one embodiment, a simple encoder method is used to determine the ATMVP/STMVP subblock size for the current picture. One of the two ATMVP/STMVP subblock sizes 4 and 8 is selected based on the average size of ATMVP/STMVP blocks from the last coded picture in the same temporal layer. It is assumed that the just coded picture is the i-th picture in the k-th temporal layer and includes N CUs coded by ATMVP and STMVP modes. It is also assumed that the sizes of these CUs are S_0, S_1, . . . , S_(N−1). The average size of ATMVP/STMVP CUs is calculated as $\sigma^k = \Sigma_{i=0}^{N-1} S_i/N$. Then, when the (i+1)-th picture is coded in the same k-th temporal layer, the corresponding ATMVP/STMVP subblock size $g_{i+1}^k$ may be determined according to Equation 22 below.

$$g_{i+1}^k = \begin{cases} 4, & \sigma^k < 27 \\ 8 & \sigma^k \geq 27 \end{cases}$$
[Equation 22]

In an embodiment, for a first picture in each temporal layer, the ATMVP/STMVP subblock size may always be set to 4.

In one embodiment, ATMVP may be derived using the following two steps.

(1) If a neighboring CU is available and the MV of this CU is different from the MVs in the existing candidate list, the encoder/decoder may add motion vectors from spatial neighboring CUs in the order of A1, B1, B0, and A0 as illustrated in FIG. 12 as described above. The number of available spatial candidates may be expressed as N0.

(2) The first MV candidate from N0 spatial candidates may be used to determine the position to fetch the co-located picture and a motion for each subblock (by adding a displacement according to MV). If N0 is 0, the co-located picture signaled in the slice header and the co-location with zero motion may be used to fetch the motion for each sub-block.

The co-located pictures of different CUs for ATMVP may not always be the same if multiple reference pictures are used. Having different co-located pictures for ATMVP derivation for different CUs in the current picture means that motion fields of multiple reference pictures need to be fetched, which is undesirable due to an increase in memory bandwidth. Accordingly, in one embodiment, there is proposed a simplified design using the same co-located picture as the co-located picture for ATMVP derivation as in HEVC signaled in the slice header. At the block level, if the reference picture of neighboring block A is different from the co-located picture, the MV of block A may be scaled using an HEVC temporal MV scaling method, and the scaled MV of block A may be used in ATMVP.

The motion vector used to fetch the motion field in the co-located picture Rcol is denoted as MVcol. To minimize the impact due to MV scaling, the MV in the spatial candidate list used to derive the MVcol is selected from the answer in the following way. If the reference picture of the candidate MV is a co-located picture, this MV is selected and used as MVcol without any scaling. Otherwise, the MV with the reference picture closest to the co-located picture is selected to derive the MVcol with scaling.

MVD Coding

The current state-of-the art video coding standard uses motion vectors and its motion vector predictors to generate motion vector differences (MVD). The MVD can be more formally defined as the difference between the motion vector and the motion vector predictor. Similar to the motion vector, the MVD has an x 0 and y component that correspond to the motion in x (horizontal) and y (vertical) directions. The MVD is an attribute that is available only when the coding unit is encoded using the (Advanced) Motion Vector Prediction ((A)MVP) mode.

Once the MVD is determined, it is then encoded using entropy techniques. The video standards rely on using MVDs as one of its possible ways to exploit the redundancy in motion vectors and to achieve compression. At the decoder, the motion vector difference (MVD) is decoded before the motion vectors of the coding unit are decoded. Encoding MVD over encoding the actual motion vectors serves to exploit the redundancy between the motion vectors and its predictors and in so doing enhance the compression efficiency.

The input to the MVD coding stage at the decoder is just the coded MVD bins that have been parsed for decoding. The inputs to the MVD coding stage at the encoder are the actual MVD values and additionally a flag ("imv" flag) that indicates the resolution for the MVD encoding. The flag is used to decide if the MVD should be expressed as 1-pel (or pixel), 4-pel or as quarter-pel.

FIG. 39 illustrates an overall coding structure for deriving a motion vector according to an embodiment of the disclosure.

Referring to FIG. 39, the coding unit is initially checked if it is the Merge Mode (S3901).

If the coding unit is in Merge mode, an affine flag and merge index are parsed to proceed with the decoding (S3902).

If the coding unit is not in Merge mode, it then exists in the AMVP mode. In the AMVP mode, the list information is first parsed, i.e., if List 0 or List 1 or both the lists are to be used (S3903). Then, the affine flag is parsed (S3904). Following this, the parsed Affine flag is checked if it is true or false (S3905).

If true, then parse_MVD_LT and parse_MVD_RT corresponding to the left (LT) and right (RT) MVDs are processed (S3906). If the Affine flag is false, then the MVD is processed (S3907). Affine motion modeling in the special case of AMVP will be described in detail below.

FIG. 40 shows an example of an MVD coding structure according to an embodiment of the disclosure.

Referring to FIG. 40, first and foremost, the MVD greater than zero flags for the horizontal (MVDxGT0) and vertical (MVDYGT0) components are parsed (S4001).

Following this, the parsed data for the horizontal component is checked if it's greater than zero (i.e., MVDxGT0) (S4002). If the MVDxGT0 flag is true (i.e. MVDxGT0 is equal to '1'), then the horizontal component greater than one is parsed (i.e., MVDxGT1) (S4002). If the MVDxGT0 is not true (i.e. MVDxGT0 is equal to '0'), then the MVDxGT1 data is not parsed.

A similar procedure is then followed for the vertical component (S4003, S4004).

Following this, the parsed MVD data can be processed further in the blocks labelled MVDx_Rem_Level and MVDy_Rem_Level in order to obtain the reconstructed MVDs (S4005, S4006).

FIG. 41 shows an example of an MVD coding structure according to an embodiment of the disclosure.

FIG. 41 illustrates how the decoder processes the data in the block MVDx_Rem_Level in FIG. 40 further so as to decode the MVDx component. If the decoded flag indicating that the parsed data would be greater than zero (i.e., MVDxGT0) is true (S4101) and the decoded flag indicating the parsed data would be greater than one (i.e., MVDxGT1) is true (S4102), then the bins corresponding to the parsed MVDx component are decoded using Exponential Golomb (EG) Code with order one (S4103). The inputs to the EG would be the bins containing the absolute min two (i.e., Abs−2) MVD values and the Golomb order of one.

The sign information is then parsed by decoding the bypass bin containing the information (S4104). If the decoded bypass bin has a value of 1, then a negative sign is appended to the decoded MVDx. If however, the decoded bypass bin has a value of 0, then the decoded MVD is indicated as a positive value. If MVDxGR0 is true but the MVDxGR1 is not true, then this indicates that the absolute value of the MVDx being decoded is 1. The sign information is then parsed and updated. However, if the MVDxGR0 is false, then the reconstructed MVDx is 0.

A similar process is used to decode the MVDy (i.e., MVDy_Rem_Level) at the decoder is shown in the FIG. 42 below.

FIG. 42 shows an example of an MVD coding structure according to an embodiment of the disclosure.

Referring to FIG. 42, if the decoded flag indicating that the parsed MVDy greater than zero (i.e., MVDyGT0) is true (S4201), then the flag MVDyGR1 is checked (S4202).

If both MVDyGR0 and MVDyGR1 are true, then the parsed MVD data is decoded using EG Code with inputs being the bins containing the absolute minus two (Abs−2) MVD and order one (S4203). Following this, the sign information is parsed and decoded to obtain the decoded MVDy (S4204). If MVDyGR0 is true but MVDyGR1 is false then, the absolute vertical value is considered to be either +1/−1. The sign information is then parsed in a similar manner as explained above and decoded, so as to obtain the decoded MVDy. If the MVDyGR0 flag is false, MVDy is zero.

FIG. 43 shows an example of an MVD coding structure according to an embodiment of the disclosure.

Referring to FIG. 43, at the encoder the signed MVD values are to be encoded. Similar to the FIG. 41, the greater than zero bins are encoded for the x and y components (S4301, S4311), i.e., MVDxGR0 and MVDyGR0 by checking the absolute values of the horizontal and vertical components. Then the greater than one flags are encoded for the horizontal and vertical components (S4302, S4312), i.e., MVDxGR1 and MVDyGR1. Following this the absolute MVD values are encoded similar to the decoder, the horizontal and vertical components are encoded sequentially.

For the horizontal MVD encoding, if the absolute horizontal MVD component is greater zero (i.e., MVDxGR0) and if it is greater than one (i.e., MVDxGR1), then the (absolute value−2) is encoded using the EG Code with order one (S4303). Following this the sign information is encoded using bypass bin (S4304). If MVDxGR0 was true and MVDxGR1 was not true, then just the sign information is encoded. If MVDxGR0 is not true, then the MVDx is zero. The same process is repeated to encode MVDy (S4313, S4314).

Affine Coding

Prior video coding standards have only considered translational motion model. However, the underlying motion may incorporate effects such as zooming, rotation, panning and other irregular motions. In order to capture this nature of motion, the latest video coding standard introduced Affine motion coding, whereby the irregular characteristics of the motion information can be captured using either a 4-parameter or a 6-parameter Affine motion model.

If a 4 parameter model is used, then 2 control points are generated and if the 6-parameter model is used 3 control points are used. FIG. 16, previously described, illustrates the concept of affine motion more clearly. By using the 4-parameter model, the current block is encoded using two control point motion vectors given by v_0 (cpmv_0) and v1 (cpmv_1).

Once these control points are derived, the MVF for each of the 4×4 subblocks is described by the following equation 22.

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad \text{[Equation 22]}$$

Where (v_0x, v_0y) is motion vector of the top-left corner control point, and (v_1x, v_1y) is motion vector of the top-right corner control point. The motion vector of each 4×4 sub-block is calculated by deriving the motion vector of the center sample of each sub-block as illustrated in the FIG. 27, previously described.

Affine coding may be used both in the merge mode and the (A)MVP mode. As described above, in the AMVP mode, affine coding may use two control points or three control points depending on a motion model used. Accordingly, two or three motion vector differences (MVD) may be present. In other words, if two control points are used depending on a motion model, an MVD for at least one of top left (LT) and/or top right (RT) control points may be coded. If three control points are used, an MVD for at least one of top left (LT), top right (RT) and/or bottom right (LB) control point s may be coded.

In the decoder, an MVD is decoded before a motion vector in a coding unit is finally determined. In this case, the accuracy of an affine prediction (or an affine motion prediction) may depend on the accuracy of a control point motion vector. As a result, the accuracy of an affine prediction may depend on the accuracy of MVD coding.

Nevertheless, in a conventional image compression technology, if an affine prediction is applied, an MVD is coded with only ¼ pel (or pixel, fraction) precision (or accuracy, resolution).

In other words, efficiency of affine coding may greatly depend on high precision of a control point motion vector and thereafter high precision of a motion vector of the center sample of each subblock. Furthermore, the aforementioned equations (e.g., 1, 11, 12, 16, 22) used to derive motion vectors may provide precision accuracy much higher than 1/16 pel. For example, if 1/16 pel precision is used, a value calculated in the aforementioned equations may be rounded off to 1/16 pel precision. This is useful because a motion compensation interpolation filter operating with 1/16 pel precision may be applied to easily generate the prediction samples of each subblock using a derived motion vector.

After a motion compensation, a motion vector of each subblock having high precision may be rounded and stored with the same precision as a common motion vector. An MVD is calculated based on a difference between a predictor and an actual motion vector, and initial calculation can be maintained with 1/16 pel accuracy. However, in a conventional image compression technology, if an affine prediction is applied, MVD precision is reduced to ¼ pel and coded. For more accurate decoding of a motion vector, if higher precision is maintained although an affine prediction is applied, the accuracy of the affine prediction can be increased, and compression efficiency can be improved.

In a conventional compression technology, a common MVD (i.e., an MVD other than an affine prediction) is processed (coded or transmitted) with ¼ pel, 1 pel (i.e., integer pixel) or 4 pel precision. Furthermore, the encoder/decoder controls such precision using a precision flag (or syntax element). However, as described above, in an affine prediction, an MVD is stored with only ¼ pel precision.

Affine Mode

FIG. 44 illustrates a decoding structure for motion vector prediction according to an embodiment of the disclosure.

Referring to FIG. 44, when a merge mode is applied (S4401), the decoder parses an affine flag (S4402) and identifies whether an affine merge mode or a regular merge mode is applied to the current coding unit (CU) (S4403). If the current CU is in the affine merge mode, an affine-merge list is constructed (S4404), otherwise the regular merge list is constructed (S4405). However, if the CU is not in the merge mode, prediction list information (or reference list information) is first parsed (S4406), and then an affine flag is parsed (S4407). If the affine flag is true, an affine AMVP list is constructed, otherwise, a general AMVP list is constructed (S4408, S4409, S4410).

Affine Merge Common Base

FIG. 45 is a view illustrating example merge candidates used for affine prediction according to an embodiment of the disclosure.

In an embodiment of the disclosure, a method for performing affine prediction using an affine merge common base is proposed. An affine merge list using an affine merge common base may be constructed in the following manner.

1. Inherited affine candidates are inserted.
2. If the affine merge list is not full, the constructed affine candidates are inserted.
3. If the list is still not full, zero motion vectors are inserted.

Here, the inherited affine candidates are candidates derived from valid neighbors of a reconstructed block coded in the affine mode.

Referring to FIG. 45, the conventional five spatial neighbors are first evaluated in the scan order of A1, B1, B0, A0, and B2. As an embodiment, a pruning check may be performed on each new inherited affine candidate being added to the list, so that the new candidate may not duplicate existing candidates in the list.

The constructed affine candidate is constructed by combining motion information for neighbors of each control point. It should be noted that it is not a requirement to code the constructed affine candidates in the affine mode. Up to seven spatial locations and one temporal location may be used to derive control points CP1, CP2, CP3, and CP4.

For each control point, the order of the identified candidates is as follows:

For CP1: Priority B2→B3→A2 is identified and a first available candidate is used.
For CP2: Priority B1→B0 is identified and the first available candidate is used.
For CP3: Priority A1→A0 is identified and the first available candidate is used.
For CP4: The temporal location T is used.

Next, 10 combinations of control points may be used to generate affine motion candidates. These candidates are inserted into the affine merge list until the maximum list size is met.

Four of them are 6-PARAM models: {CP1, CP2, CP3}, {CP1, CP2, CP4}, {CP1, CP3, CP4}, {CP2, CP3, CP4}, Six of them are 4-PARAM models: {CP1, CP2}, {CP1, CP3}, {CP2, CP3}, {CP1, CP4}, {CP2, CP4}, {CP3, CP4}

Accordingly, if the merge list is still not full, zero motion vectors are inserted.

Affine AMVP

FIG. 46 is a view illustrating examples of inherited affine candidates used for affine prediction according to an embodiment of the disclosure.

In an embodiment of the disclosure, an affine AMVP list may be constructed in the following manner.

Inherited affine candidates are inserted.
If the list contains less than two candidates, the constructed affine candidates are inserted.
If the list still contains less than 2 candidates, conventional AMVP candidates are inserted.

Referring to FIG. 46, the inherited affine candidate may be inserted by identifying spatial neighbors coded in the affine mode in the scan order of A, B, C, D, and E as illustrated in the subsequent figure.

Referring to FIG. 26 described above, a constructed affine candidate is described. Referring to FIG. 26, the constructed affine candidates may correspond to the control points illustrated in FIG. 26 and may be considered as candidates even when neighboring candidates are not blocks coded in the affine mode. As an embodiment, a constructed affine candidate may be selected from neighboring blocks according to the following process.

mv0 is selected from A, B, and C (a first candidate having the same reference picture as the current block)
mv1 is selected from D and E (the first candidate having the same reference picture as the current block)
mv2 is selected from F and G (first candidate having the same reference picture as the current block)

After obtaining mv0, mv1, and mv2, the encoder/decoder may derive the MV of the control point based on the availability of mv0, mv1, and mv2. As an embodiment, before adding the constructed candidate to the AMVP candidate list, pruning may be performed to add only candidates that are not identical to the existing candidates to the list.

Embodiment 1

In an embodiment of the disclosure, there is proposed a new type of affine candidate that may be used in the list construction process is proposed when the merge or AMVP mode is applied. Specifically proposed is a history-based affine HMVP candidate that may be inserted into a candidate list in performing affine prediction.

In an embodiment of the disclosure, a history-based affine candidate included in a candidate list for affine prediction indicates motion information for a coding unit (CU) previously coded in the affine mode. When the CU is coded using the affine motion, the encoder/decoder may store a copy of the motion information for the CU previously decoded in the buffer.

FIG. 47 illustrates an example lookup table for storing history-based affine candidates according to an embodiment of the disclosure.

Referring to FIG. 47, as an embodiment of the disclosure, a lookup table (LUT) may be constructed by adding a plurality of history-based affine candidates. When the LUT reaches the maximum size, the table may be managed according to a first-in-first-out (FIFO) rule (that is, the oldest candidate is output first) as the new history-based candidate is added. As an embodiment, the use of the affine HMVP candidate may be signaled through a sequence, picture, slice, CTU and/or other data header.

In the disclosure, the LUT is not limited by its name, and may be referred to as a buffer, HMVP buffer, HMVP candidate buffer, HMVP list, or HMVP candidate list. A new candidate may be added to the LUT until the LUT reaches a defined size.

FIG. 48 is a flowchart illustrating an example method for constructing a candidate list according to a prediction mode according to an embodiment of the disclosure.

FIG. 48 illustrates an encoding/decoding process according to an embodiment of the disclosure. The encoder/decoder obtains a coding mode (or prediction mode) of the current coding unit (or coding block or prediction unit) (S4801). For example, the coding mode of the current coding unit may be an affine merge, merge, AMVP, or affine AMVP mode.

The encoder/decoder constructs a candidate list for motion estimation/compensation according to the coding mode obtained in step S4801 (S4802). The candidate list may be constructed as per each mode according to the above-described embodiments.

Embodiment 2

In an embodiment of the disclosure, there is proposed a method for adaptively changing the order of inserting (or adding) history-based affine MVP candidates to a merge or AMVP candidate list.

FIG. 49 illustrates an example lookup table storing history-based affine candidates according to an embodiment of the disclosure.

Referring to FIG. 49, it is assumed that 6 affine HMVP candidates are stored in the LUT. However, the disclosure is not limited thereto, and affine HMVP candidates, which are stored in the LUT, may be predefined in various numbers.

An affine HMVP LUT including six candidates may be constructed as illustrated in FIG. 49. The oldest HMVP candidate may be added to the frontmost field (i.e., index field 0), and the latest HMVP candidate may be added to the rearmost field (i.e., index field 5). As described above, the affine HMVP candidate may be added to the LUT in a first-in-first-out (FIFO) manner.

In one embodiment, the encoder/decoder may insert the affine HMVP candidate to the merge or AMVP candidate list in any one of the following orders.

From index 0 to index 5 (i.e., from the oldest affine HMVP candidate to the newest affine HMVP candidate)

From index 5 to index 0 (i.e., from the newest affine HMVP candidate to the oldest affine HMVP candidate)

From index 4 to index 0 (since index 5 is the latest history, it is highly likely to overlap one of the other spatial candidates)

Various other pre-defined orders, e.g., indexes 4, 3, 5, 2, and 1.

FIG. 50 illustrates an example method for constructing a candidate list used for affine prediction using history-based affine candidates according to an embodiment of the disclosure.

Referring to FIG. 50, in constructing a candidate list (merge or AMVP candidate list) used for affine prediction, the encoder/decoder may use history-based affine candidates (affine HMVP candidates) along with other several candidates (e.g., spatial/temporal candidates, inherited affine candidates, or constructed affine candidates).

The central block indicates the merge list configuration, where N is the maximum number of merge candidates. Referring to the block on the right, the affine HMVP candidates may be added to the merge list in any given order. For example, as illustrated in the right-hand block, the newest affine HMVP candidate may be added to the list, followed by its predecessors.

Similarly, the left-hand block in the figure illustrates a case in which the affine HMVP candidates may also be added from the oldest candidate (i.e., the 0th candidate in the LUT) to the newest candidate. Different configurations of affine HMVP candidates may be added to the list in various orders as in the above-described embodiment.

FIG. 51 is a flowchart illustrating an example method for constructing a candidate list in an affine merge mode according to an embodiment of the disclosure.

A generalized method for constructing an affine merge list (or an affine merge candidate list) when the affine merge mode is applied is described with reference to FIG. 51.

First, the encoder/decoder initializes the affine merge list configuration (S5101).

The encoder/decoder adds various types of affine candidates to the affine merge list (S5102). In this case, the added merge candidates may include, e.g., spatial/temporal candidates, inherited affine candidates, or constructed affine candidates.

A method for constructing an affine merge list as in step S5102 is described below in detail.

FIG. 52 is a flowchart illustrating an example method for constructing a candidate list in an affine merge mode according to an embodiment of the disclosure.

In an embodiment of the disclosure, the affine HMVP candidate may be added to the merge list.

The encoder/decoder may obtain the number of affine HMVP candidates to be added from the LUT in the affine merge list (S5201).

If the number of affine HMVP candidates is determined, the encoder/decoder may sequentially construct a merge list by determining an order of adding affine HMVP candidates (S5202).

As an embodiment, the order of the affine HMVP candidates to be added to the merge list may be signaled from the encoder to the decoder. Various methods may be defined to specify the order of the affine HMVP candidates. As an example, a syntax element indicating the specific order may be transmitted from the encoder to the decoder through a high level syntax (HLS). As an example, the HLS may be part of a sequence parameter set, picture parameter set, slice and/or other CU/PU header.

TABLE 2

| | Description |
|---|---|
| high_level_parameter_set( ) { | |
| ... | |
|     set_affine_HMVP_order_flag | u(1) |
| ... | |

In Table 2, when set_affine_HMVP_order_flag is 1, it indicates that set_affine_HMVP_order_flag is present in the slice header of the non-IDR picture in CVS. When set_affine_HMVP_order_flag is 0, it indicates that set_affine_HMVP_order_flag does not exist in the slice header and that the adaptive affine HMVP is not used in CVS.

TABLE 3

| | Description |
|---|---|
| slice_segment_header( ) { | |
| ... | |
|     if(set_affine_HMVP_order_flag) | |
|         slice_affine_HMVP_idx | u(1) |
| ..., | |
| } | |
| ... | |

Referring to Table 3, slice_affine_HMVP_idx denotes the index of the order of candidates to be used. For example, if slice_affine_HMVP_idx is 0, it indicates the default HMVP order of, e.g., 0, 1, 2, and 3. Likewise, an index value of 1 may be used to indicate the HMVP order of 3, 2, 1, and 0.

Embodiment 3

In an embodiment of the disclosure, there is proposed a method for inserting affine HMVP candidates into a merge or AMVP candidate list. As an embodiment, an affine HMVP candidate may be inserted (or added) to the merge or AMVP candidate list in various locations.

In general, in an affine merge list configuration, inherited affine candidates, constructed affine candidates, and zero motion candidates may be inserted as described above in detail in connection with the embodiments. However, affine HMVP candidates may be inserted into the merge list and the AMVP list considering alternative insertion orders. This is described below with reference to the drawings.

FIG. 53 is a view illustrating an example method for constructing an affine merge candidate list according to an embodiment of the disclosure.

Referring to FIG. 53, in an embodiment of the disclosure, affine HMVP candidates may be introduced into a merge candidate list after inherited affine candidates are inserted or after constructed affine candidates are inserted, or before inherited affine candidates. Although it is assumed in FIG. 53 that an affine merge candidate list is constructed, embodiments of the disclosure are not limited thereto, and an affine AMVP candidate list may be constructed in the same manner.

FIG. 53 illustrates three possible examples of inserting an affine HMVP candidate into an affine merge list. In a first example on the leftmost side, an affine HMVP candidate is inserted into the list after constructed affine candidates. Alternatively, in a second example in the middle, an affine HMVP candidate may be inserted into the list after inherited candidates. Alternatively, in a third example on the rightmost side, an affine HMVP candidate may be inserted at the top of the list.

Embodiment 4

In an embodiment of the disclosure, an efficient method for storing affine HMVP candidates is proposed.

As an embodiment, the following information may be stored for the affine HMVP candidate.

Motion vectors of control points, i.e. CP1, CP2, and/or CP3

Reference indexes for list 0 and/or list 1 (as an example, for an affine-coded CU, all the control points may share the same reference index)

Inter prediction mode (i.e. L0, L1 or bi-pred)

Width and height information for affine blocks

Affine type, e.g., 4-parameter or 6-parameter affine type (as an example, if the affine type is not stored, it may be regarded as the default type)

Meanwhile, when all the information for the affine HMVP candidate is stored, the amount of data is very large, and thus memory efficiency may be degraded. Therefore, according to an embodiment of the disclosure, there is proposed a method for skipping storage of width and height information for an affine block (i.e., a block encoded in the affine mode) by performing a normalization process on a control point motion vector.

As an embodiment, the encoder/decoder may set (or select) to normalize MVs from a PU (or CU) to a fixed size. For example, the fixed size may be 16×16, 8×8, or 4×4. For the affine HMVP candidate(s) to be added to the merge list or AMVP list, the MVs may be denormalized before being inserted into the list. The normalization/denormalization techniques aim to avoid storing PU sizes for the affine HMVP.

For example, when a 6-parameter affine model is applied, a normalization process may be performed based on Equation 23 below.

$$mv^x = \frac{(mv_1^x - mv_0^x)}{w}x + \frac{(mv_2^x - mv_0^x)}{h}y + mv_0^x \quad \text{[Equation 23]}$$

$$mv^y = \frac{(mv_1^y - mv_0^y)}{w}x + \frac{(mv_2^y - mv_0^y)}{h}y + mv_0^y$$

In Equation 23, x and y are the locations of the derived affine MV, and w and h are the width and height of the block.

FIG. 54 is a view for describing a method for normalizing motion vectors of control points according to an embodiment of the disclosure.

Referring to FIG. 54, the following may be considered to derive the affine control point MV for the sub-block.

First, mv0' may be set to mv0.

mv1' and mv2' may be derived according to the 6-parameter affine model of Equation 23 described above based on the width and height.

mv1' may be derived using Equation 24 below.

$$mv1'^x = \frac{(mv_1^x - mv_0^x)}{w}wnew + mv_0^x \quad \text{[Equation 24]}$$

$$mv1'^y = \frac{(mv_1^y - mv_0^y)}{w}wnew + mv_0^y$$

mv2' may be derived using Equation 25 below.

$$mv2'^x = \frac{(mv_2^x - mv_0^x)}{h}hnew + mv_0^x \quad \text{[Equation 25]}$$

$$mv2'^y = \frac{(mv_2^x - mv_0^y)}{h}hnew + mv_0^y$$

The encoder/decoder may normalize/denormalize the MVs of the PU using Equations 24 and 25 described above.

In one embodiment, whether normalization/denormalization is used may be obtained via use of a new high level syntax element. In other words, in the high level syntax (HLS) indicating whether the normalization technique is used during coding, a new syntax element may be transmitted from the encoder to the decoder. As an example, the HLS may be part of a sequence parameter set, picture parameter set, slice and/or other CU/PU header.

TABLE 4

| | Description |
|---|---|
| high_level_parameter_set( ) {<br>...<br>    set_affine_HMVP_norm_flag<br>... | <br><br>u(1)<br> |

In Table 4, when set_affine_HMVP_norm_flag is 1, it indicates that set_affine_HMVP_norm_flag is present in the slice header of the non-IDR picture in CVS. If set_affine_HMVP_norm_flag is 0, it indicates that set_affine_HMVP_norm_flag does not exist in the slice header and normalization is not used.

TABLE 5

| | Description |
|---|---|
| slice_segment_header( ) { | |
| ... | |
|     if(set_affine_HMVP_norm_flag) | |
|         slice_affine_HMVP_norm_idx | u(1) |
| ... | |
| } | |
| ... | |

In Table 5, slice_affine_HMVP_norm_idx denotes the index of the block size used to normalize the current PU size. For example, if slice_affine_HMVP_norm_idx is 0, it may indicate that an 8×8 block size is used for normalization. Likewise, an index value of 1 may be used to represent the normalized block size as, e.g., 16×16.

FIGS. 55 and 56 are views illustrating example normalization/denormalization processes for history-based affine candidates according to an embodiment of the disclosure.

FIGS. 55 and 56 illustrate block processes for inserting affine HMVP candidates, to which the normalization process is applied, into the LUT.

Referring to FIG. 55, the encoder/decoder obtains a flag indicating whether to apply normalization (S5501). The encoder/decoder obtains affine HMVP motion information for storing in the LUT, and motion information (or the coefficient of the motion information) may be normalized (S5502, S5503).

Referring to FIG. 56, when the affine HMVP from the LUT is inserted into the merge list, the encoder/decoder obtains a flag indicating whether to apply normalization (S5601). The encoder/decoder obtains affine HMVP motion information stored in the LUT, and motion information (or the coefficient of the motion information) for insertion into the merge list may be denormalized (S5602, S5603).

The embodiments of the disclosure described above have been separately described for convenience of description, but the disclosure is not limited thereto. In other words, the embodiments described above in connection with embodiments 1 to 4 may be performed independently or in combination of one or more thereof.

FIG. 57 is a flowchart illustrating an example method for processing video signals using affine prediction according to an embodiment of the disclosure.

Referring to FIG. 57, the following description focuses primarily on a decoder for convenience of description, but the disclosure is not limited thereto. The method for processing video signals based on inter prediction according to embodiments of the disclosure may be performed in an encoder and a decoder in the same manner.

The decoder configures a merge candidate list of a current block based on motion information for a neighboring block when the affine prediction applies to the current block (S5701).

The decoder obtains a merge index indicating a merge candidate applied to the current block in the merge candidate list (S5702).

The decoder derives a motion vector for a plurality of control points of the current block using motion information for a merge candidate indicated by the merge index (S5703).

The decoder derives a motion vector of each of a plurality of sub blocks included in the current block using the motion vector of the control points (S5704).

The decoder generates a prediction block of the current block using the motion vector of each of the sub blocks (S5705).

As described above, the constructed merge candidate list may include an affine history-based merge candidate (HMVP).

As described above, configuring the merge candidate list may include adding the affine HMVP from an affine HMVP list including motion information for a block coded in a previously coded affine mode.

As described above, configuring the merge candidate list may include adding motion information for a neighboring block coded in an affine mode among neighboring blocks of the current block to the merge candidate list, adding a combination of motion information for the neighboring blocks of the current block to the merge candidate list, and adding the affine HMVP from an affine HMVP list including motion information for a block coded in a previously coded affine mode.

As described above, the affine HMVP may be a candidate determined based on a predefined order among candidates included in the affine HMVP list.

As described above, the affine HMVP list may include motion information on which normalization is performed based on a width and height of a block coded in an affine mode on a motion vector of a control point of a block coded in the affine mode.

As described above, the method may further comprise obtaining a flag indicating whether to apply the normalization. The flag may be signaled in a unit of a sequence, a picture, a slice, a coding tree unit, or a coding unit.

FIG. 58 is a block diagram illustrating an example device for processing video signals according to an embodiment of the disclosure. The image signal processing device of FIG. 58 may correspond to the encoding apparatus 100 of FIG. 1 or the decoding apparatus 200 of FIG. 2.

The video signal processing device 5800 for processing video signals may include a memory 5820 for storing video signals and a processor 5810 coupled with the memory to process video signals.

According to an embodiment of the disclosure, the processor 5810 may be constructed as at least one processing circuit for processing image signals and may execute instructions for encoding or decoding image signals to thereby process image signals. In other words, the processor 5810 may encode raw image data or decode encoded image signals by executing encoding or decoding methods described above.

FIG. 59 illustrates a video coding system to which the disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/ image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 51 is a configuration diagram of a content streaming system as an embodiment to which the disclosure is applied.

Referring to FIG. 51, the content streaming system to which the disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for decoding a video signal based on an affine prediction by an apparatus, the method comprising:
    configuring a merge candidate list of a current block based on motion information for a neighboring block when the affine prediction applies to the current block;
    obtaining a merge index indicating a merge candidate applied to the current block in the merge candidate list;
    deriving a motion vector for a plurality of control points of the current block based on motion information for the merge candidate indicated by the merge index;
    deriving a motion vector of each of a plurality of sub blocks included in the current block based on the motion vector of the control points; and
    obtaining a prediction block of the current block using the motion vector of each of the sub blocks, wherein the merge candidate list includes an affine history-based merge candidate (HMVP),
    wherein an affine HMVP list includes motion information on which normalization is performed based on a width and a height of a block coded in an affine mode on a motion vector of a control point of a block coded in the affine mode, and
    wherein the method further comprises
    obtaining a normalization flag on whether a normalization for the affine HMVP is used, from a level of a sequence, a picture, a slice, a coding tree unit, a coding unit or a prediction unit, and
    obtaining a normalization index representing which size of a prediction unit is used for the normalization for the affine HMVP based on the normalization flag,
    wherein based on the normalization index being 1, the size of the prediction unit is determined as 16×16, and based on the normalization index being 0, the size of the prediction unit is determined as 8x8.

2. The method of claim 1, wherein configuring the merge candidate list includes adding the affine HMVP from the affine HMVP list including motion information for a block coded in a previously coded affine mode.

3. The method of claim 1, wherein configuring the merge candidate list includes:
    adding motion information for a neighboring block coded in an affine mode among neighboring blocks of the current block to the merge candidate list;
    adding a combination of motion information for the neighboring blocks of the current block to the merge candidate list; and
    adding the affine HMVP from the affine HMVP list including motion information for a block coded in a previously coded affine mode.

4. The method of claim 2, wherein the affine HMVP is a candidate determined based on a predefined order among candidates included in the affine HMVP list.

5. A method for encoding a video signal based on an affine prediction by an apparatus, the method comprising:
    configuring a merge candidate list of a current block based on motion information for a neighboring block when the affine prediction applies to the current block;
    deriving a motion vector for a plurality of control points of the current block based on motion information for a merge candidate;
    deriving a motion vector of each of a plurality of sub blocks included in the current block based on the motion vector of the control points;
    obtaining a prediction block of the current block based on the motion vector of each of the sub blocks, wherein the merge candidate list includes an affine history-based merge candidate (HMVP); and
    generating a merge index indicating the merge candidate applied to the current block in the merge candidate list,
    wherein an affine HMVP list includes motion information on which normalization is performed based on a width and a height of a block coded in an affine mode on a motion vector of a control point of a block coded in the affine mode, and
    wherein the method further comprises
    generating a normalization flag on whether a normalization for the affine HMVP is used, from a level of a sequence, a picture, a slice, a coding tree unit, a coding unit or a prediction unit, and
    generating a normalization index representing which size of a prediction unit is used for the normalization for the affine HMVP based on the normalization flag,
    wherein based on the normalization index being 1, the size of the prediction unit is determined as 16×16, and based on the normalization index being 0, the size of the prediction unit is determined as 8x8.

6. A non-transitory decoder-readable storage medium storing encoded picture information generated by performing the steps of:

configuring a merge candidate list of a current block based on motion information for a neighboring block when an affine prediction applies to the current block;

deriving a motion vector for a plurality of control points of the current block based on motion information for a merge candidate;

deriving a motion vector of each of a plurality of sub blocks included in the current block based on the motion vector of the control points;

obtaining a prediction block of the current block based on the motion vector of each of the sub blocks, wherein the merge candidate list includes an affine history-based merge candidate (HMVP); and generating a merge index indicating the merge candidate applied to the current block in the merge candidate list, wherein an affine HMVP list includes motion information on which normalization is performed based on a width and a height of a block coded in an affine mode on a motion vector of a control point of a block coded in the affine mode, and wherein the method further comprises generating a normalization flag on whether a normalization for the affine HMVP is used, from a level of a sequence, a picture, a slice, a coding tree unit, a coding unit or a prediction unit, and generating a normalization index representing which size of a prediction unit is used for the normalization for the affine HMVP based on the normalization flag, wherein based on the normalization index being 1, the size of the prediction unit is determined as 16×16, and based on the normalization index being 0, the size of the prediction unit is determined as 8x8.

* * * * *